United States Patent
Suzuki et al.

(10) Patent No.: US 10,540,038 B2
(45) Date of Patent: Jan. 21, 2020

(54) DISPLAY DEVICE WITH IMPROVED DETECTION IN PERIPHERAL REGION THEREOF

(71) Applicant: Japan Display Inc., Tokyo (JP)

(72) Inventors: Takafumi Suzuki, Tokyo (JP); Yasuyuki Teranishi, Tokyo (JP); Michita Kudo, Tokyo (JP)

(73) Assignee: Japan Display Inc., Tokyo (JP)

( * ) Notice: Subject to any disclaimer, the term of this patent is extended or adjusted under 35 U.S.C. 154(b) by 36 days.

(21) Appl. No.: 15/966,834

(22) Filed: Apr. 30, 2018

(65) Prior Publication Data
US 2018/0329569 A1 Nov. 15, 2018

(30) Foreign Application Priority Data

May 11, 2017 (JP) .................. 2017-094951

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 2203/04101* (2013.01); *G06F 2203/04111* (2013.01)

(58) Field of Classification Search
CPC .................. G06F 3/0416; G06F 3/044; G06F 2203/04101; G06F 2203/04111
See application file for complete search history.

(56) References Cited

U.S. PATENT DOCUMENTS

| | | | |
|---|---|---|---|
| 2012/0044167 A1* | 2/2012 | Nakanishi | G06F 3/0412 345/173 |
| 2012/0146940 A1 | 6/2012 | Yamamoto et al. | |
| 2014/0253501 A1* | 9/2014 | Noguchi | G02F 1/13338 345/174 |
| 2014/0292709 A1 | 10/2014 | Mizuhashi et al. | |

FOREIGN PATENT DOCUMENTS

| | | |
|---|---|---|
| JP | 2014-199605 A | 10/2005 |
| JP | 2012-123599 A | 4/2012 |
| JP | 2012-123599 | 6/2012 |
| JP | 2014-199605 | 10/2014 |

* cited by examiner

*Primary Examiner* — Lisa S Landis
(74) *Attorney, Agent, or Firm* — K&L Gates LLP

(57) ABSTRACT

A display device includes a substrate, a plurality of first electrodes, a plurality of second electrodes, at least one third electrode, and a drive circuit. The first electrodes are arrayed in an active area of the substrate. The second electrodes face the first electrodes and form capacitance between the first electrodes and the second electrodes. The third electrode is provided in a peripheral region positioned on the outside of the active area. The drive circuit supplies a drive signal having a phase determined based on a predetermined code to the first electrodes and the third electrode.

11 Claims, 30 Drawing Sheets

FIG.28
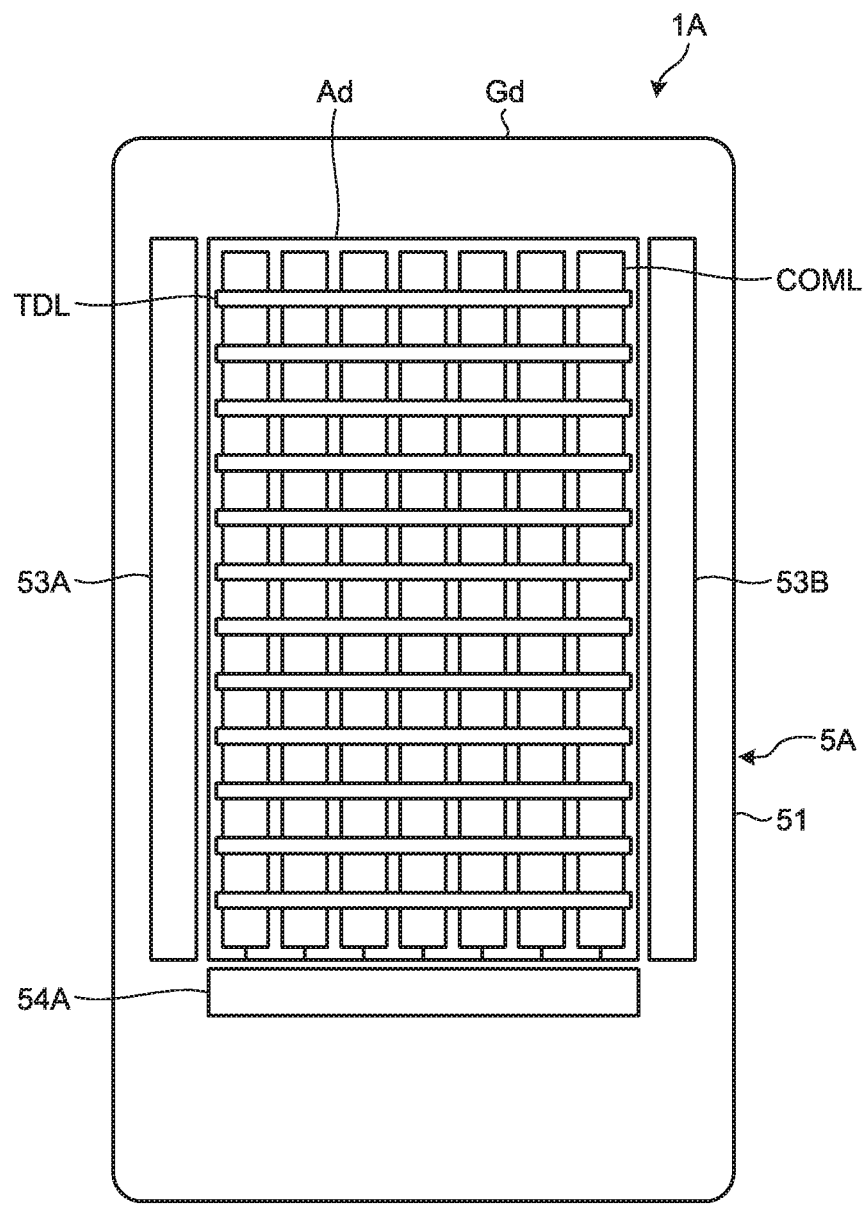
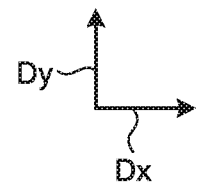

DISPLAY DEVICE WITH IMPROVED DETECTION IN PERIPHERAL REGION THEREOF

CROSS-REFERENCE TO RELATED APPLICATIONS

This application claims priority from Japanese Application No. 2017-094951, filed on May 11, 2017, the contents of which are incorporated by reference herein in its entirety.

BACKGROUND

1. Technical Field

The present disclosure relates to a display device.

2. Description of the Related Art

Touch detection devices capable of detecting an external proximity object, what are called touch panels, have recently been attracting attention. Touch panels are mounted on or integrated with a display device, such as a liquid crystal display device, and used as display devices with a touch detection function (refer to Japanese Patent Application Laid-open Publication No. 2014-199605 (JP-A-2014-199605)). Such display devices with a touch detection function include a button having an input function in a peripheral region positioned around an active area. Widely known are techniques for integrating the input button with the peripheral region of touch panels and display devices.

When an input operation performed in the peripheral region is detected using electrodes and a drive configuration for touch detection, the distance between an object to be detected, such as a finger, in the peripheral region and the detection electrodes is large. If the electrodes and the drive configuration for touch detection are used to detect the object to be detected in the peripheral region without any change, it may possibly be difficult to perform detection satisfactorily. The display device with a touch detection function described in JP-A-2014-199605 performs touch detection by code division multiplex drive. Code division multiplex drive is a method for performing touch detection by selecting a plurality of drive electrodes simultaneously and supplying drive signals having different phases to the selected drive signals. JP-A-2014-199605, however, does not describe detection in the peripheral region.

SUMMARY

A display device according to one aspect includes a substrate, a plurality of first electrodes arrayed in an active area of the substrate, a plurality of second electrodes facing the first electrodes and configured to form capacitance between the first electrodes and the second electrodes, at least one third electrode provided in a peripheral region positioned on the outside of the active area, and a drive circuit configured to supply a drive signal having a phase determined based on a predetermined code to the first electrodes and the third electrode.

BRIEF DESCRIPTION OF THE DRAWINGS

FIG. 28 is a plan view of the display device according to a first modification of the first embodiment;

DETAILED DESCRIPTION

Figure 1:
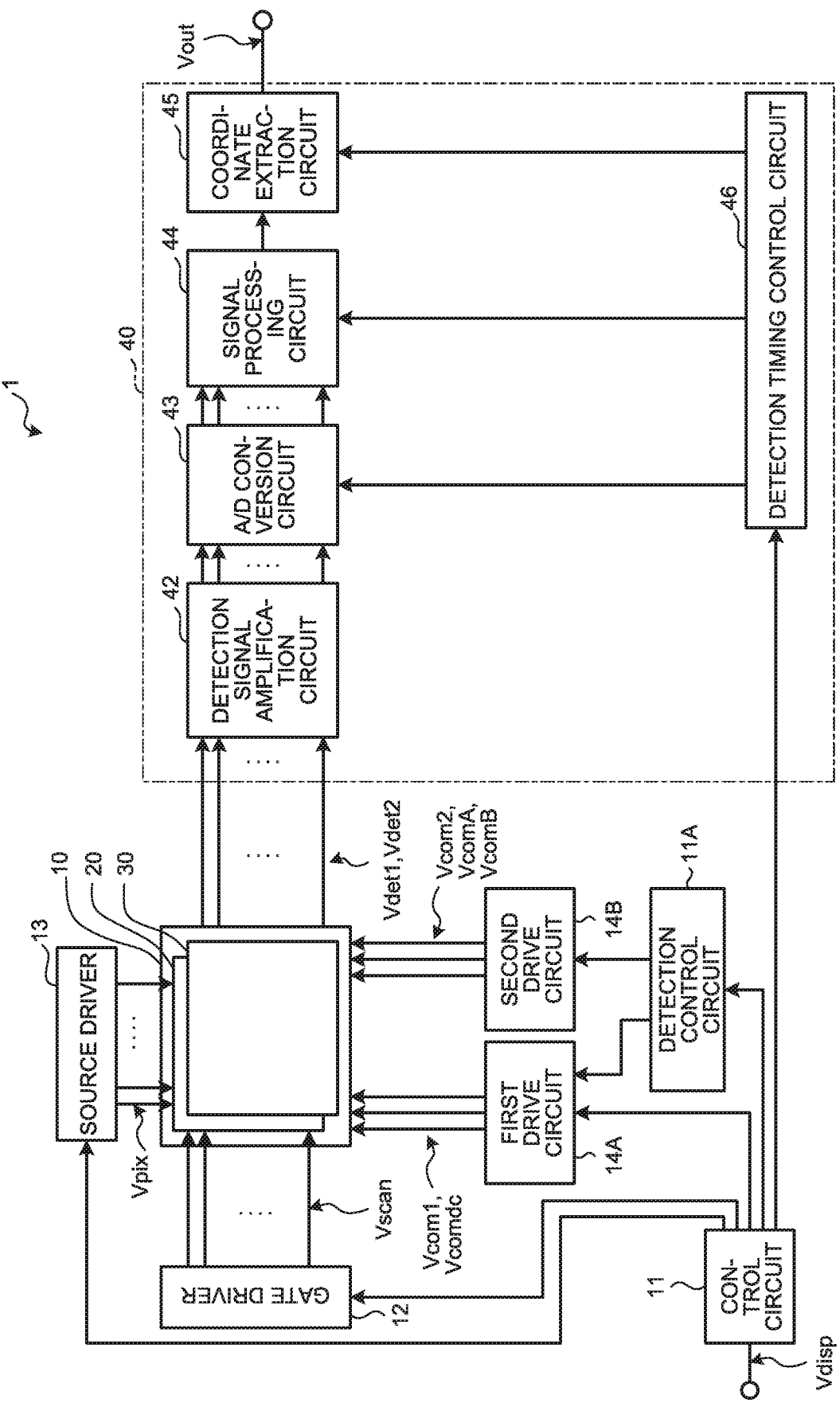
FIG. 1 is a block diagram of an exemplary configuration of a display device according to a first embodiment of the present disclosure.

Exemplary aspects (embodiments) to embody the present disclosure are described below in greater detail with reference to the accompanying drawings. The contents described in the embodiments are not intended to limit the present disclosure. Components described below include components easily conceivable by those skilled in the art and components substantially identical therewith. Furthermore, the components described below may be appropriately combined. What is disclosed herein is given by way of example only, and appropriate changes made without departing from the spirit of the present disclosure and easily conceivable by those skilled in the art naturally fall within the scope of the disclosure. To simplify the explanation, the drawings may possibly illustrate the width, the thickness, the shape, and other elements of each component more schematically than the actual aspect. These elements, however, are given by way of example only and are not intended to limit interpretation of the present disclosure. In the present specification and the figures, components similar to those previously described with reference to previous figures are denoted by like reference numerals, and detailed explanation thereof may be appropriately omitted.

First Embodiment

FIG. 1 is a block diagram of an exemplary configuration of a display device according to a first embodiment of the present disclosure. As illustrated in FIG. 1, a display device 1 includes a display panel 10, a control circuit 11, a detection control circuit 11A, a gate driver 12, a source driver 13, a first drive circuit 14A, a second drive circuit 14B, and a detection circuit 40. The display panel 10 includes a display region 20 and a touch sensor 30. The display region 20 displays an image. The touch sensor 30 is a detection device that detects touch input.

The display panel 10 is a display device in which the display region 20 and the touch sensor 30 are integrated. Specifically, in the display panel 10, part of members, such as electrodes and substrates, of the display region 20 are also used as electrodes and substrates of the touch sensor 30.

The display region 20 includes liquid crystal display elements serving as display elements. The display region 20 includes a plurality of pixels having the display elements and has a display surface facing the pixels. The display region 20 receives video signals Vdisp to display an image composed of the pixels on the display surface. The display panel 10 may be a device in which the touch sensor 30 is mounted on the display region 20. The display region 20 may be an organic electroluminescence (EL) display panel, for example.

The control circuit 11 supplies control signals to the gate driver 12, the source driver 13, the first drive circuit 14A, the detection control circuit 11A, and the detection circuit 40 based on the video signals Vdisp supplied from the outside. The control circuit 11 mainly controls a display operation performed by the display device 1. The detection control circuit 11A supplies control signals to the first drive circuit 14A and the second drive circuit 14B based on the control signals supplied from the control circuit 11. The detection control circuit 11A mainly controls a detection operation performed by the display device 1.

The gate driver 12 supplies scanning signals Vscan to one horizontal line to be a target of display drive in the display panel 10 based on the control signals supplied from the control circuit 11. As a result, one horizontal line to be a target of display drive is sequentially or simultaneously selected.

The source driver 13 is a circuit that supplies pixel signals Vpix to respective sub-pixels SPix (refer to FIG. 10) of the display region 20. Part of the functions of the source driver 13 may be provided to the display panel 10. In this case, the control circuit 11 may generate the pixel signals Vpix and supply them to the source driver 13.

The first drive circuit 14A supplies display drive signals Vcomdc to first electrodes COML of the display panel 10. The first drive circuit 14A supplies detection drive signals Vcom1 to the first electrodes COML of the display panel 10 in mutual capacitance touch detection. The second drive circuit 14B supplies detection drive signals Vcom2 to both or at least one of third electrodes 53A and 53B of the display panel 10 in mutual capacitance touch detection. The second drive circuit 14B supplies drive signals VcomA to the first electrodes COML or supplies drive signals VcomB to second electrodes TDL in self-capacitance touch detection.

The control circuit 11 according to the present embodiment performs, in a time-division manner, a display operation of causing the display region 20 to perform display and a detection operation of causing the touch sensor 30 to detect an object to be detected. The detection control circuit 11A generates control signals based on a predetermined code and supplies them to the first drive circuit 14A and the second drive circuit 14B in the detection operation. Based on the control signals supplied from the detection control circuit 11A, the first drive circuit 14A and the second drive circuit 14B supply the drive signals Vcom1 and Vcom2 having phases based on the predetermined code to the first electrodes COML and the third electrodes 53A and 53B, respectively.

The touch sensor 30 performs touch detection based on the basic principle of touch detection by a mutual capacitance method (also referred to as a mutual method). If the touch sensor 30 detects an object to be detected in a contact state, the touch sensor 30 outputs detection signals Vdet1 to the detection circuit 40. The touch sensor 30 can also perform touch detection based on the basic principle of touch detection by a self-capacitance method (also referred to as a self-method). If the touch sensor 30 detects an object to be detected in the contact state by the self-capacitance method, the touch sensor 30 outputs detection signals Vdet2 to the detection circuit 40.

In the present specification, a "contact state" indicates a state where the object to be detected is in contact with the display surface or in proximity to the display surface close enough to consider it in contact therewith. A "non-contact state" indicates a state where the object to be detected is neither in contact with the display surface nor in proximity to the display surface close enough to consider it in contact therewith.

In mutual capacitance touch detection, the detection circuit 40 determines whether a touch is made by an object to be detected on the display surface of the display panel 10 based on the control signals supplied from the control circuit 11 and on the detection signals Vdet1 output from the display panel 10. In self-capacitance touch detection, the detection circuit 40 determines whether a touch is made by an object to be detected on the display surface of the display panel 10 based on the control signals supplied from the control circuit 11 and on the detection signals Vdet2 output from the display panel 10. If a touch is detected, the detection circuit 40 calculates the coordinates at which the touch input is made, for example.

The detection circuit 40 includes a detection signal amplification circuit 42, an analog/digital (A/D) conversion circuit 43, a signal processing circuit 44, a coordinate extraction circuit 45, and a detection timing control circuit 46. The detection timing control circuit 46 controls the A/D conversion circuit 43, the signal processing circuit 44, and the coordinate extraction circuit 45 such that they operate synchronously with one another based on the control signals supplied from the control circuit 11.

In touch detection, the detection signal amplification circuit 42 amplifies the detection signals Vdet1 supplied from the display panel 10. The A/D conversion circuit 43 samples analog signals output from the detection signal amplification circuit 42 at a timing synchronized with the drive signals Vcom1 and Vcom2, thereby converting the analog signals into digital signals.

The signal processing circuit 44 is a logic circuit that determines whether a touch is made on the display panel 10 based on the output signals from the A/D conversion circuit 43. The signal processing circuit 44 performs processing of extracting a signal (absolute value $|\Delta V|$) of the difference between the detection signals caused by a finger. The signal processing circuit 44 compares the absolute value $|\Delta V|$ with a predetermined threshold voltage. If the absolute value $|\Delta V|$ is lower than the threshold voltage, the signal processing circuit 44 determines that an object to be detected is in the non-contact state. By contrast, if the absolute value $|\Delta V|$ is equal to or higher than the threshold voltage, the signal processing circuit 44 determines that an object to be detected is in the contact state or a proximity state. The detection circuit 40 thus can perform touch detection.

The coordinate extraction circuit 45 is a logic circuit that calculates, if the signal processing circuit 44 detects a touch, the touch panel coordinates of the touch. The coordinate extraction circuit 45 outputs the touch panel coordinates as output signals Vout. The coordinate extraction circuit 45 may output the output signals Vout to the control circuit 11. The control circuit 11 can perform a predetermined display or detection operation based on the output signals Vout.

The detection signal amplification circuit 42, the A/D conversion circuit 43, the signal processing circuit 44, the coordinate extraction circuit 45, and the detection timing control circuit 46 of the detection circuit 40 are provided to the display device 1. The configuration is not limited thereto, and all or part of the functions of the detection circuit 40 may be provided to an external control substrate or processor, for example. The coordinate extraction circuit 45, for example, may be provided to an external processor different from the display device 1. In this case, the detection circuit 40 may output the signals processed by the signal processing circuit 44 as the output signals Vout.

Figure 2:
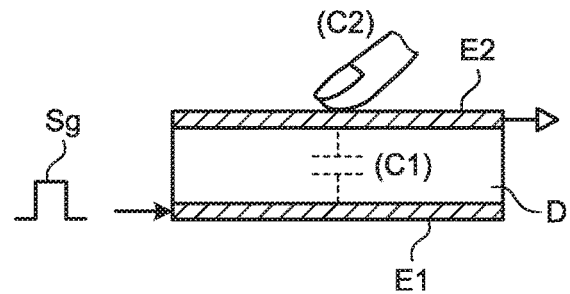
FIG. 2 is a diagram for explaining the basic principle of mutual capacitance touch detection.
Figure 3:
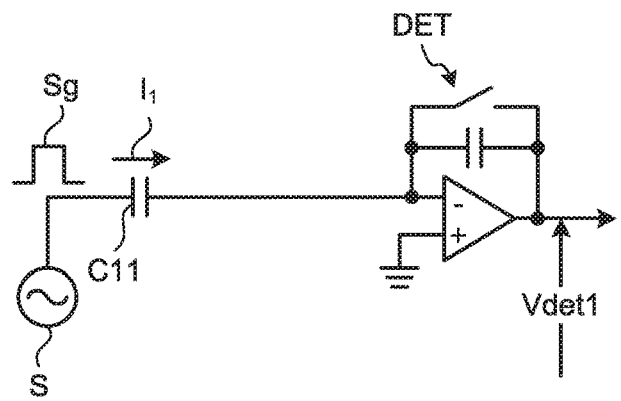
FIG. 3 is a diagram for explaining an example of an equivalent circuit in mutual capacitance touch detection.
Figure 4:
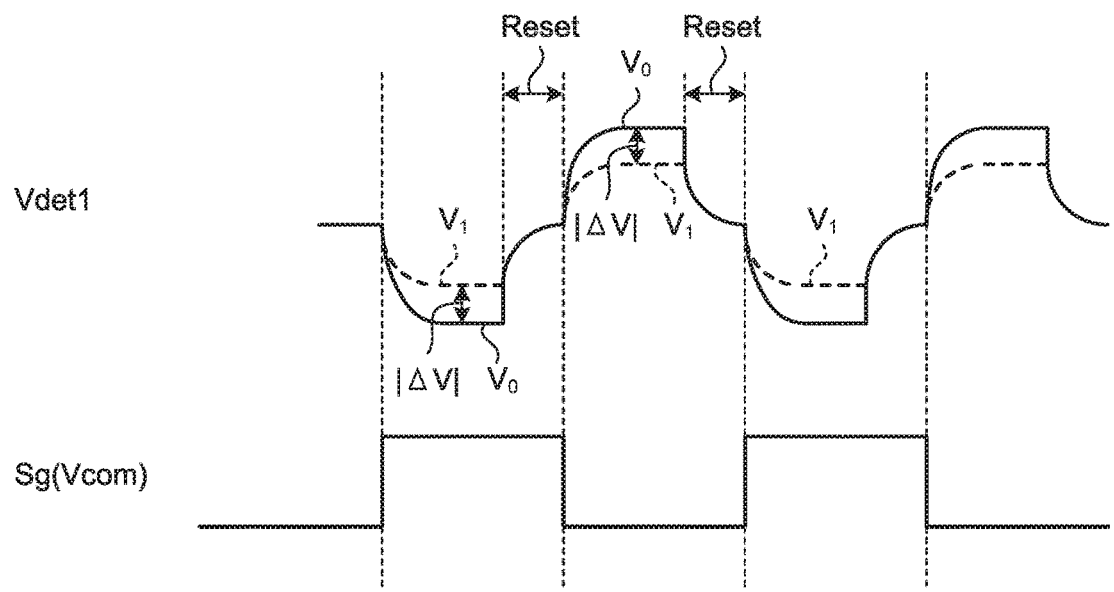
FIG. 4 is a diagram of an example of waveforms of a drive signal and a detection signal in mutual capacitance touch detection.

The following describes the basic principle of mutual capacitance touch detection performed by the display device 1 according to the present embodiment with reference to FIGS. 2 to 4. FIG. 2 is a diagram for explaining the basic principle of mutual capacitance touch detection. FIG. 3 is a diagram for explaining an example of an equivalent circuit in mutual capacitance touch detection. FIG. 4 is a diagram of an example of waveforms of a drive signal and a detection signal in mutual capacitance touch detection. While the following describes a case where a finger is in contact with or in proximity to a detection electrode, the object to be detected is not limited to a finger and may be an object including a conductor, such as a stylus, for example.

As illustrated in FIG. 2, a capacitance element C1 includes a pair of electrodes, that is, a drive electrode E1 and a detection electrode E2 facing each other with a dielectric D interposed therebetween. The capacitance element C1 generates fringe lines of electric force extending from ends of the drive electrode E1 to the upper surface of the detection electrode E2 besides lines of electric force (not illustrated) formed between the facing surfaces of the drive electrode E1 and the detection electrode E2. As illustrated in FIG. 3, a first end of the capacitance element C1 is coupled to an alternating-current (AC) signal source (drive signal source) S, and a second end thereof is coupled to a voltage detector DET. The voltage detector DET is an integration circuit included in the detection signal amplifier circuit 42 illustrated in FIG. 1, for example.

When the AC signal source S applies an AC rectangular wave Sg at a predetermined frequency (e.g., several kilohertz to several hundred kilohertz) to the drive electrode E1 (first end of the capacitance element C1), an output waveform (detection signal Vdet1) illustrated in FIG. 4 is generated via the voltage detector DET.

In the non-contact state, an electric current depending on the capacitance value of the capacitance element C1 flows. The voltage detector DET illustrated in FIG. 3 converts fluctuations in the electric current depending on the AC rectangular wave Sg into fluctuations in the voltage (waveform $V_0$ indicated by the solid line (refer to FIG. 4)).

In the contact state, as illustrated in FIGS. 2 and 3, capacitance C2 formed by the finger is in contact with the detection electrode E2 or in proximity to the detection electrode E2 close enough to consider it in contact therewith. The fringe lines of electric force between the drive electrode E1 and the detection electrode E2 are blocked by a conductor (finger). As a result, the capacitance element C1 acts as a capacitance element C11 having a capacitance value smaller than that in the non-contact state. The voltage detector DET converts fluctuations in an electric current $I_1$ depending on the AC rectangular wave Sg into fluctuations in the voltage (waveform $V_1$ indicated by the dotted line (refer to FIG. 4)).

In this case, the waveform $V_1$ has amplitude smaller than that of the waveform $V_0$. Consequently, the absolute value

|ΔV| of the voltage difference between the waveform $V_0$ and the waveform $V_1$ varies depending on an effect of an external object, such as a finger, in contact with or in proximity to the detection electrode from the outside. The voltage detector DET resets charge and discharge of a capacitor based on the frequency of the AC rectangular wave Sg by switching in the circuit. With the period Reset, the voltage detector DET can accurately detect the absolute value |ΔV| of the voltage difference.

As described above, the detection circuit 40 compares the absolute value |ΔV| with the predetermined threshold voltage, thereby determining whether the external proximity object is in the non-contact state or in the contact or proximity state. The detection circuit 40 thus can perform touch detection based on the basic principle of mutual capacitance touch detection.

Figure 5:
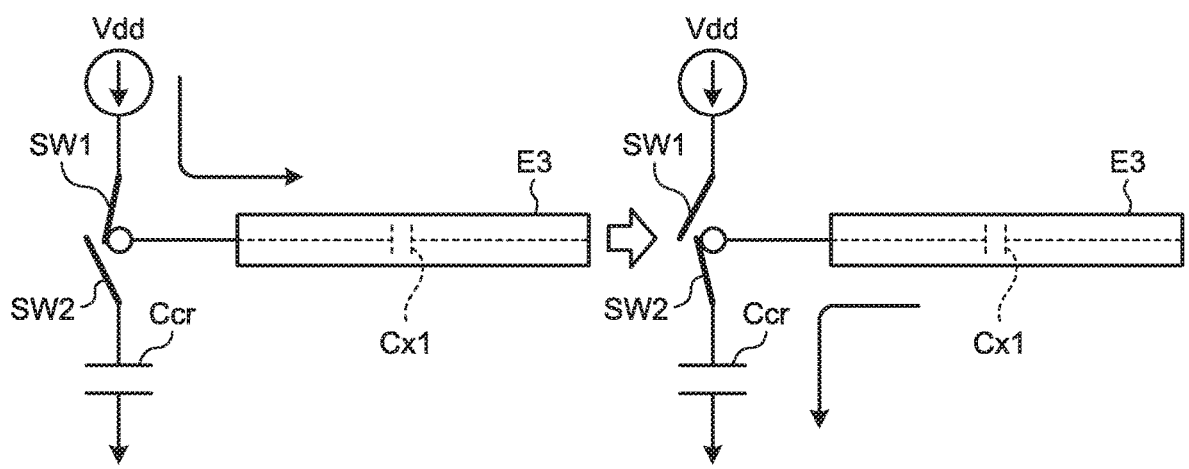
FIG. 5 is a diagram for explaining the basic principle of self-capacitance touch detection and illustrates a non-contact state.
Figure 6:
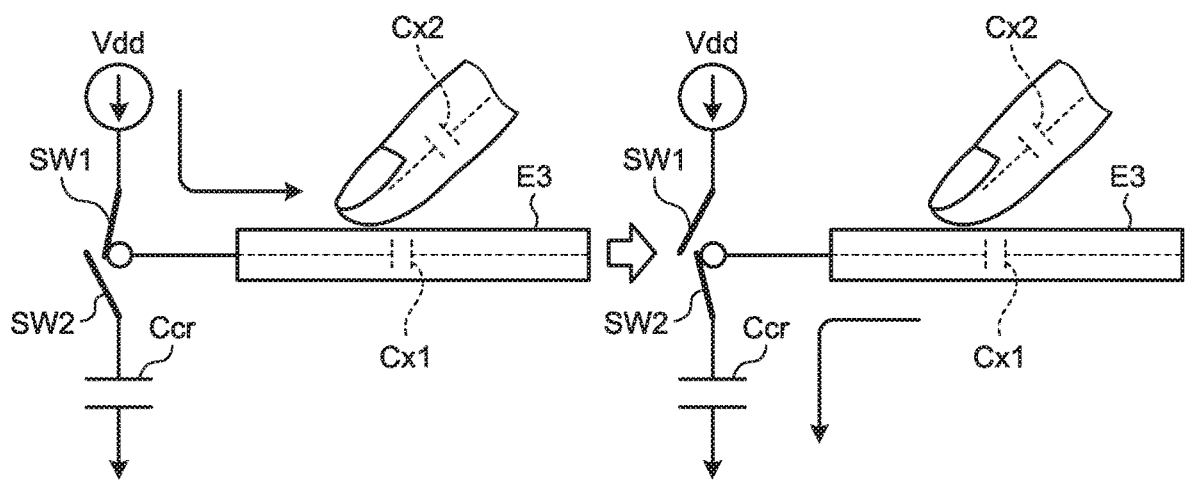
FIG. 6 is a diagram for explaining the basic principle of self-capacitance touch detection and illustrates a contact state.
Figure 7:
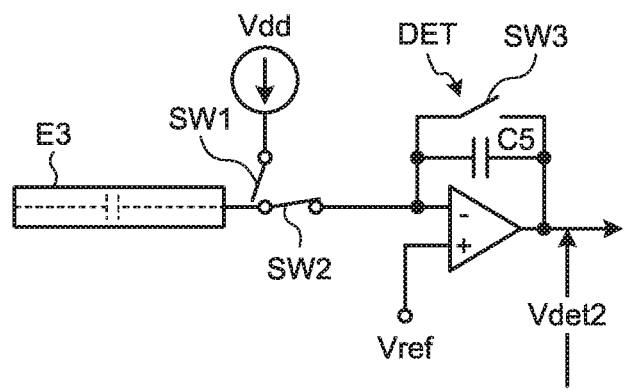
FIG. 7 is a diagram for explaining an example of an equivalent circuit in self-capacitance touch detection.
Figure 8:
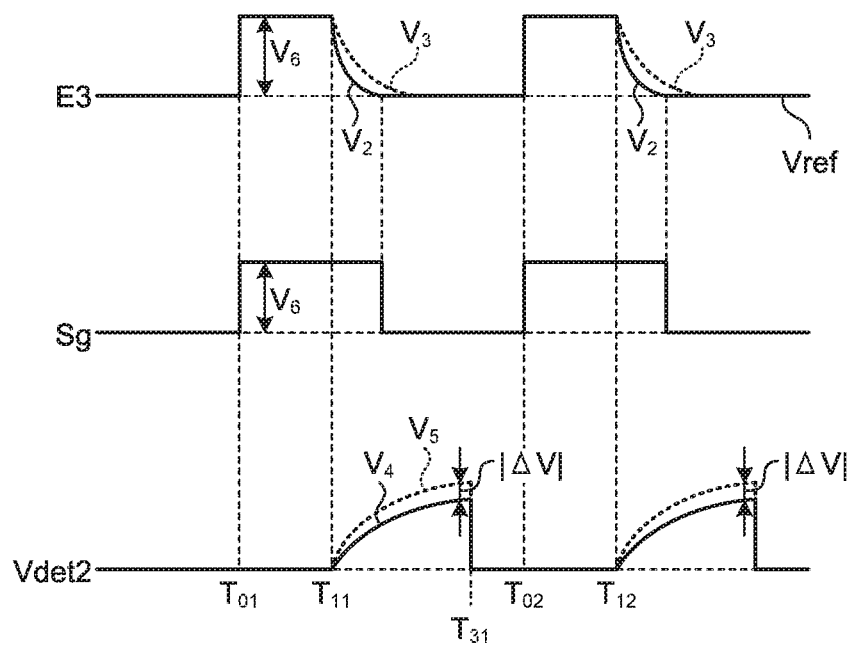
FIG. 8 is a diagram of an example of waveforms of a drive signal and a detection signal in self-capacitance touch detection.

The following describes the basic principle of self-capacitance touch detection with reference to FIGS. 5 to 8. FIG. 5 is a diagram for explaining the basic principle of self-capacitance touch detection and illustrating a non-contact state. FIG. 6 is a diagram for explaining the basic principle of self-capacitance touch detection and illustrating a contact state. FIG. 7 is a diagram for explaining an example of an equivalent circuit in self-capacitance touch detection. FIG. 8 is a diagram of an example of waveforms of a drive signal and a detection signal in self-capacitance touch detection.

The left figure in FIG. 5 illustrates a state where a detection electrode E3 is coupled to a power source Vdd by a switch SW1 but is not coupled to a capacitor Ccr by a switch SW2 in the non-contact state. In this state, capacitance Cx1 in the detection electrode E3 is charged. The right figure in FIG. 5 illustrates a state where coupling between the power source Vdd and the detection electrode E3 is cut off by the switch SW1, and the detection electrode E3 is coupled to the capacitor Ccr by the switch SW2. In this state, an electric charge in the capacitance Cx1 is discharged via the capacitor Ccr.

The left figure in FIG. 6 illustrates a state where coupling between the power source Vdd and the detection electrode E3 is cut off by the switch SW1, and the detection electrode E3 is not coupled to the capacitor Ccr by the switch SW2 in the contact state. In this state, capacitance Cx2 generated by the finger in proximity to the detection electrode E3 is also charged besides the capacitance Cx1 in the detection electrode E3. The right figure in FIG. 6 illustrates a state where the detection electrode E3 is not coupled to the power source Vdd by the switch SW1 but is coupled to the capacitor Ccr by the switch SW2. In this state, an electric charge in the capacitance Cx1 and an electric charge in the capacitance Cx2 are discharged via the capacitor Ccr.

Because of the capacitance Cx2, the voltage change characteristics of the capacitor Ccr in discharging (contact state) illustrated in the right figure in FIG. 6 are clearly different from those of the capacitor Ccr in discharging (non-contact state) illustrated in the right figure in FIG. 5. Consequently, the self-capacitance method determines whether an input operation is performed by a finger or the like using the fact that the voltage change characteristics of the capacitor Ccr vary depending on the presence of the capacitance Cx2.

Specifically, an AC rectangular wave Sg (refer to FIG. 8) at a predetermined frequency (e.g., several kilohertz to several hundred kilohertz) is applied to the detection electrode E3. The voltage detector DET illustrated in FIG. 7 converts fluctuations in the electric current depending on the AC rectangular wave Sg into fluctuations in the voltage (waveforms $V_4$ and $V_5$).

In FIG. 8, the voltage level of the AC rectangular wave Sg rises by an amount corresponding to voltage $V_6$ at time $T_{01}$. At this time, the switch SW1 is turned on, and the switch SW2 is turned off. As a result, the electric potential of the detection electrode E3 also rises to voltage $V_6$. Subsequently, the switch SW1 is turned off before time $T_{11}$. While the detection electrode E3 is in a floating state at this time, the electric potential of the detection electrode E3 is maintained at voltage $V_6$ by the capacitance Cx1 (or Cx1+Cx2, refer to FIG. 6) of the detection electrode E3. Subsequently, the voltage detector DET performs a reset operation before time $T_{11}$.

Subsequently, when the switch SW2 is turned on at time $T_{11}$, the electric charge accumulated in the capacitance Cx1 (or Cx1+Cx2) of the detection electrode E3 moves to capacitance C5 in the voltage detector DET. As a result, output from the voltage detector DET increases (refer to the detection signal Vdet2 in FIG. 8). In the non-contact state, the output (detection signal Vdet2) from the voltage detector DET corresponds to the waveform $V_4$ indicated by the solid line, and Vdet2=Cx1×$V_6$/C5 is satisfied. In the contact state, the output corresponds to the waveform $V_5$ indicated by the dotted line, and Vdet2=(Cx1+Cx2)×$V_6$/C5 is satisfied.

Subsequently, at time $T_{31}$, the switch SW2 is turned off, and the switch SW1 and a switch SW3 are turned on. As a result, the electric potential of the detection electrode E3 is reduced to a low level equal to the electric potential of the AC rectangular wave Sg, and the voltage detector DET is reset. The operation described above is repeated at a predetermined frequency (e.g., several kilohertz to several hundred kilohertz). The detection circuit 40 thus can perform touch detection based on the basic principle of self-capacitance touch detection.

Figure 9:
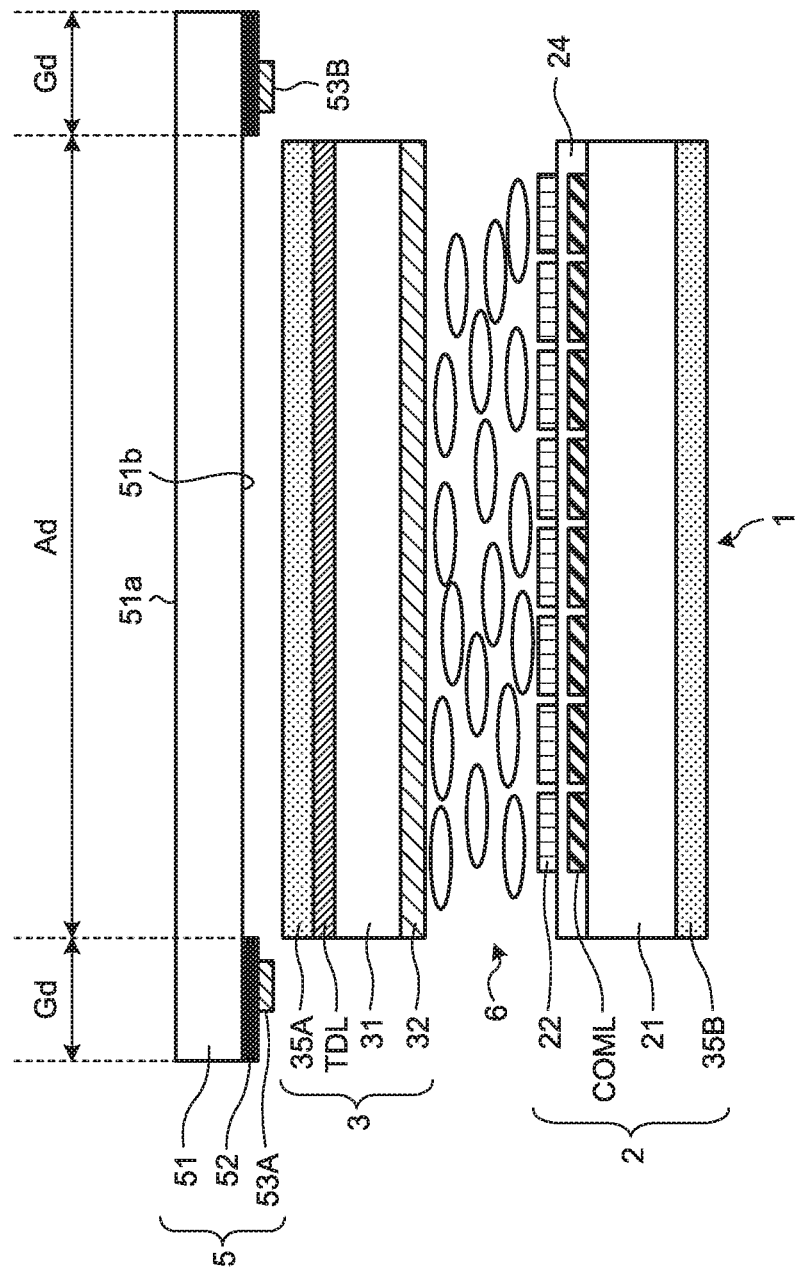
FIG. 9 is a sectional view of a schematic sectional structure of the display device according to the first embodiment.

The following describes an exemplary configuration of the display device 1 according to the present embodiment in greater detail. FIG. 9 is a sectional view of a schematic sectional structure of the display device according to the present embodiment. As illustrated in FIG. 9, the display device 1 includes a pixel substrate 2, a counter substrate 3, a cover member 5, and a liquid crystal layer 6 serving as a display functional layer. The counter substrate 3 is disposed facing the pixel substrate 2 in a direction perpendicular to the surface of the pixel substrate 2. The cover member 5 is disposed facing the counter substrate 3 in a direction perpendicular to the surface of the counter substrate 3 on the opposite side of the pixel substrate 2 across the counter substrate 3. The liquid crystal layer 6 is provided between the pixel substrate 2 and the counter substrate 3.

The pixel substrate 2 includes a first substrate 21, pixel electrodes 22, the first electrodes COML, and a polarizing plate 35B. The first substrate 21 is provided with circuits, such as a gate scanner included in the gate driver 12, switching elements, such as thin film transistors (TFTs), and various kinds of wiring (not illustrated in FIG. 9), such as the gate lines GCL and the signal lines SGL.

The first electrodes COML are provided on the first substrate 21. The pixel electrodes 22 are provided above the first electrodes COML with an insulating layer 24 interposed therebetween. The pixel electrodes 22 are provided to a layer different from that of the first electrodes COML and disposed overlapping the first electrodes COML in planar view. The pixel electrodes 22 are disposed in a matrix (row-column configuration) in planar view. The polarizing plate 35B is provided under the first substrate 21.

In the present specification, "above" indicates a direction from the first substrate 21 toward a second substrate 31 in the direction perpendicular to the surface of the first substrate 21, and "below" indicates a direction from the second substrate 31 toward the first substrate 21. The "planar view" indicates a view seen in the direction perpendicular to the surface of the first substrate 21.

The pixel electrodes 22 are provided corresponding to the respective sub-pixels SPix constituting each pixel Pix of the display panel 10. The pixel electrodes 22 are supplied with the pixel signals Vpix for performing a display operation. In the display operation, the first electrodes COML are supplied with the display drive signals Vcomdc, which are direct-current (DC) voltage signals, to serve as common electrodes for a plurality of pixel electrodes 22. The first electrodes COML serve as drive electrodes in mutual capacitance touch detection. The first electrodes COML also serve as detection electrodes in self-capacitance touch detection.

The pixel electrodes 22 and the first electrodes COML according to the present embodiment are made of a translucent conductive material, such as indium tin oxide (ITO).

The counter substrate 3 includes the second substrate 31, a color filter 32, the second electrodes TDL, and a polarizing plate 35A. The color filter 32 is provided to one surface of the second substrate 31. The second electrodes TDL are provided to the other surface of the second substrate 31. The second electrodes TDL are arrayed on the second substrate 31. The second electrodes TDL serve as detection electrodes in mutual capacitance touch detection and self-capacitance touch detection.

The second electrodes TDL according to the present embodiment are made of a translucent conductive material, such as ITO. Alternatively, the second electrodes TDL may be metal thin wires having a mesh-shaped, zigzag-line-shaped, or wavy-line-shaped pattern. In this case, the second electrodes TDL are metal layers made of one or more of aluminum (Al), copper (Cu), silver (Ag), molybdenum (Mo), chromium (Cr), and tungsten (W).

The color filter 32 faces the liquid crystal layer 6 in the direction perpendicular to the first substrate 21. The color filter 32 may be disposed above the first substrate 21. The first substrate 21 and the second substrate 31 according to the present embodiment are glass substrates or resin substrates, for example.

The first substrate 21 and the second substrate 31 are disposed facing each other with a predetermined space interposed therebetween. The liquid crystal layer 6 is provided between the first substrate 21 and the second substrate 31. The liquid crystal layer 6 modulates light passing therethrough depending on the state of an electric field. The liquid crystal layer 6, for example, includes liquid crystals in a lateral electric-field mode, such as the in-plane switching (IPS) mode including the fringe field switching (FFS) mode. Orientation films (not illustrated in FIG. 9) are provided between the liquid crystal layer 6 and the pixel substrate 2 and between the liquid crystal layer 6 and the counter substrate 3 illustrated in FIG. 9.

The cover member 5 includes a cover substrate 51, a colored layer 52, the third electrodes 53A and 53B, and third electrodes 54A and 54B (not illustrated in FIG. 9). The cover substrate 51 is a protective member that covers and protects the pixel substrate 2 and the counter substrate 3. The cover substrate 51 may be a glass substrate or a film-like substrate made of a resin material, for example. The cover substrate 51 has a first surface 51a and a second surface 51b. The first surface 51a serves as a display surface on which an image is displayed and as a detection surface with or to which an object to be detected is in contact or in proximity. The second surface 51b opposite to the first surface 51a faces the counter substrate 3 and is bonded to the counter substrate 3 with an adhesive layer, which is not illustrated, interposed therebetween.

The colored layer 52 is provided to the second surface 51b of the cover substrate 51. The colored layer 52 is provided in a peripheral region Gd. The colored layer 52 can prevent various kinds of circuits and wires, such as the source driver 13, the first drive circuit 14A, and the second drive circuit 14B, from being visually recognized from the outside. The colored layer 52 is a decorative layer made of a resin material or a metal material colored to suppress transmission of light, for example.

The third electrodes 53A and 53B are provided under the colored layer 52 on the second surface 51b of the cover substrate 51. The third electrodes 54A and 54B, which are not illustrated in FIG. 9, are also provided under the colored layer 52. The third electrodes 53A and 53B serve as drive electrodes in mutual capacitance touch detection. The third electrodes 54A and 54B serve as detection electrodes or drive electrodes in mutual capacitance touch detection.

An illumination device (backlight), which is not illustrated, is provided below the first substrate 21. The illumination device includes a light source, such as a light emitting diode (LED), and outputs light from the light source to the first substrate 21. The light from the illumination device passes through the pixel substrate 2 and is modulated depending on the state of the liquid crystals at the corresponding position. The state of light transmission to the display surface varies depending on the positions. With this mechanism, an image is displayed on the display surface.

Figure 10:
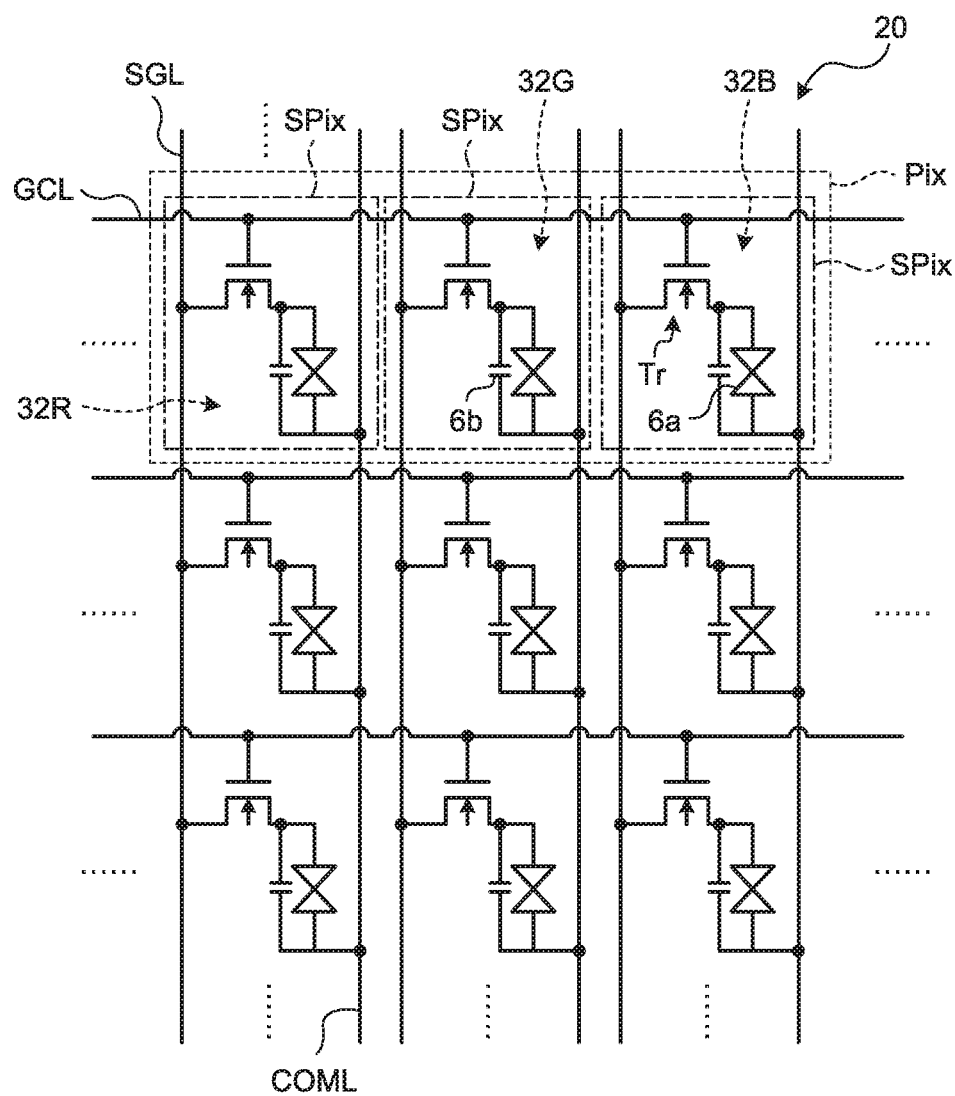
FIG. 10 is a circuit diagram of a pixel array in a display region.

The following describes a display operation performed by the display panel 10. FIG. 10 is a circuit diagram of a pixel array in the display region according to the present embodiment. The first substrate 21 (refer to FIG. 9) is provided with switching elements Tr of the respective sub-pixels SPix, the signal lines SGL, the gate lines GCL, and other components as illustrated in FIG. 10. The signal lines SGL are wiring that supplies the pixel signals Vpix to the pixel electrodes 22. The gate lines GCL are wiring that supplies drive signals for driving the switching elements Tr. The signal lines SGL and the gate lines GCL extend on a plane parallel to the surface of the first substrate 21.

The display region 20 illustrated in FIG. 10 includes a plurality of sub-pixels SPix arrayed in a matrix (row-column configuration). The sub-pixels SPix each include the switching element Tr and a liquid crystal element 6a. The switching element Tr is a thin-film transistor and is an n-channel metal oxide semiconductor (MOS) TFT in this example. The insulating layer 24 is provided between the pixel electrodes 22 and the first electrodes COML to form holding capacitance 6b illustrated in FIG. 10.

The gate driver 12 illustrated in FIG. 1 sequentially selects the gate line GCL. The gate driver 12 applies the scanning signals Vscan to the gates of the switching elements Tr of the respective sub-pixels SPix via the selected gate line GCL. As a result, one row (one horizontal line) out of the sub-pixels SPix is sequentially selected as a target of display drive. The source driver 13 supplies the pixel signals Vpix to the sub-pixels SPix included in the selected horizontal line via the signal lines SGL. The sub-pixels SPix perform display in units of one horizontal line based on the supplied pixel signals Vpix.

To perform the display operation, the first drive circuit 14A illustrated in FIG. 1 applies the display drive signals Vcomdc to the first electrodes COML. The display drive signal Vcomdc is a voltage signal serving as a common potential for a plurality of sub-pixels SPix. As a result, the first electrodes COML serve as common electrodes for the pixel electrodes 22 in the display operation. To perform display, the first drive circuit 14A applies the drive signals Vcomdc to all the first electrodes COML in an active area Ad.

The color filter 32 illustrated in FIG. 9 may include periodically arrayed color areas of the color filter in three colors of red (R), green (G), and blue (B), for example. Color areas 32R, 32G, and 32B in the three colors of R, G, and B, respectively, serve as a set and correspond to the respective sub-pixels SPix illustrated in FIG. 10. A pixel Pix is composed of a set of sub-pixels SPix corresponding to the respective color areas 32R, 32G, and 32B in the three colors. The color filter 32 may include color areas in four or more colors.

Figure 11:
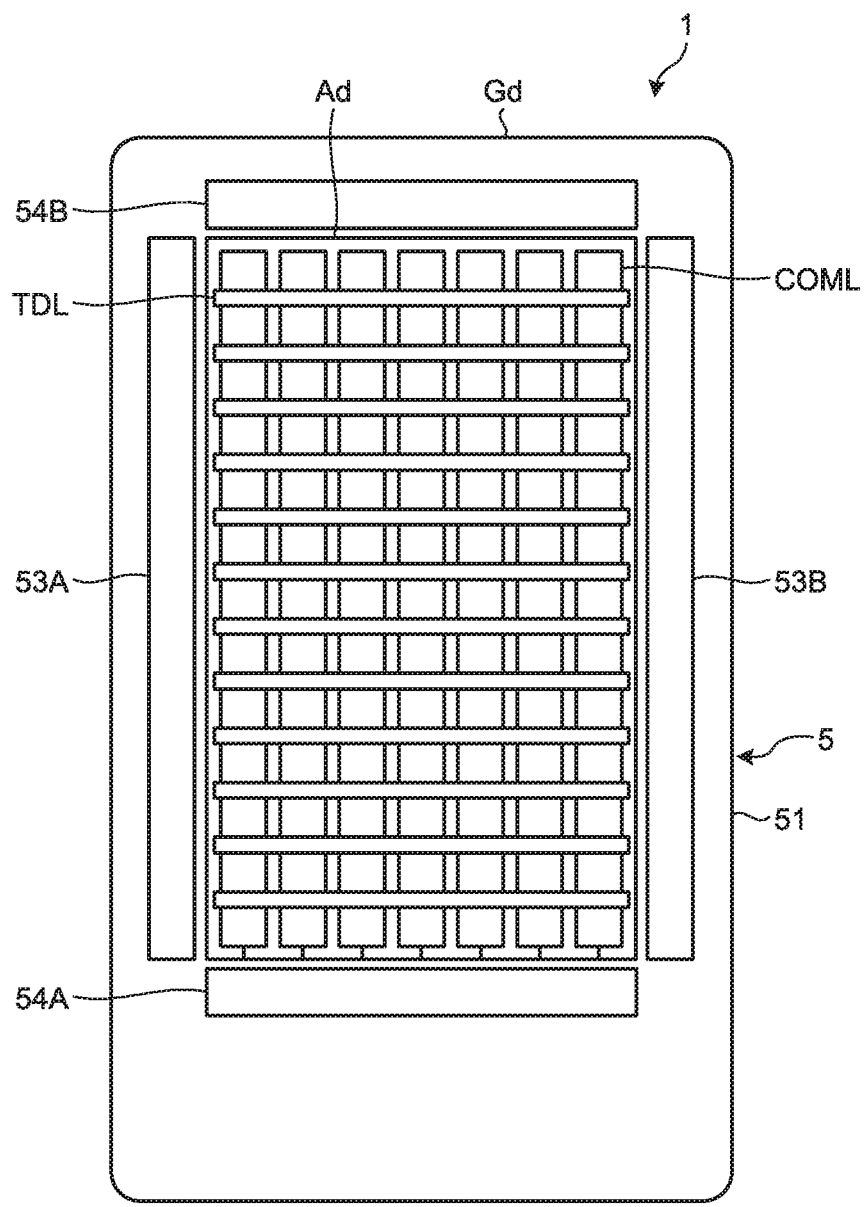
FIG. 11 is a plan view schematically illustrating the display device according to the first embodiment.
Figure 12:
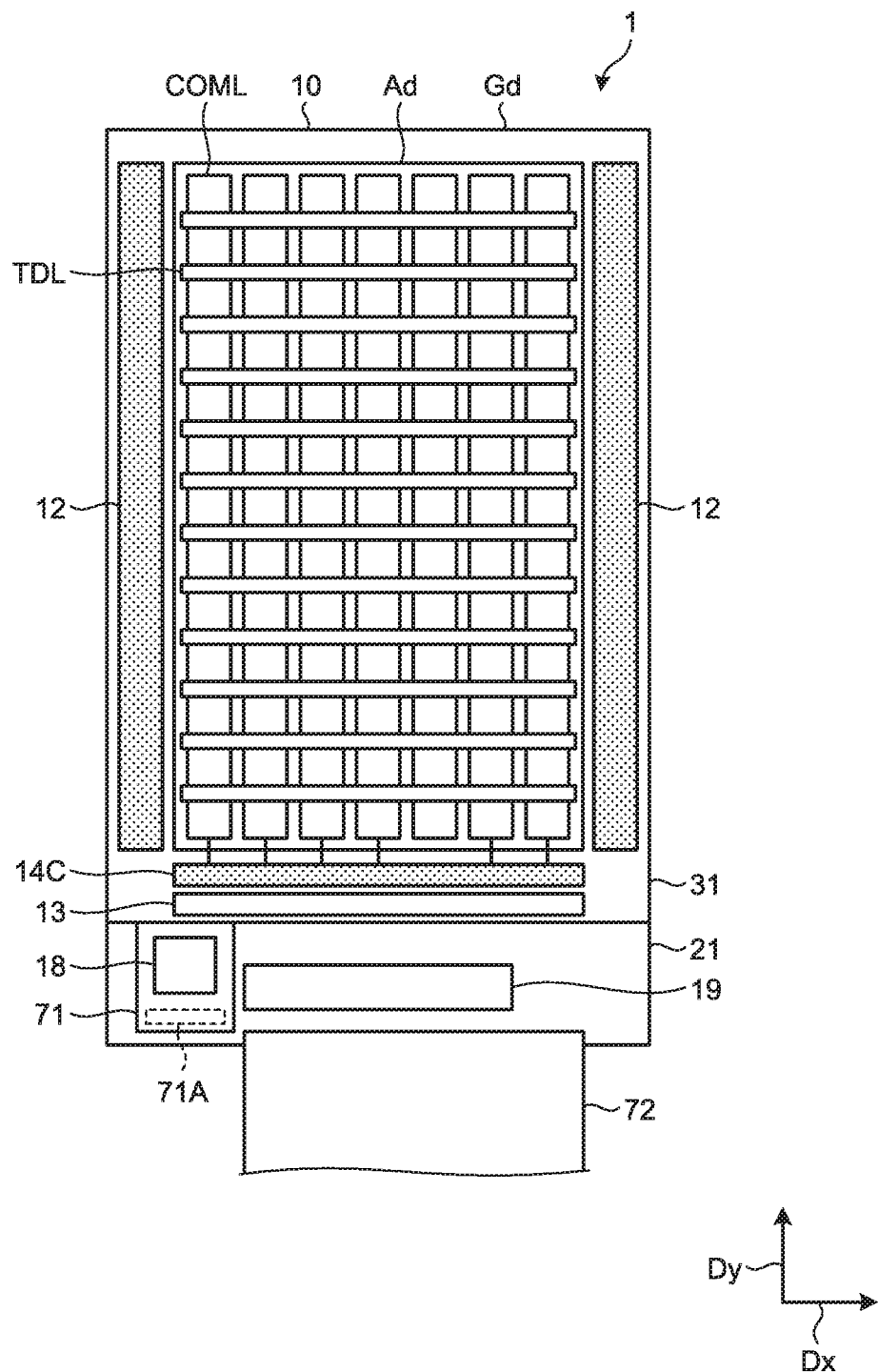
FIG. 12 is a diagram of an example of a module provided with the display device.
Figure 13:
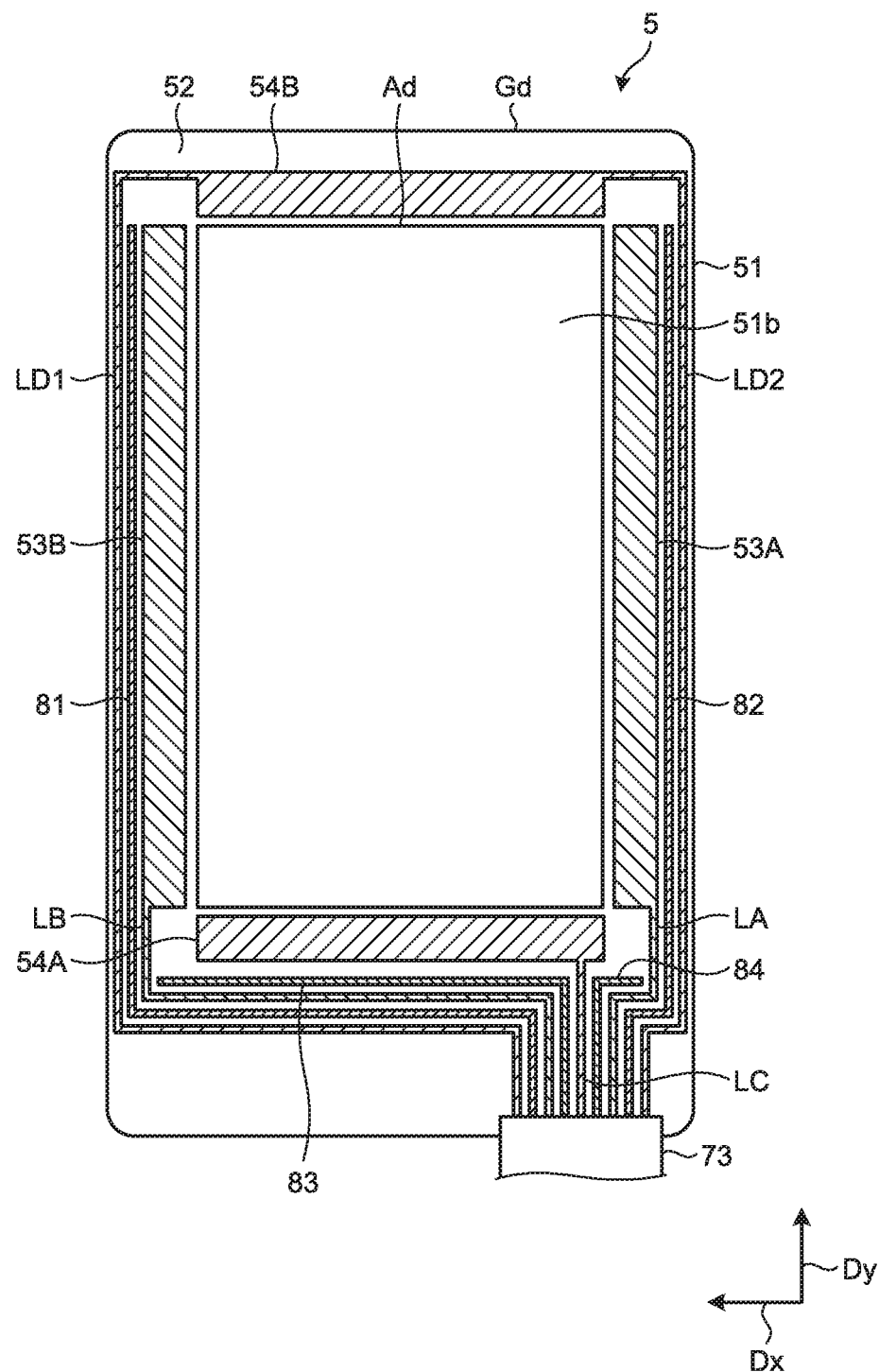
FIG. 13 is a plan view of a cover substrate.

The following describes the configuration of the first electrodes COML, the second electrodes TDL, the third electrodes 53A and 53B, and the third electrodes 54A and 54B and a touch detection operation. FIG. 11 is a plan view schematically illustrating the display device according to the first embodiment. FIG. 12 is a diagram of an example of a module provided with the display device. FIG. 13 is a plan view of the cover substrate. FIG. 11 schematically illustrates the positional relation between the first electrodes COML, the second electrodes TDL, the third electrodes 53A and 53B, and the third electrodes 54A and 54B. FIG. 13 illustrates the second surface 51b of the cover substrate 51.

As illustrated in FIG. 11, the display device 1 has the active area Ad and the peripheral region Gd. In the present specification, the active area Ad is a region for displaying an image and provided with a plurality of pixels Pix (sub-pixels SPix). The peripheral region Gd is a region positioned on the inner side than the outer periphery of the cover substrate 51 and on the outer side than the active area Ad. The peripheral region Gd may have a frame shape surrounding the active area Ad. In this case, the peripheral region Gd may also be referred to as a frame region. In the present specification, "outside" means a direction from the center of the cover substrate 51 toward the ends thereof, and "inside" means a direction opposite to the outside.

As illustrated in FIG. 11, the first electrodes COML and the second electrodes TDL are provided in the active area Ad. The third electrodes 53A and 53B and the third electrodes 54A and 54B are provided in the peripheral region Gd. As illustrated in FIGS. 11 and 12, the first electrodes COML extend in a second direction Dy and are arrayed in a first direction Dx. In other words, the first electrodes COML extend along the long side of the active area Ad and are arrayed in the short side thereof. The first electrodes COML have a rectangular shape with their long sides extending in the second direction Dy.

The first direction Dx according to the present embodiment extends along one side of the active area Ad. The second direction Dy intersects the first direction Dx. The second direction Dy may intersect the first direction Dx at an angle other than 90 degrees or at 90 degrees. The plane defined by the first direction Dx and the second direction Dy is parallel to the surface of the first substrate 21. The direction orthogonal to the first direction Dx and the second direction Dy is the thickness direction of the first substrate 21.

The second electrodes TDL extend in the first direction Dx and are arrayed in the second direction Dy. The second electrodes TDL intersect the first electrodes COML in planar view. Capacitance is formed at the intersections of the first electrodes COML and the second electrodes TDL.

With this configuration, to perform mutual capacitance touch detection, the first drive circuit 14A sequentially scans the first electrodes COML in a time-division manner and supplies the drive signals Vcom1 thereto. Sensor output signals Vs corresponding to changes in capacitance between the first electrodes COML and the second electrodes TDL are output to the voltage detector DET. The display device 1 thus performs touch detection in the active area Ad.

As illustrated in FIG. 12, a flexible substrate 72 is provided in the peripheral region Gd of the first substrate 21. A drive scanning circuit 14C, the source driver 13, and a display integrated circuit (IC) 19 are provided in the peripheral region Gd between the ends of the first electrodes COML and the flexible substrate 72. The drive scanning circuit 14C is a scanner circuit that sequentially selects the first electrode(s) COML to be driven. The gate drivers 12 are provided in the peripheral region Gd along the extending direction of the first electrodes COML, that is, on the long sides of the peripheral region Gd of the first substrate 21.

A flexible substrate 71 is provided in the peripheral region Gd of the second substrate 31. The flexible substrate 71 is provided with a detection IC 18. The flexible substrate 71 is electrically coupled to the display IC 19 or the flexible substrate 72 of the first substrate 21 via a coupling terminal 71A.

The display IC 19 serves as the control circuit 11 illustrated in FIG. 1. Part of the functions of the detection circuit 40 may be included in the detection IC 18 or provided as functions of an external micro-processing unit (MPU). The configuration of the display IC 19 or the detection IC 18 is not limited thereto, and the display IC 19 or the detection IC 18 may be provided to an external control substrate outside the module, for example. The first drive circuit 14A illustrated in FIG. 1 may be included in the display IC 19 or the detection IC 18. The second drive circuit 14B may be included in the detection IC 18. The configuration is not limited thereto, and the first drive circuit 14A and the second drive circuit 14B may be provided to the first substrate 21 or an external control substrate.

In the display device 1 according to the present embodiment, the first electrodes COML extend in a direction intersecting the gate lines GCL (refer to FIG. 10) in planar view. With this configuration, wiring (not illustrated) coupled to the first electrodes COML and circuits, such as the drive scanning circuit 14C, can be provided in the peripheral region Gd at a position different from the positions of the gate drivers 12. Specifically, as illustrated in FIG. 12, the gate drivers 12 are provided on the long sides of the peripheral region Gd, and circuits, such as the drive scanning circuit 14C, and the display IC 19 are provided on the short side thereof, for example. Consequently, the display device 1 according to the present embodiment can make the peripheral region Gd along the first electrodes COML narrower. The configuration is not limited thereto, and the first electrodes COML may extend in a direction intersecting the signal lines SGL (refer to FIG. 10), that is, in the first direction Dx. In this case, the second electrodes TDL extend in the second direction Dy so as to intersect the first electrodes COML.

As illustrated in FIG. 11, the third electrode 53A is disposed on one of the sides of the peripheral region Gd facing each other in the first direction Dx, and the third electrode 53B is disposed on the other thereof. The third electrodes 53A and 53B extend in the second direction Dy and are disposed facing each other in the first direction Dx. The first electrodes COML and the second electrodes TDL are disposed between the third electrodes 53A and 53B in planar view. In other words, the third electrodes 53A and 53B are provided not overlapping the first electrodes COML and the second electrodes TDL. The third electrodes 53A and 53B extend in a direction parallel to the first electrodes COML in planar view. The third electrode 53A is disposed facing one of two outermost first electrodes COML out of the first electrodes COML arrayed in the first direction Dx, and the third electrode 53B is disposed facing the other thereof. The third electrodes 53A and 53B are disposed facing the ends of the second electrodes TDL.

The length of the third electrodes 53A and 53B in the second direction Dy is preferably substantially equal to or longer than that of the active area Ad in the second direction Dy. The length of the third electrodes 53A and 53B in the second direction Dy may be shorter than that of the active area Ad in the second direction Dy. The third electrodes 53A and 53B each preferably continuously extend without being electrically separated in a portion along at least one side of the active area Ad.

As illustrated in FIG. 11, the third electrode 54A is disposed on one of the sides of the peripheral region Gd facing each other in the second direction Dy, and the third electrode 54B is disposed on the other thereof. The third electrodes 54A and 54B extend in the first direction Dx and are disposed facing each other in the second direction Dy. The first electrodes COML and the second electrodes TDL are disposed in the portion surrounded by the third electrodes 53A, 53B, 54A, and 54B in planar view. In other words, the third electrodes 54A and 54B are provided not overlapping the first electrodes COML and the second electrodes TDL. The third electrodes 54A and 54B extend in a direction parallel to the second electrodes TDL in planar view and are disposed facing the ends of the first electrodes COML. In other words, the third electrodes 54A and 54B are disposed in the peripheral region Gd at a position facing the ends of the first electrodes COML. The third electrodes 53A and 53B according to the present embodiment are disposed on the left and right sides of the peripheral region Gd. The third electrodes 54A and 54B are disposed on the upper and lower sides of the peripheral region Gd.

The third electrodes 54A and 54B extend in a direction along the short sides of the active area Ad. The third electrodes 54A and 54B are each disposed with a space interposed between the ends of the third electrodes 53A and 53B and those of the third electrodes 54A and 54B. The length of the third electrodes 54A and 54B in the first direction Dx is preferably substantially equal to or longer than that of the active area Ad in the first direction Dx. The length of the third electrodes 54A and 54B in the first direction Dx may be shorter than that of the active area Ad in the first direction Dx. The third electrodes 54A and 54B each preferably continuously extend without being electrically separated in a portion along at least one side of the active area Ad.

As illustrated in FIG. 13, the third electrodes 53A and 53B and the third electrodes 54A and 54B are provided in the peripheral region Gd on the second surface 51b of the cover substrate 51. The third electrodes 53A and 53B and the third electrodes 54A and 54B are prevented from being visually recognized from the outside because they are disposed under the colored layer 52. With this configuration, the third electrodes 53A and 53B and the third electrodes 54A and 54B may be made of a metal material having high conductivity. The third electrodes 53A and 53B and the third electrodes 54A and 54B are a metal layer made of one or more of aluminum (Al), copper (Cu), silver (Ag), molybdenum (Mo), chromium (Cr), and tungsten (W), for example. The third electrodes 53A and 53B and the third electrodes 54A and 54B may be made of an alloy including one or more of these metal materials or a multilayered body including a plurality of conductive layers made of these materials.

As illustrated in FIG. 13, a flexible substrate 73 is provided in the peripheral region Gd of the cover substrate 51. The third electrodes 53A and 53B are electrically coupled to the flexible substrate 73 via wires LA and LB, respectively. The third electrode 54A is electrically coupled to the flexible substrate 73 via a wire LC. The third electrode 54B is electrically coupled to the flexible substrate 73 via wires LD1 and LD2. The wire LD1 is coupled to one end of the third electrode 54B, extends along the third electrode 53B, and is coupled to the flexible substrate 73. The wire LD2 is coupled to the other end of the third electrode 54B, extends along the third electrode 53A, and is coupled to the flexible substrate 73.

The flexible substrate 73 is provided in the peripheral region Gd corresponding to the position of the flexible substrates 71 and 72 illustrated in FIG. 12. The flexible substrate 73 is electrically coupled to the first substrate 21 or the flexible substrate 71 or 72 illustrated in FIG. 12. With this configuration, the third electrodes 53A and 53B and the third electrodes 54A and 54B are electrically coupled to the detection IC 18.

The second drive circuit 14B included in the detection IC 18 supplies the drive signals Vcom2 to the third electrodes 53A and 53B via the flexible substrate 73 and the wires LA and LB. The sensor output signals Vs output from the third electrodes 54A and 54B are supplied to the voltage detector DET included in the detection IC 18 via the wires LC, LD1, and LD2 and the flexible substrate 73.

As illustrated in FIG. 13, a guard wire 82 is provided between the third electrode 53A and the wire LD2. The guard wire 82 extends along the third electrode 53A and the wire LD2 apart from them. A guard wire 81 is provided between the third electrode 53B and the wire LD1. The guard wire 81 extends along the third electrode 53B and the wire LD1 apart from them.

A guard wire 83 is provided between the third electrode 54A and the wire LB. The guard wire 83 extends along the third electrode 54A and the wire LB apart from them. A guard wire 84 is provided between the wire LA and the wire LC. The guard wire 84 extends along the wire LA and the wire LC apart from them.

The guard wires 81, 82, 83, and 84 are coupled to the flexible substrate 73. In touch detection, the second drive circuit 14B supplies DC voltage signals to the guard wires 81 to 84. This mechanism suppresses capacitive coupling between the third electrodes 53A, 53B, 54A, and 54B and the various kinds of wires LA, LB, LC, LD1, and LD2. Consequently, the display device 1 can increase the detection sensitivity.

As described above, the display device 1 can detect touch input made on the peripheral region Gd based on changes in capacitance between the third electrodes 53A and 53B and the second electrodes TDL provided in the active area Ad. Alternatively, the display device 1 can detect touch input made on the peripheral region Gd based on changes in capacitance between the third electrodes 54A and 54B and the first electrodes COML provided in the active area Ad.

Figure 14:
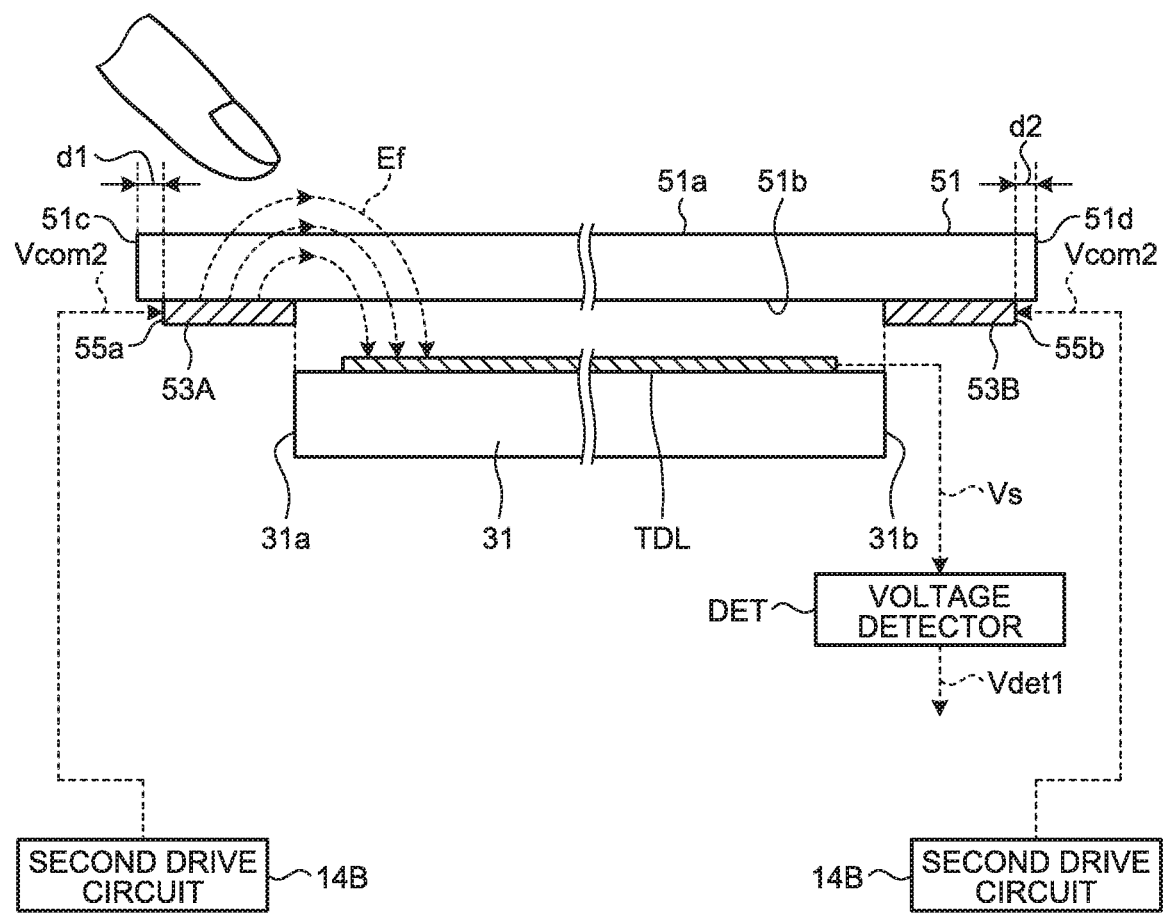
FIG. 14 is a sectional view schematically illustrating the relation between second electrodes and third electrodes.
Figure 15:
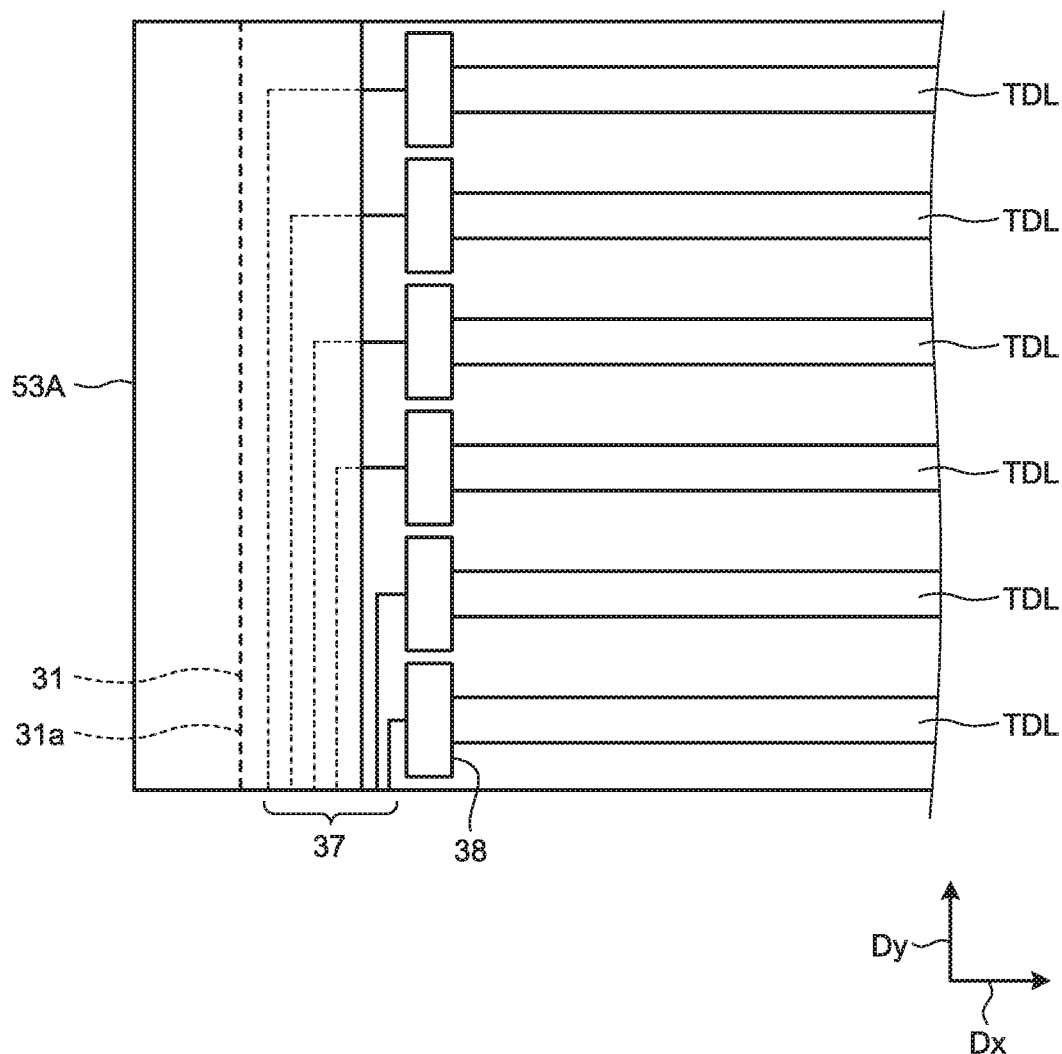
FIG. 15 is a plan view schematically illustrating the relation between the second electrodes and the third electrode in an enlarged manner.
Figure 16:
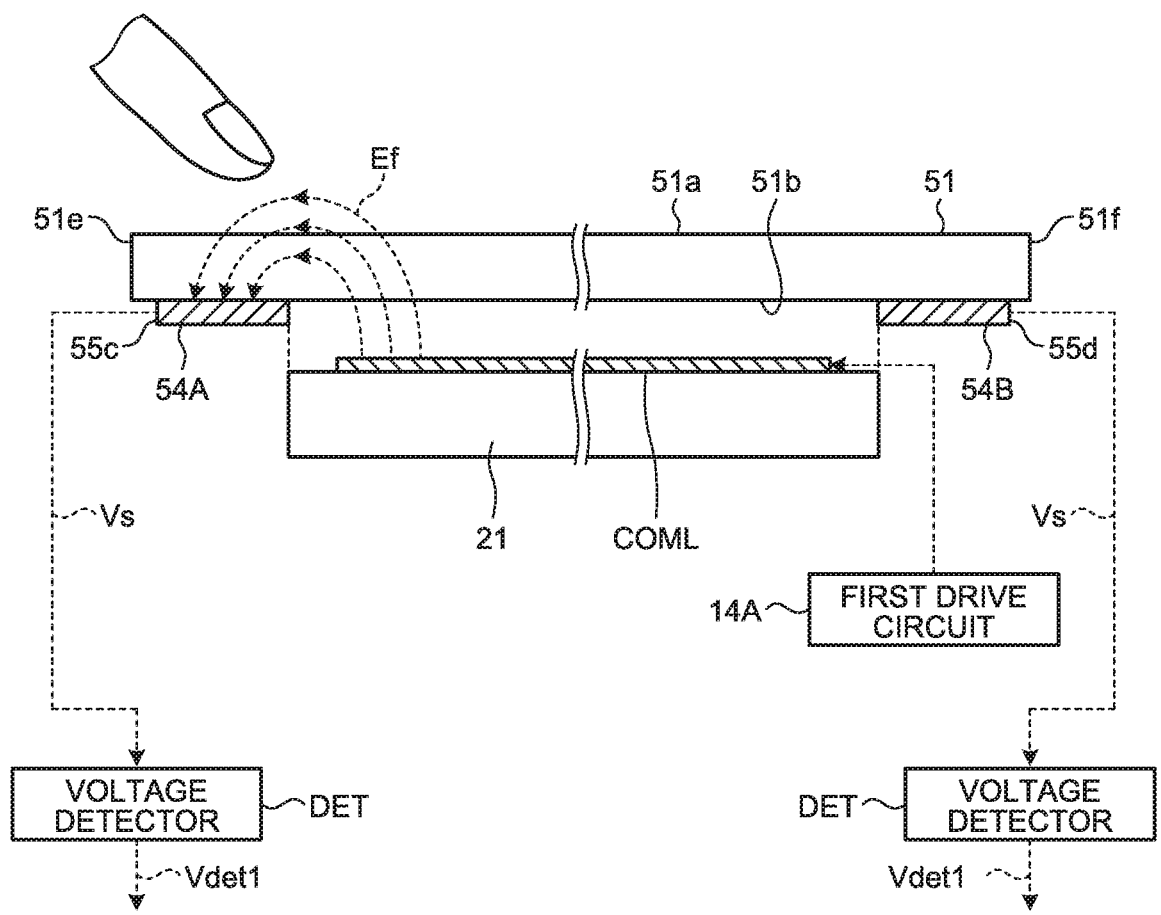
FIG. 16 is a sectional view schematically illustrating the relation between first electrodes and the third electrodes.

FIG. 14 is a sectional view schematically illustrating the relation between the second electrodes and the third electrodes. FIG. 15 is a plan view schematically illustrating the relation between the second electrodes and the third electrode in an enlarged manner. FIG. 16 is a sectional view schematically illustrating the relation between the first electrodes and the third electrodes. As illustrated in FIG. 14, the third electrodes 53A and 53B are disposed on the outer side than the ends of the second electrodes TDL in the extending direction. As illustrated in FIG. 11, the ends of the second electrodes TDL are disposed facing the third electrodes 53A and 53B. With this configuration, capacitance is formed between the third electrodes 53A and 53B and the second electrodes TDL.

As illustrated in FIG. 14, the second drive circuit 14B supplies the drive signals Vcom2 to the third electrodes 53A and 53B. As a result, fringe lines of electric force Ef are generated between the third electrodes 53A and 53B and the second electrodes TDL. FIG. 14 illustrates only the lines of electric force Ef of the third electrode 53A. The lines of electric force Ef extend from the third electrode 53A in the peripheral region Gd to the upper side than the first surface 51a of the cover substrate 51 and then extend toward the second electrodes TDL in the active area Ad.

When an object to be detected is in contact with or in proximity to the first surface 51a of the cover substrate 51 near the boundary between the active area Ad and the peripheral region Gd or in the peripheral region Gd, the fringe lines of electric force Ef formed between the third electrodes 53A and 53B and the second electrodes TDL are blocked. The second electrodes TDL output, to the voltage detector DET, the sensor output signals Vs corresponding to changes in capacitance between the third electrodes 53A and 53B and the second electrodes TDL. The voltage detector DET outputs the detection signals Vdet1 based on the basic principle of mutual capacitance touch detection described above. As described above, the third electrodes 53A and 53B can expand a region capable of detecting an object to be detected to the outer side than the outer periphery of the active area Ad. Consequently, the display device 1 can detect an object to be detected in the peripheral region Gd. Specifically, the third electrodes 53A and 53B can expand the detection range in the array direction of the first electrodes COML (first direction Dx).

The third electrodes 53A and 53B are preferably disposed on the outer side than ends 31a and 31b of the second substrate 31 in planar view. This configuration can reduce stray capacitance formed between the various kinds of wires provided in the peripheral region Gd of the second substrate 31 and the third electrodes 53A and 53B. Consequently, the display device 1 can increase the touch detection sensitivity in the peripheral region Gd.

As illustrated in FIG. 14, an end 55a of the third electrode 53A is preferably disposed near a first end 51c of the cover substrate 51. The end 55a of the third electrode 53A is preferably disposed at a position corresponding to the first end 51c of the cover substrate 51. An end 55b of the third electrode 53B is preferably disposed near a second end 51d of the cover substrate 51. The end 55b of the third electrode 53B is preferably disposed at a position corresponding to the second end 51d of the cover substrate 51.

In a case where the third electrodes 53A and 53B are made of metal, a protective layer covering the third electrodes 53A and 53B may be provided to prevent corrosion, for example. In this case, the third electrodes 53A and 53B fail to reach the ends 51c and 51d, respectively, of the cover substrate 51. A distance d1 denotes the distance between the end 55a of the third electrode 53A and the end 51c of the cover substrate 51. A distance d2 denotes the distance between the end 55b of the third electrode 53B and the end 51d of the cover substrate 51. The distances d1 and d2 are preferably 10 µm to 100 µm, for example. With this configuration, the display device 1 can detect an object to be detected satisfactorily near the ends 51c and 51d of the cover substrate 51.

As illustrated in FIG. 15, pads 38 are provided to ends of the respective second electrodes TDL. Coupling wires 37 are coupled to the respective pads 38 and extend in the second direction Dy. The coupling wires 37 are coupled to the flexible substrate 71 (refer to FIG. 12) and electrically coupled to the detection IC 18. The third electrode 53A is disposed on the outer side than the ends of the second electrodes TDL at a position not overlapping the second electrodes TDL. The third electrode 53A may overlap part of the coupling wires 37. Similarly, the third electrode 53B, which is not illustrated in FIG. 15, may overlap part of the coupling wires 37. With this configuration, the width of the peripheral region Gd of the cover substrate 51 can be reduced.

As illustrated in FIG. 16, the third electrodes 54A and 54B are disposed on the outer side than the ends of the first electrodes COML in the extending direction. As illustrated in FIG. 11, the ends of the first electrodes COML are disposed facing the third electrodes 54A and 54B. With this configuration, capacitance is formed between the third electrodes 54A and 54B and the first electrodes COML.

As illustrated in FIG. 16, the first drive circuit 14A supplies the drive signals Vcom1 to the first electrodes COML. As a result, the fringe lines of electric force Ef are generated between the first electrodes COML and the third electrodes 54A and 54B. FIG. 16 illustrates only the lines of electric force Ef of the third electrode 54A. The lines of electric force Ef extend from the first electrodes COML in the active area Ad to the upper side than the first surface 51a of the cover substrate 51 and then extend toward the third electrodes 54A and 54B in the peripheral region Gd.

When an object to be detected is in contact with or in proximity to the first surface 51a of the cover substrate 51 near the boundary between the active area Ad and the peripheral region Gd or in the peripheral region Gd, the fringe lines of electric force Ef formed between the first electrodes COML and the third electrodes 54A and 54B are blocked. The third electrodes 54A and 54B output, to the voltage detector DET, the sensor output signals Vs corresponding to changes in capacitance between the third electrodes 54A and 54B and the first electrodes COML. The voltage detector DET outputs the detection signals Vdet1 based on the basic principle of mutual capacitance touch detection described above.

As described above, the third electrodes 54A and 54B serve as detection electrodes in touch detection. This configuration can expand a region capable of detecting an object to be detected to the outer side than the outer periphery of the active area Ad. Consequently, the display device 1 can detect an object to be detected in the peripheral region Gd. Specifically, the third electrodes 54A and 54B can expand the detection range in the array direction of the second electrodes TDL (second direction Dy).

The third electrode 54A is provided in the peripheral region Gd coupled to the flexible substrate 73. As a result, the distance between an end 55c of the third electrode 54A and an end 51e of the cover substrate 51 is larger than the distances d1 and d2 (refer to FIG. 14). Similarly to the distances d1 and d2, the distance between an end 55d of the third electrode 54B and an end 51f of the cover substrate 51 is preferably 10 µm to 100 µm, for example. The distance between the end 55d of the third electrode 54B and the end 51f of the cover substrate 51 may be larger than 100 µm.

As illustrated in FIGS. 9, 14, and 16, the third electrodes 53A and 53B and the third electrodes 54A and 54B are provided to the cover substrate 51 and disposed at a layer different from that of the first electrodes COML and the second electrodes TDL. This configuration can make the peripheral region Gd of the first substrate 21 or the second substrate 31 narrower than in a case where the third electrodes 53A and 53B and the third electrodes 54A and 54B are provided in the peripheral region Gd of the first substrate 21 or the second substrate 31. Furthermore, this configuration has less restriction in the positions of various kinds of wiring and circuits provided to the first substrate 21 or the second substrate 31.

As illustrated in FIG. 14, the lines of electric force Ef extend from the third electrodes 53A and 53B in the peripheral region Gd to the second electrodes TDL in the active area Ad. When an object to be detected is in contact with or in proximity to a portion near the outer edge of the peripheral region Gd, the number of lines of electric force Ef blocked by the object to be detected is small. As a result, the amount of change in capacitance between the third electrodes 53A and 53B and the second electrodes TDL is reduced between the contact state and the non-contact state in the peripheral region Gd. This configuration may possibly fail to provide satisfactory touch detection sensitivity.

Code Division Multiplex Drive

Figure 17:
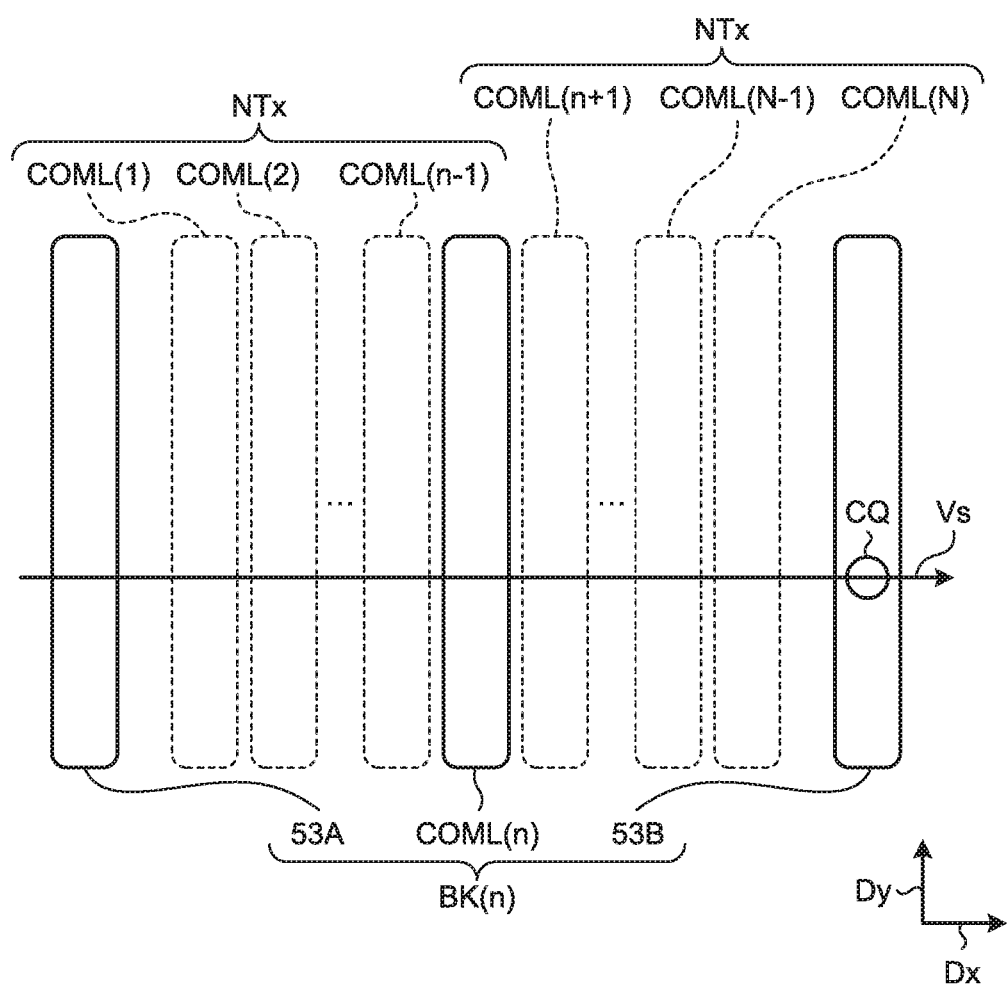
FIG. 17 is a diagram of a drive electrode block given for explanation of an operation in CDM drive.
Figure 18:
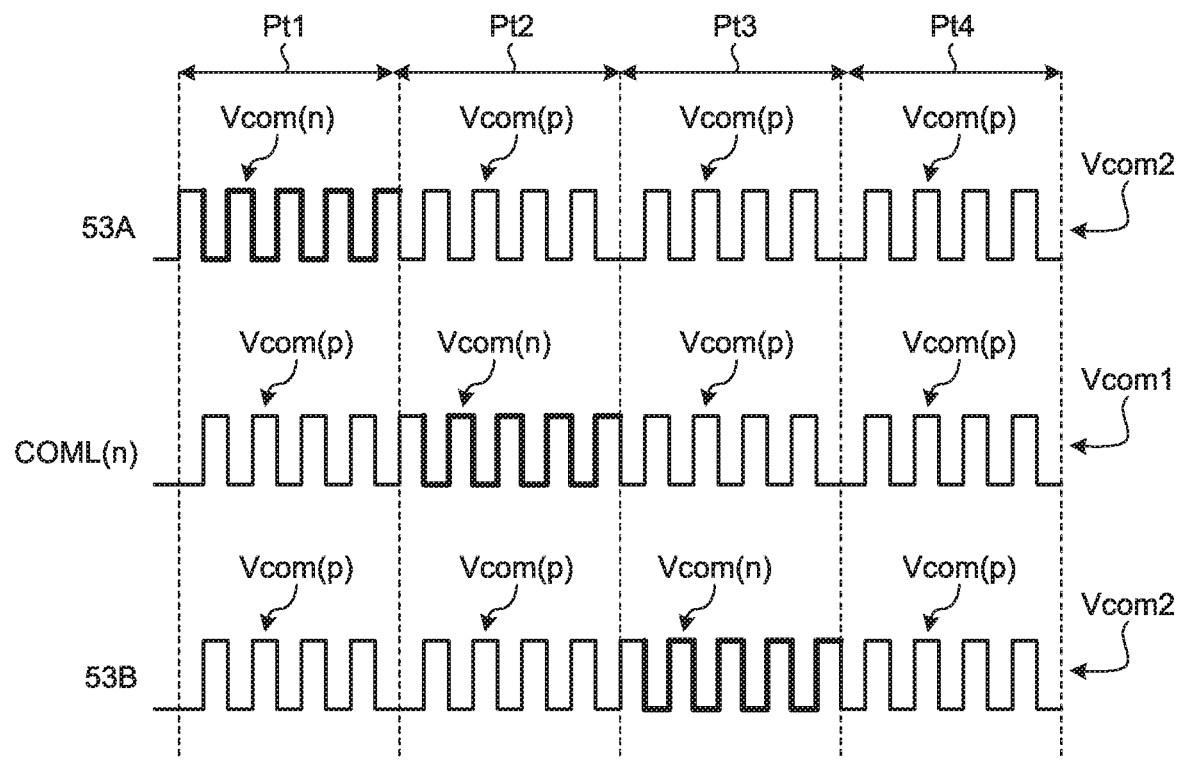
FIG. 18 is a timing waveform chart of drive signals given for explanation of the operation in CDM drive.
Figure 19:
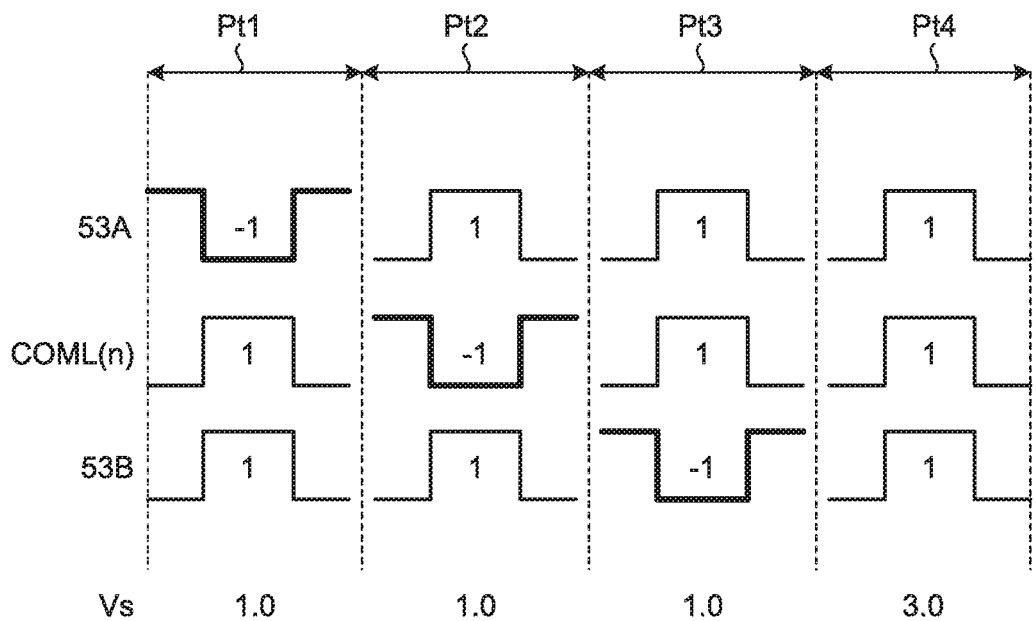
FIG. 19 is a diagram of sensor output signals in the non-contact state given for explanation of the operation in CDM drive.
Figure 20:
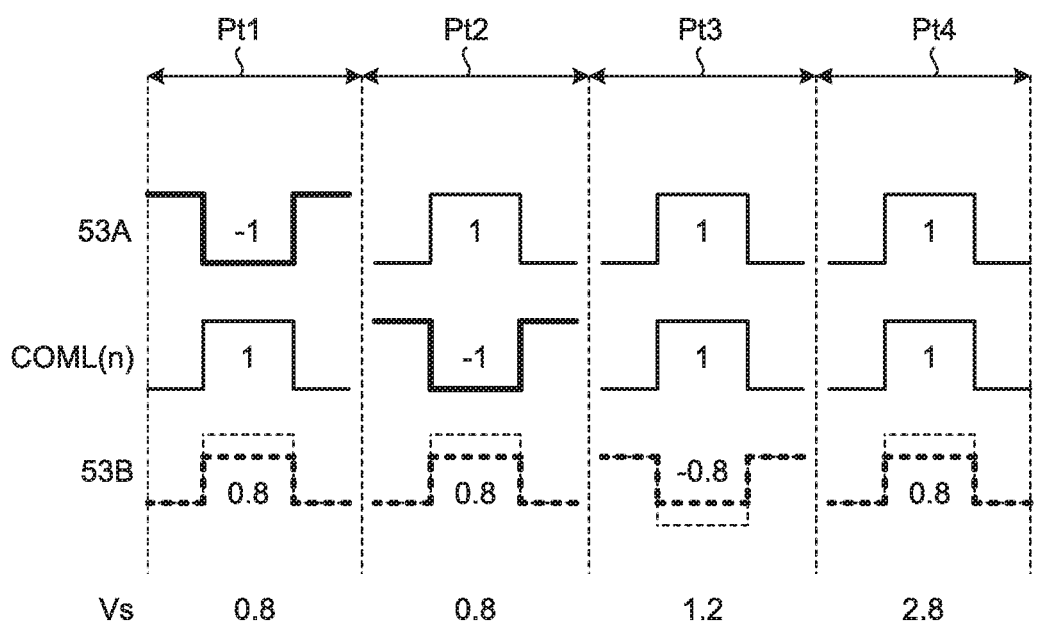
FIG. 20 is a diagram of the sensor output signals in the contact state given for explanation of the operation in CDM drive.

The following describes touch detection by code division multiplex (CDM) drive as an example of a detection operation according to the present embodiment. In the following description, code division multiplex drive is referred to as CDM drive. FIG. 17 is a diagram of a drive electrode block given for explanation of an operation in CDM drive. FIG. 18 is a timing waveform chart of the drive signals given for explanation of the operation in CDM drive. FIG. 19 is a diagram of the sensor output signals in the non-contact state given for explanation of the operation in CDM drive. FIG. 20 is a diagram of the sensor output signals in the contact state given for explanation of the operation in CDM drive.

As illustrated in FIG. 17, first electrodes COML(1), COML(2), . . . , COML(n-1), COML(n), COML (n+1), . . . , COML(N-1), and COML(N) are arrayed in the first direction Dx. In the following description, the first electrodes described above are simply referred to as the first electrodes COML when they need not be distinguished from one another. The drive scanning circuit 14C (refer to FIG. 12) sequentially selects one first electrode COML(n) out of the first electrodes COML as a first electrode COML to be driven.

The detection control circuit 11A performs CDM drive on each drive electrode block BK(n). The drive electrode block BK(n) includes three electrodes, that is, the third electrode 53A, the first electrode COML(n), and the third electrode 53B. In this case, the third electrodes 53A and 53B are always included in the drive electrode block BK(n). The first electrode COML(n) selected as a target to be driven sequentially varies from n=1 to n=N.

In the period when the first electrode COML(n) is selected, the drive scanning circuit 14C (refer to FIG. 12) does not select the first electrodes COML other than the first electrode COML(n) to be driven, that is, the first electrodes COML(1), COML(2), . . . , COML(n-1), COML (n+1), . . . , COML(N-1), and COML(N) as an electrode to be driven. In this case, the first electrodes COML(1), COML (2), . . . , COML(n-1), COML(n+1), . . . , COML(N-1), and COML(N) are included in a non-selected block NTx.

The detection control circuit 11A generates control signals based on a predetermined code. As illustrated in FIG. 18, the first drive circuit 14A supplies the drive signal Vcom1 having a phase determined based on the predetermined code to the first electrode COML(n) in the drive electrode block BK(n). Simultaneously, the second drive circuit 14B supplies the drive signals Vcom2 having a phase determined based on the predetermined code to the third electrodes 53A and 53B in the drive electrode block BK(n). The predetermined code is defined by the square matrix in Expression (1) described below, for example.

$$\begin{pmatrix} -1 & 1 & 1 & 1 \\ 1 & -1 & 1 & 1 \\ 1 & 1 & -1 & 1 \\ 1 & 1 & 1 & -1 \end{pmatrix} \quad (1)$$

The order of the square matrix is $2^k$ (k=0, 1, 2, . . . ) and simply needs to be equal to or larger than the number of electrodes included in the drive electrode block BK(n). In Expression (1), for example, the order of the square matrix is four (k=2). Diagonal elements "-1" of the square matrix in Expression (1) are different from elements "1" other than the diagonal elements in the square matrix. The element "-1" is a code for supplying the drive signals Vcom1 and Vcom2 determined to have a phase different from that of the element "1". The drive signal corresponding to the element "1" is referred to as a drive signal Vcom(p), and the drive signal corresponding to the element "-1" is referred to as a drive signal Vcom(n). The elements "1" and "-1" are included in the predetermined code.

As illustrated in FIG. 18, the drive signal Vcom(p) has the opposite phase to that of the drive signal Vcom(n). The drive signal Vcom(p) is an AC voltage signal in which a high-level voltage and a low-level voltage alternately appear. The drive signal Vcom(n) has a low-level voltage when the drive signal Vcom(p) has a high-level voltage and has a high-level voltage when the drive signal Vcom(p) has a low-level voltage. In other words, the drive signal Vcom(n) has a polarity inverted from that of the drive signal Vcom(p).

In a first period Pt1, the first drive circuit 14A and the second drive circuit 14B supply the drive signal Vcom(p) or the drive signal Vcom(n) corresponding to the first row of the square matrix in Expression (1) to the third electrode 53A, the first electrode COML(n), and the third electrode 53B. Specifically, the second drive circuit 14B supplies the drive signal Vcom(n) corresponding to the element "-1" in the first row of the first column of the square matrix to the third electrode 53A. The first drive circuit 14A supplies the drive signal Vcom(p) corresponding to the element "1" in the first row of the second column of the square matrix to the first electrode COML(n). The second drive circuit 14B supplies the drive signal Vcom(p) corresponding to the element "1" in the first row of the third column of the square matrix to the third electrode 53B.

In a second period Pt2, the first drive circuit 14A and the second drive circuit 14B supply the drive signal Vcom(p) or the drive signal Vcom(n) corresponding to the second row of the square matrix in Expression (1) to the third electrode 53A, the first electrode COML(n), and the third electrode 53B. Specifically, the second drive circuit 14B supplies the drive signal Vcom(p) corresponding to the element "1" in the second row of the first column of the square matrix to the third electrode 53A. The first drive circuit 14A supplies the drive signal Vcom(n) corresponding to the element "-1" in the second row of the second column of the square matrix to the first electrode COML(n). The second drive circuit 14B supplies the drive signal Vcom(p) corresponding to the element "1" in the second row of the third column of the square matrix to the third electrode 53B.

Similarly, in a third period Pt3, the first drive circuit 14A and the second drive circuit 14B supply the drive signal Vcom(p) or the drive signal Vcom(n) corresponding to the third row of the square matrix in Expression (1) to the third electrode 53A, the first electrode COML(n), and the third electrode 53B. In a fourth period Pt4, the first drive circuit 14A and the second drive circuit 14B supply the drive signal Vcom(p) or the drive signal Vcom(n) corresponding to the fourth row of the square matrix in Expression (1) to the third electrode 53A, the first electrode COML(n), and the third electrode 53B. In the fourth period Pt4, no electrode is provided corresponding to the element "−1" in the fourth row of the square matrix. Consequently, the first drive circuit 14A and the second drive circuit 14B supply only the drive signal Vcom(p) and does not supply the drive signal Vcom(n).

As illustrated in FIG. 18, the drive signal Vcom2 supplied to the third electrode 53A has a phase determined based on the predetermined code in the order of the drive signals Vcom(n), Vcom(p), Vcom(p), and Vcom(p). The drive signal Vcom1 supplied to the first electrode COML(n) has a phase determined based on the predetermined code in the order of the drive signals Vcom(p), Vcom(n), Vcom(p), and Vcom(p). The drive signal Vcom2 supplied to the third electrode 53B has a phase determined based on the predetermined code in the order of the drive signals Vcom(p), Vcom(p), Vcom(n), and Vcom(p).

While the amplitude of the drive signal Vcom1 is equal to that of the drive signal Vcom2 in the example illustrated in FIG. 18, the present disclosure is not limited thereto. The amplitude of the drive signal Vcom2 may be larger than that of the drive signal Vcom1, for example. In this case, the display device 1 can provide higher detection sensitivity in the peripheral region Gd.

FIG. 19 illustrates the sensor output signals Vs output when an object to be detected CQ (refer to FIG. 17) is in the non-contact state. FIG. 20 illustrates the sensor output signals Vs output when the object to be detected CQ (refer to FIG. 17) is in contact with the third electrode 53B. In FIG. 20, the voltage of difference between the sensor output signals Vs in the non-contact state and those in the contact state is assumed to be 20%. To simplify the explanation, FIG. 20 illustrates the respective sensor output signals Vs corresponding to the third electrode 53A, the first electrode COML(n), and the third electrode 53B. In the actual configuration, however, the second electrode TDL facing the third electrode 53A, the first electrode COML(n), and the third electrode 53B outputs a signal obtained by totaling these sensor output signals Vs as the sensor output signal Vs.

As illustrated in FIG. 19, the sensor output signals Vs corresponding to the third electrode 53A, the first electrode COML(n), and the third electrode 53B are "1" or "−1" in the non-contact state. In the first period Pt1, the third electrode 53A is supplied with the drive signal Vcom(n) corresponding to the element "−1". As a result, the phase of the sensor output signal Vs corresponding to the third electrode 53A is opposite to that of the sensor output signals Vs corresponding to the first electrode COML(n) and the third electrode 53B. Consequently, the sensor output signal Vs in the first period Pt1 is calculated by: (−1)+(1)+(1)=1.0.

Similarly, the sensor output signal Vs in the second period Pt2 is calculated by: (1)+(−1)±(1)=1.0. The sensor output signal Vs in the third period Pt3 is calculated by: (1)+(1)+(−1)=1.0. The sensor output signal Vs in the fourth period Pt4 is calculated by: (1)+(1)+(1)=3.0.

The coordinate extraction circuit 45 performs decoding by multiplying the sensor output signals Vs detected by the voltage detector DET by the square matrix as indicated by Expression (2) described below. As a result, the detection signal Vdet1 resulting from decoding corresponding to the third electrode 53A is calculated by: $(1.0)\times(-1)+(1.0)\times(1)+(1.0)\times(1)+(3.0)\times(1)=4.0$. Similarly, the detection signals Vdet1 resulting from decoding corresponding to the first electrode COML(n) and the third electrode 53B are each determined to be "4.0". In the example illustrated in FIG. 19, the sensor output signals Vs corresponding to the respective electrodes are assumed to be "1" or "−1". As a result, the detection signals Vdet1 corresponding to the third electrode 53A, the first electrode COML(n), and the third electrode 53B have the same value. The present disclosure is not limited thereto, and the magnitudes of the sensor output signals Vs corresponding to the respective electrodes may be different from one another. CDM drive performed when the sensor output signals Vs are different will be described later.

$$\begin{pmatrix} -1 & 1 & 1 & 1 \\ 1 & -1 & 1 & 1 \\ 1 & 1 & -1 & 1 \\ 1 & 1 & 1 & -1 \end{pmatrix} \begin{pmatrix} 1.0 \\ 1.0 \\ 1.0 \\ 3.0 \end{pmatrix} = \begin{pmatrix} 4.0 \\ 4.0 \\ 4.0 \\ 0 \end{pmatrix} \qquad (2)$$

In a case where the sensor output signal Vs corresponding to the third electrode 53B is "0.8" or "−0.8", for example, in the contact state as illustrated in FIG. 20, the amplitude of the sensor output signal Vs corresponding to the third electrode 53B is smaller than that of the sensor output signals Vs corresponding to the third electrode 53A and the first electrode COML(n). If CDM drive is not performed, for example, the difference of the sensor output signals Vs between the contact state and the non-contact state is calculated by: (1)−(0.8)=0.2. By contrast, if CDM drive is performed, detection is performed four times. In other words, the difference of the sensor output signals Vs is calculated by: 0.2×4=0.8, and the detection sensitivity increases by four times.

Specifically, in the first period Pt1, the third electrode 53A is supplied with the drive signal Vcom(n) corresponding to the element "−1". As a result, the phase of the sensor output signal Vs corresponding to the third electrode 53A is opposite to that of the sensor output signals Vs corresponding to the first electrode COML(n) and the third electrode 53B. Consequently, the sensor output signal Vs in the first period Pt1 is calculated by: (−1)±(1)+(0.8)=0.8.

Similarly, the sensor output signal Vs in the second period Pt2 is calculated by: (1)+(−1)+(0.8)=0.8. The sensor output signal Vs in the third period Pt3 is calculated by: (1)+(1)+(−0.8)=1.2. The sensor output signal Vs in the fourth period Pt4 is calculated by: (1)+(1)+(0.8)=2.8.

The coordinate extraction circuit 45 performs decoding on the sensor output signals Vs detected by the voltage detector DET as indicated by Expression (3). As a result, the detection signal Vdet1 resulting from decoding corresponding to the third electrode 53A is calculated by: $(0.8)\times(-1)+(0.8)\times(1)+(1.2)\times(1)+(2.8)\times(1)=4.0$. Similarly, the detection signals Vdet1 resulting from decoding corresponding to the first electrode COML(n) and the third electrode 53B are determined to be "4.0" and "3.2", respectively. The values of the detection signals Vdet1 corresponding to the third electrode 53A and the first electrode COML(n) are equal to those in Expression (2). By contrast, the value of the detection signal Vdet1 corresponding to the third electrode 53B with which the object to be detected CQ is in contact is smaller than "4.0", which is the value of the detection signal Vdet1 corresponding to the third electrode 53B in the non-contact state. The coordinate extraction circuit 45 thus can calculate the position of the object to be detected CQ in the peripheral region Gd based on the detection signals Vdet1 resulting from decoding.

$$\begin{pmatrix} -1 & 1 & 1 & 1 \\ 1 & -1 & 1 & 1 \\ 1 & 1 & -1 & 1 \\ 1 & 1 & 1 & -1 \end{pmatrix} \begin{pmatrix} 0.8 \\ 0.8 \\ 1.2 \\ 2.8 \end{pmatrix} = \begin{pmatrix} 4.0 \\ 4.0 \\ 3.2 \\ 0 \end{pmatrix} \quad (3)$$

As described above, the voltage of difference between the contact state and the non-contact state increases from 0.2 (=1.0−0.8) to 0.8 (=4.0−3.2). In other words, the detection sensitivity increases by four times. Consequently, the display device 1 according to the present embodiment can satisfactorily detect the object to be detected CQ in contact with or in proximity to the peripheral region Gd.

If a noise signal from the outside is detected, the magnitude of the noise signal resulting from decoding increases by the half power with respect to the detection signal Vdet1. In other words, the magnitude of the noise signal resulting from decoding is twice (=√4) the magnitude prior to decoding in the example described above. As described above, the noise signal resulting from decoding is reduced compared with the detection signal Vdet1, thereby increasing the signal-to-noise (S/N) ratio. By performing CDM drive, the display device 1 can detect the object to be detected CQ in the peripheral region Gd with higher detection sensitivity than in a case where it performs time-division multiplex drive without raising the voltage of the drive signal Vcom2.

Figure 21:
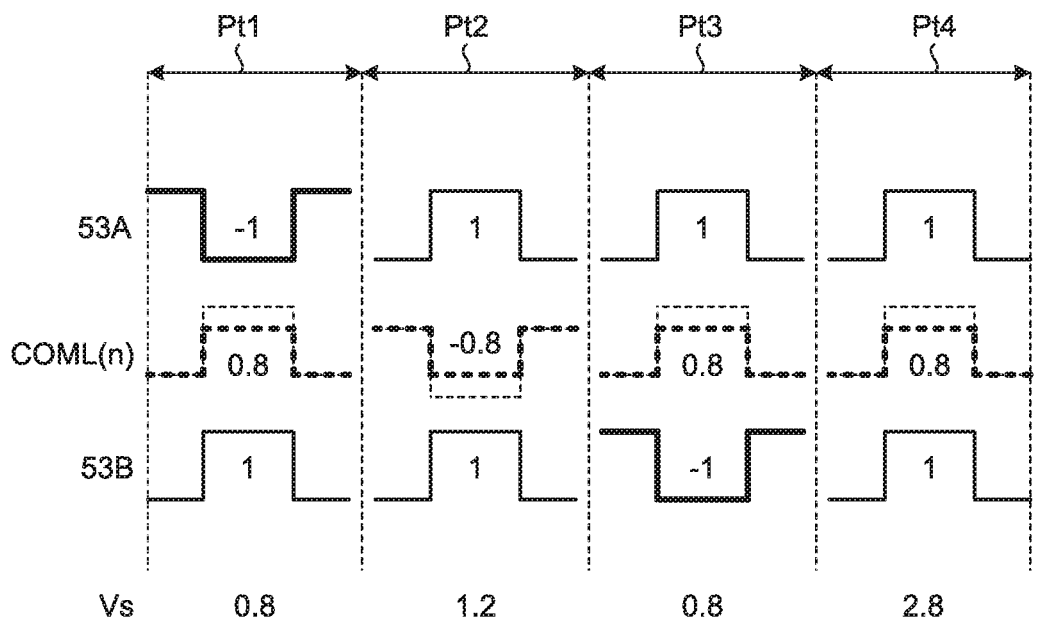
FIG. 21 is an explanatory diagram of the sensor output signals obtained when an object to be detected is in contact with or in proximity to the first electrode.
Figure 22:
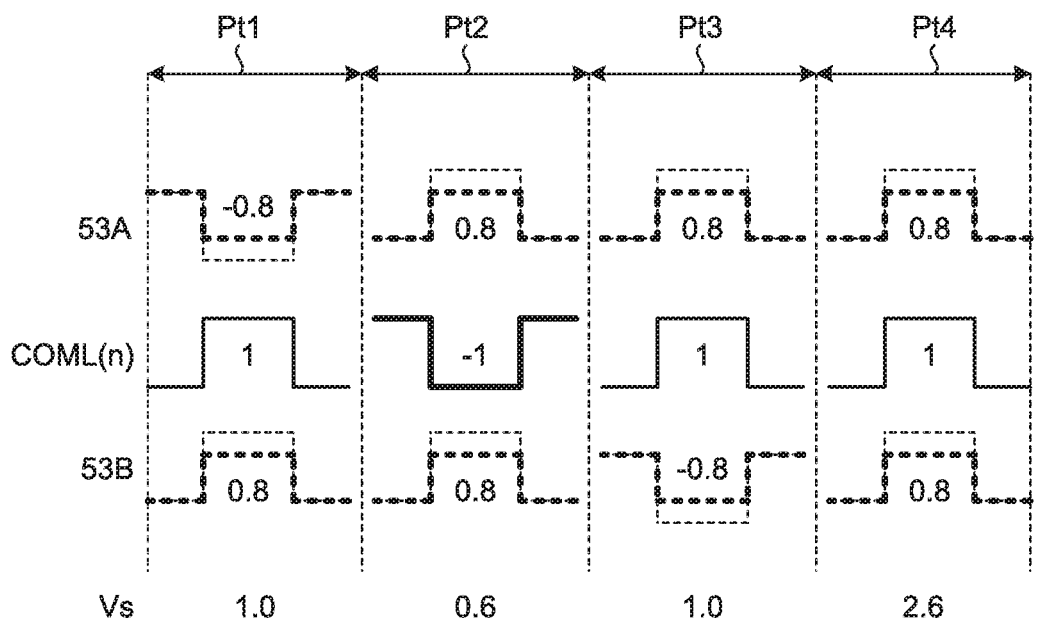
FIG. 22 is an explanatory diagram of the sensor output signals obtained when an object to be detected is in contact with or in proximity to two third electrodes.

While FIG. 20 illustrates a case where the object to be detected CQ (refer to FIG. 17) is in contact with the third electrode 53B, the display device 1 can perform detection by CDM drive even in a case where the object to be detected CQ is in contact with (or in proximity to) other electrodes. FIG. 21 is an explanatory diagram of the sensor output signals obtained when the object to be detected is in contact with or in proximity to the first electrode. FIG. 22 is an explanatory diagram of the sensor output signals obtained when the object to be detected is in contact with or in proximity to the two third electrodes.

As illustrated in FIG. 21, when the object to be detected CQ is in contact with the first electrode COML(n), the amplitude of the sensor output signal Vs corresponding to the first electrode COML(n) decreases. In FIG. 21, the sensor output signal Vs corresponding to the first electrode COML(n) is "0.8" or "−0.8", for example.

The sensor output signal Vs in the first period Pt1 is calculated by: (−1)+(0.8)+(1)=0.8. Similarly, the sensor output signal Vs in the second period Pt2 is calculated by: (1)+(−0.8)+(1)=1.2. The sensor output signal Vs in the third period Pt3 is calculated by: (1)+(0.8)+(−1)=0.8. The sensor output signal Vs in the fourth period Pt4 is calculated by: (1)+(0.8)+(1)=2.8.

The coordinate extraction circuit 45 performs decoding on the sensor output signals Vs as indicated by Expression (4). As a result, the detection signal Vdet1 resulting from decoding corresponding to the third electrode 53A is calculated by: (0.8)×(−1)+(1.2)×(1)+(0.8)×(1)+(2.8)×(1)=4.0. The detection signal Vdet1 resulting from decoding corresponding to the first electrode COML(n) is calculated by: (0.8)×(1)+(1.2)×(−1)+(0.8)×(1)+(2.8)×(1)=3.2. Similarly, the detection signal Vdet1 resulting from decoding corresponding to the third electrode 53B is determined to be "4.0". The values of the detection signals Vdet1 corresponding to the third electrodes 53A and 53B are equal to those in Expression (2). By contrast, the value of the detection signal Vdet1 corresponding to the first electrode COML(n) with which the object to be detected CQ is in contact is smaller than "4.0", which is the value of the detection signal Vdet1 corresponding thereto in the non-contact state. The coordinate extraction circuit 45 thus can calculate the position of the object to be detected CQ in the active area Ad based on the detection signals Vdet1 resulting from decoding.

$$\begin{pmatrix} -1 & 1 & 1 & 1 \\ 1 & -1 & 1 & 1 \\ 1 & 1 & -1 & 1 \\ 1 & 1 & 1 & -1 \end{pmatrix} \begin{pmatrix} 0.8 \\ 1.2 \\ 0.8 \\ 2.8 \end{pmatrix} = \begin{pmatrix} 4.0 \\ 3.2 \\ 4.0 \\ 0 \end{pmatrix} \quad (4)$$

As illustrated in FIG. 22, when the object to be detected CQ is in contact with or in proximity to the third electrodes 53A and 53B simultaneously, the amplitudes of the respective sensor output signals Vs corresponding to the third electrodes 53A and 53B decrease. Also in FIG. 22, the sensor output signals Vs corresponding to the third electrodes 53A and 53B are "0.8" or "−0.8", for example.

The sensor output signal Vs in the first period Pt1 is calculated by: (−0.8)+(1)+(0.8)=1.0. Similarly, the sensor output signal Vs in the second period Pt2 is calculated by: (0.8)+(−1)+(0.8)=0.6. The sensor output signal Vs in the third period Pt3 is calculated by: (0.8)+(1)+(−0.8)=1.0. The sensor output signal Vs in the fourth period Pt4 is calculated by: (0.8)+(1)+(0.8)=2.6.

The coordinate extraction circuit 45 performs decoding on the sensor output signals Vs as indicated by Expression (5). As a result, the detection signal Vdet1 resulting from decoding corresponding to the third electrode 53A is calculated by: (1.0)×(−1)±(0.6)×(1)+(1.0)×(1)+(2.6)×(1)=3.2. The detection signal Vdet1 resulting from decoding corresponding to the first electrode COML(n) is expressed by: (1.0)×(1)±(0.6)×(−1)+(1.0)×(1)+(2.6)×(1)=4.0. Similarly, the detection signal Vdet1 resulting from decoding corresponding to the third electrode 53B is calculated by: (1.0)×(1)±(0.6)×(1)+(1.0)×(−1)+(2.6)×(1)=3.2. The value of the detection signal Vdet1 corresponding to the first electrode COML(n) is equal to that in Expression (2). By contrast, the values of the detection signals Vdet1 corresponding to the third electrodes 53A and 53B with which the object to be detected CQ is in contact is smaller than "4.0", which is the value of the detection signals Vdet1 corresponding thereto in the non-contact state. The coordinate extraction circuit 45 thus can calculate the position of the object to be detected CQ in contact with the two third electrodes 53A and 53B simultaneously based on the detection signals Vdet1 resulting from decoding.

$$\begin{pmatrix} -1 & 1 & 1 & 1 \\ 1 & -1 & 1 & 1 \\ 1 & 1 & -1 & 1 \\ 1 & 1 & 1 & -1 \end{pmatrix} \begin{pmatrix} 1.0 \\ 0.6 \\ 1.0 \\ 2.6 \end{pmatrix} = \begin{pmatrix} 3.2 \\ 4.0 \\ 3.2 \\ 0 \end{pmatrix} \quad (5)$$

In FIGS. 19 to 22, the sensor output signals Vs corresponding to the third electrodes 53A and 53B have the same amplitude as that of the sensor output signal Vs corresponding to the first electrode COML(n) to simplify the explanation. In the actual configuration, the sensor output signals Vs corresponding to the third electrodes 53A and 53B may possibly have an amplitude different from that of the sensor output signal Vs corresponding to the first electrode COML (n) because the third electrodes 53A and 53B are provided in the peripheral region Gd.

Figure 23:
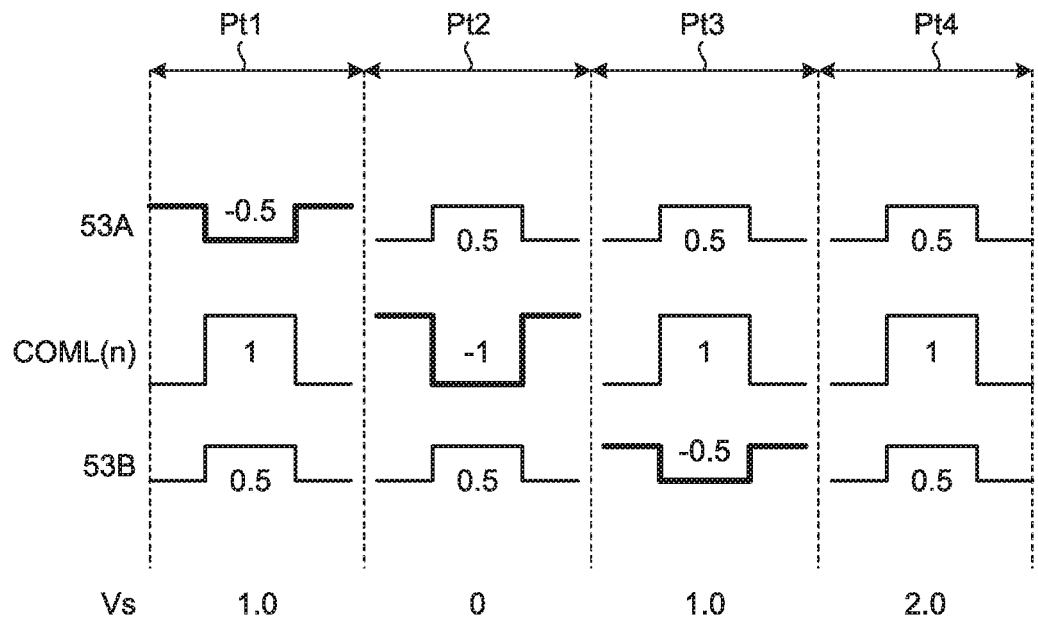
FIG. 23 is a diagram of the sensor output signals in the non-contact state given for explanation of a second example of the operation in CDM drive.
Figure 24:
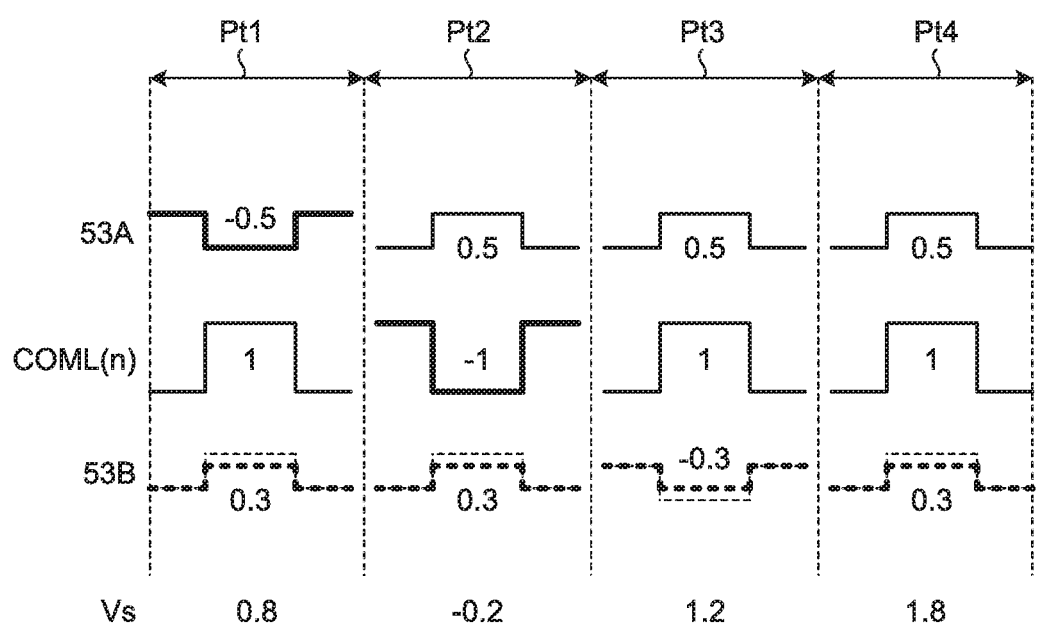
FIG. 24 is a diagram of the sensor output signals in the contact state given for explanation of the second example of the operation in CDM drive.

FIG. 23 is a diagram of the sensor output signals in the non-contact state given for explanation of a second example of the operation in CDM drive. FIG. 24 is a diagram of the sensor output signals in the contact state given for explanation of the second example of the operation in CDM drive. In FIGS. 23 and 24, the sensor output signals Vs corresponding to the third electrodes 53A and 53B are assumed to be "0.5" or "−0.5" when the sensor output signal Vs corresponding to the first electrode COML(n) is "1" or "−1". In FIGS. 19 to 22, the sensor output signals Vs corresponding to the third electrodes 53A and 53B are the same as that corresponding to the first electrode COML(n). By contrast, in FIGS. 23 and 24, the absolute value of the sensor output signals Vs corresponding to the third electrodes 53A and 53B is smaller than that of the first electrode COML(n).

As illustrated in FIG. 23, in the first period Pt1, the third electrode 53A is supplied with the drive signal Vcom(n) corresponding to the element "−1". As a result, the phase of the sensor output signal Vs corresponding to the third electrode 53A is opposite to that of the sensor output signals Vs corresponding to the first electrode COML(n) and the third electrode 53B. Consequently, the sensor output signal Vs in the first period Pt1 in the non-contact state is calculated by: (−0.5)+(1)+(0.5)=1.0.

Similarly, the sensor output signal Vs in the second period Pt2 is calculated by: (0.5)+(−1.0)+(0.5)=0. The sensor output signal Vs in the third period Pt3 is calculated by: (0.5)+(1.0)+(−0.5)=1.0. The sensor output signal Vs in the fourth period Pt4 is calculated by: (0.5)+(1.0)+(0.5)=2.0.

The coordinate extraction circuit 45 performs decoding by multiplying the sensor output signals Vs detected by the voltage detector DET by the square matrix in Expression (6) described below. As a result, the detection signal Vdet1 resulting from decoding corresponding to the third electrode 53A is calculated by: (1.0)×(−1)±(0)×(1)+(1.0)×(1)±(2.0)×(1)=2.0. Similarly, the detection signals Vdet1 resulting from decoding corresponding to the first electrode COML(n) and the third electrode 53B are determined to be "4.0" and "2.0", respectively.

$$\begin{pmatrix} -1 & 1 & 1 & 1 \\ 1 & -1 & 1 & 1 \\ 1 & 1 & -1 & 1 \\ 1 & 1 & 1 & -1 \end{pmatrix} \begin{pmatrix} 1.0 \\ 0 \\ 1.0 \\ 2.0 \end{pmatrix} = \begin{pmatrix} 2.0 \\ 4.0 \\ 2.0 \\ 0 \end{pmatrix} \quad (6)$$

As illustrated in FIG. 24, the sensor output signal Vs corresponding to the third electrode 53B is "0.3" or "−0.3" in the contact state. The amplitude of the sensor output signal Vs corresponding to the third electrode 53B is smaller than that of the sensor output signals Vs corresponding to the third electrode 53A and the first electrode COML(n). The sensor output signal Vs in the first period Pt1 is calculated by: (−0.5)+(1.0)+(0.3)=0.8. The sensor output signal Vs in the second period Pt2 is calculated by: (0.5)+(−1.0)+(0.3)=−0.2. The sensor output signal Vs in the third period Pt3 is calculated by: (0.5)+(1.0)+(−0.3)=1.2. The sensor output signal Vs in the fourth period Pt4 is calculated by: (0.5)+(1.0)+(0.3)=1.8.

The coordinate extraction circuit 45 performs decoding by multiplying the sensor output signals Vs detected by the voltage detector DET by the square matrix in Expression (7) described below. As a result, the detection signal Vdet1 resulting from decoding corresponding to the third electrode 53A is calculated by: (0.8)×(−1)+(−0.2)×(1)+(1.2)×(1)+(1.8)×(1)=2.0. Similarly, the detection signals Vdet1 resulting from decoding corresponding to the first electrode COML(n) and the third electrode 53B are determined to be "4.0" and "1.2", respectively.

$$\begin{pmatrix} -1 & 1 & 1 & 1 \\ 1 & -1 & 1 & 1 \\ 1 & 1 & -1 & 1 \\ 1 & 1 & 1 & -1 \end{pmatrix} \begin{pmatrix} 0.8 \\ -0.2 \\ 1.2 \\ 1.8 \end{pmatrix} = \begin{pmatrix} 2.0 \\ 4.0 \\ 1.2 \\ 0 \end{pmatrix} \quad (7)$$

The values of the detection signals Vdet1 corresponding to the third electrode 53A and the first electrode COML(n) are equal to those in Expression (6). By contrast, the value of the detection signal Vdet1 corresponding to the third electrode 53B with which the object to be detected CQ is in contact is determined to be "1.2" and smaller than "2.0", which is the value of the detection signal Vdet1 corresponding thereto in the non-contact state. The coordinate extraction circuit 45 thus can calculate the position of the object to be detected CQ in the peripheral region Gd based on the detection signals Vdet1 resulting from decoding.

As described above, the third electrodes 53A and 53B are provided in a region and a layer different from those of the first electrode COML(n). The third electrodes 53A and 53B output the sensor output signals Vs having values different from that of the sensor output signal Vs corresponding to the first electrode COML(n). Also in this case, the voltage of difference between the contact state and the non-contact state increases from 0.2 (=0.5−0.3) to 0.8 (=2.0−1.2). In other words, the detection sensitivity increases by four times. By performing CDM drive on the third electrodes 53A and 53B and the first electrode COML(n), the display device 1 according to the present embodiment can satisfactorily detect the object to be detected CQ in contact with or in proximity to the peripheral region Gd.

The square matrix in Expressions (1) to (7) is given by way of example only, and another square matrix may be used. The display device 1 may use a square matrix M represented by Expression (8), for example. The square matrix M is a Hadamard matrix. The Hadamard matrix is a square matrix the elements of which are either "1" or "−1" and certain two different rows of which are an orthogonal matrix.

$$M = \begin{pmatrix} 1 & 1 & 1 & 1 \\ 1 & 1 & -1 & -1 \\ 1 & -1 & 1 & -1 \\ 1 & -1 & -1 & 1 \end{pmatrix} \quad (8)$$

Figure 25:
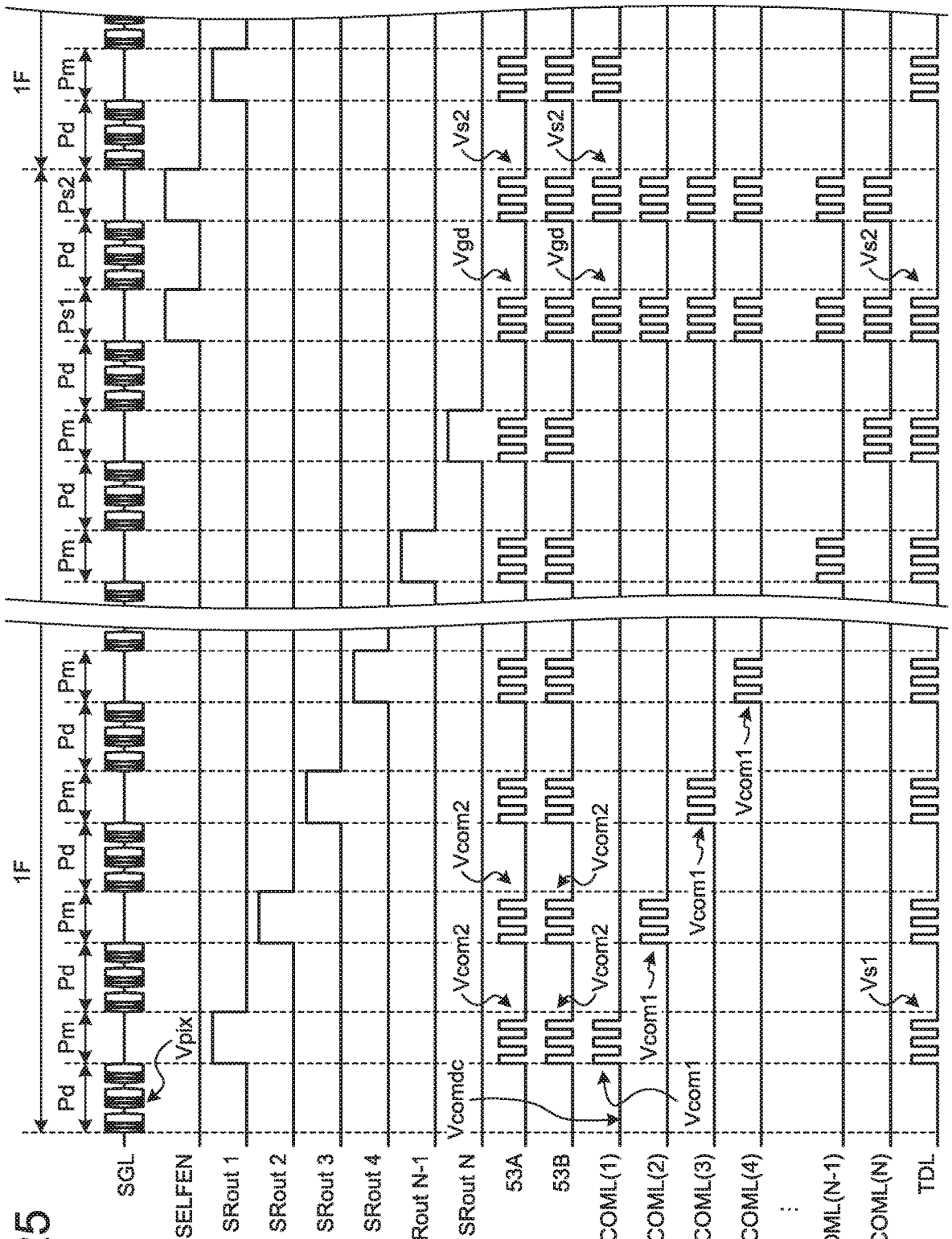
FIG. 25 is a timing waveform chart of an exemplary operation performed by the display device according to the first embodiment.

The following describes an exemplary operation performed by the display device 1 according to the present embodiment. FIG. 25 is a timing waveform chart of an exemplary operation performed by the display device according to the first embodiment.

The display device 1 performs a touch detection operation (detection period) and a display operation (display period) in a time-division manner. The display device 1 may perform the touch detection operation and the display operation in any division manner. The following describes a case where the display device 1 performs touch detection and display in a time-division manner in one frame period 1F of the display panel 10, that is, in a time required to display video information of one screen, for example.

As illustrated in FIG. 25, a plurality of display periods Pd and a plurality of detection periods Pm, Ps1, and Ps2 are alternately arranged. The display periods Pd and the detection periods Pm, Ps1, and Ps2 are switched based on the control signals supplied from the control circuit 11 (refer to FIG. 1).

In the display period Pd, the control circuit 11 supplies the control signals to the gate driver 12 and the source driver 13 (refer to FIG. 1). The gate driver 12 applies the scanning signals Vscan to the switching elements Tr via the gate lines GCL. The source driver 13 supplies the pixel signals Vpix to the pixels Pix via the signal lines SGL. FIG. 25 illustrates the video signals of each color of RGB as the pixel signals Vpix. The sub-pixels SPix corresponding to the respective colors of RGB are selected, and the video signals of each color are supplied to the selected sub-pixels SPix. The display device 1 thus performs the image display operation.

The first electrodes COML according to the present embodiment also serve as the common electrodes of the display panel 10. As illustrated in FIG. 25, the first drive circuit 14A supplies the drive signals Vcomdc serving as a common potential for display drive to all the first electrodes COML in the active area Ad in the display period Pd. The second electrodes TDL are supplied with no voltage signal, thereby being brought into a floating state where their electric potential is not fixed.

The detection periods Pm and the detection periods Ps1 and Ps2 are switched based on a control signal SELFEN supplied from the control circuit 11. The control signal SELFEN switches between the mutual capacitance detection mode and the self-capacitance detection mode. In the detection period Pm, the display device 1 performs the mutual capacitance touch detection described above. In one detection period Pm including the first period Pt1 to the fourth period Pt4 (refer to FIGS. 18 to 20), CDM drive is performed on the drive electrode block BK(n). In the detection periods Ps1 and Ps2, the display device 1 performs the self-capacitance touch detection described above. In the example illustrated in FIG. 25, one frame period 1F includes two detection periods Ps1 and Ps2.

The drive scanning circuit 14C (refer to FIG. 12) selects one of the first electrodes COML as a target to be driven in each detection period Pm. Specifically, the drive scanning circuit 14C sequentially selects the first electrodes COML (1), COML(2), COML(3), COML(4), . . . , COML(N–1), and COML(N) corresponding to scanning signals SRout1, SRout2, SRout3, SRout4, . . . , SRoutN–1, and SRoutN, respectively. The third electrodes 53A and 53B are driven in all the detection periods Pm. As a result, three electrodes, that is, the third electrodes 53A and 53B and the first electrode COML(n) (n=1, 2, . . . , and N) are selected as the drive electrode block BK(n) (refer to FIG. 17) in each detection period Pm.

In the detection period Pm, the first drive circuit 14A supplies the drive signal Vcom1 to the first electrode COML (n) included in the drive electrode block BK(n). In the same period, the second drive circuit 14B supplies the drive signals Vcom2 to the third electrodes 53A and 53B. The display device 1 performs the CDM drive described above, thereby detecting touch made by an object to be detected in the peripheral region Gd based on the sensor output signals Vs1 from the second electrodes TDL. The first drive circuit 14A sequentially supplies the drive signals Vcom1 to different first electrodes COML in the respective detection periods Pm. The display device 1 thus detects touch made by an object to be detected in the active area Ad.

The present embodiment performs CDM drive on the first electrode COML and the third electrodes 53A and 53B simultaneously. With this mechanism, the present embodiment requires no independent period for performing touch detection in the peripheral region Gd. The second drive circuit 14B supplies the drive signals Vcom2 to the same third electrodes 53A and 53B in all the detection periods Pm. In one frame period 1F, the number of detection periods Pm in which the third electrodes 53A and 53B are driven, that is, the number of times of touch detection performed on the peripheral region Gd is equal to the number of first electrodes COML. In a case where the number of first electrodes COML is N, for example, the third electrodes 53A and 53B are driven in N detection periods Pm. This mechanism can increase the S/N ratio by $\sqrt{N}$ times without increasing output of the drive signal Vcom2. Consequently, the display device 1 according to the present embodiment can provide high detection performance in touch detection in the peripheral region Gd.

If the detection operation for one detection surface is finished in the detection period Pm, the control circuit 11 performs self-capacitance touch detection. One detection surface corresponds to the whole surface of the active area Ad and the peripheral region Gd provided with at least the third electrodes 53A and 53B. The detection operation for one detection surface indicates sequentially supplying the drive signals Vcom1 and Vcom2 to all the drive electrode blocks BK(n) to perform touch detection.

In the detection periods Ps1 and Ps2, the detection control circuit 11A included in the detection IC 18 mainly performs self-capacitance touch detection. In the detection period Ps1, the second drive circuit 14B supplies the drive signals VcomA to the second electrodes TDL based on the control signals supplied from the detection control circuit 11A. The second electrodes TDL output sensor output signals Vs2 corresponding to capacitance changes in the second electrodes TDL to the voltage detector DET. In the detection period Ps1, the display device 1 calculates the position of an object to be detected in the array direction of the second electrodes TDL, that is, in the second direction Dy (refer to FIG. 11).

In the detection period Ps1, the second drive circuit 14B supplies the guard signals Vgd to all the first electrodes COML and the third electrodes 53A and 53B. The guard signal Vgd is a voltage signal synchronized with the drive signal VcomA and having the same electric potential as that of the drive signal VcomA. As a result, the first electrodes COML and the third electrodes 53A and 53B are driven at the same electric potential as that of the second electrodes TDL. This mechanism can reduce stray capacitance generated between the switching elements Tr and the various kinds of wiring provided to the first substrate 21 and the second electrodes TDL.

In the detection period Ps2, the second drive circuit 14B supplies the drive signals VcomB to the first electrodes COML and the third electrodes 53A and 53B based on the control signals supplied from the detection control circuit 11A. The first electrodes COML output the sensor output signals Vs2 corresponding to capacitance changes in the first electrodes COML to the voltage detector DET. The third electrodes 53A and 53B output the sensor output signals Vs2 corresponding to capacitance changes in the third electrodes 53A and 53B to the voltage detector DET. In the detection period Ps2, the display device 1 calculates the position of an object to be detected in the array direction of the first electrodes COML and the third electrodes 53A and 53B, that is, in the first direction Dx (refer to FIG. 11). As described above, the first electrodes COML and the third electrodes 53A and 53B serve as detection electrodes in self-capacitance touch detection.

In the detection period Ps2, the second drive circuit 14B may supply the guard signals Vgd to the third electrodes 53A and 53B. The guard signal Vgd is a voltage signal synchronized with the drive signal VcomB and having the same electric potential as that of the drive signal VcomB. As a result, the third electrodes 53A and 53B are driven at the same electric potential as that of the first electrodes COML. In this case, the first electrodes COML serve as detection electrodes, and the third electrodes 53A and 53B serve as guard electrodes. This mechanism can reduce stray capacitance in the first electrodes COML. The second drive circuit 14B may supply no voltage signal to the second electrodes TDL, thereby bringing them into a floating state. Alternatively, the second drive circuit 14B may supply voltage signals having a fixed potential to the second electrodes TDL.

In the detection periods Pm and the detection periods Ps1 and Ps2, the signal lines SGL are preferably in a floating state. This mechanism can reduce capacitance formed between the second electrodes TDL and the signal lines SGL. In the detection periods Ps1 and Ps2, the gate lines GCL may be in a floating state.

The exemplary operation illustrated in FIG. 25 is given by way of example only and may be appropriately modified. The display device 1, for example, may perform CDM drive on one drive electrode block BK(n) during a plurality of detection periods Pm. Alternatively, the display device 1 may perform CDM drive on a plurality of drive electrode blocks BK(n) in one detection period Pm. The lengths (widths) of the display period Pd and the detection periods Pm, Ps1, and Ps2 are schematic ones and may be equal to or different from one another. While the detection operation for one detection surface is performed in one frame period 1F, it may be performed during a plurality of frame periods 1F.

Figure 26:
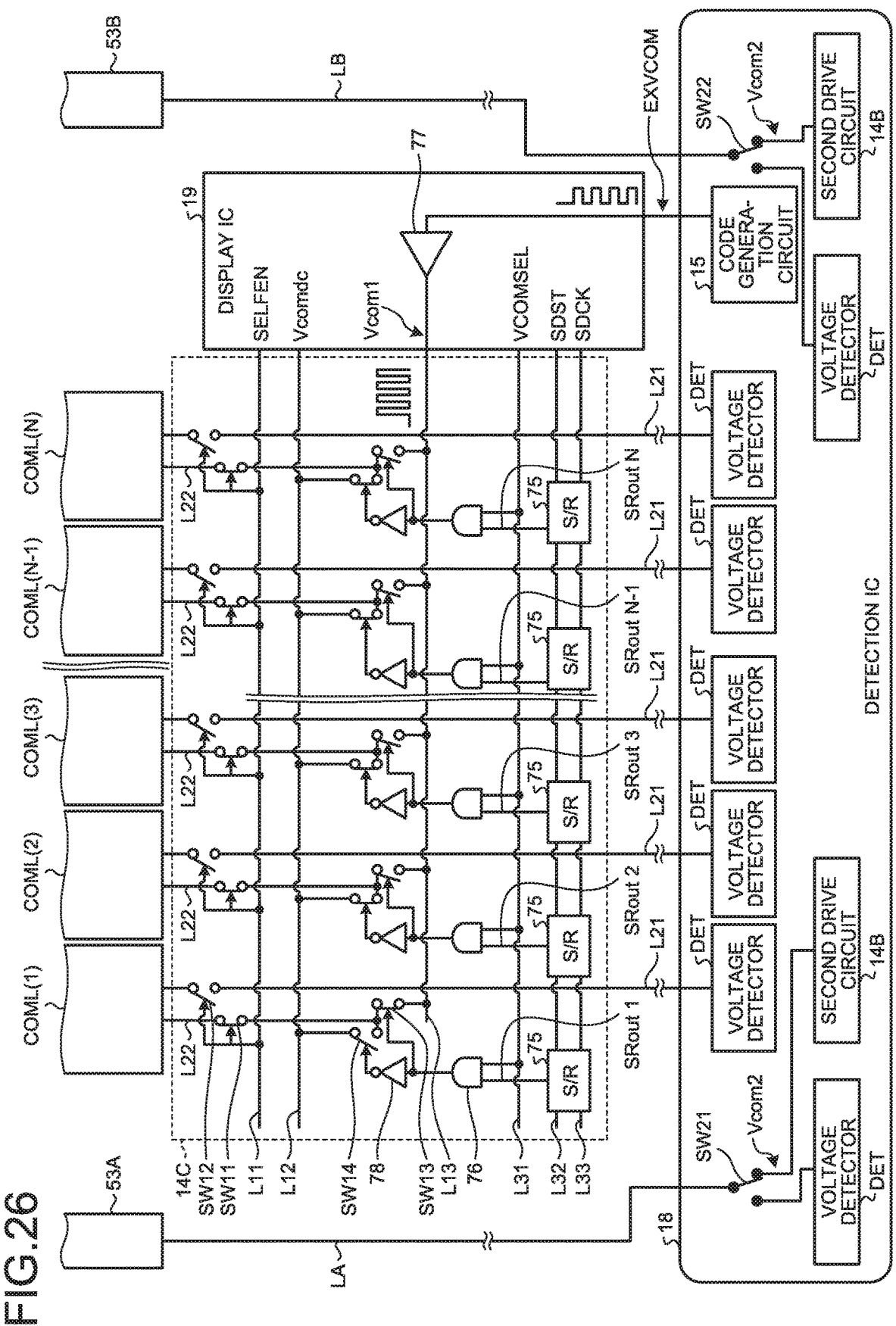
FIG. 26 is a circuit diagram of a drive circuit according to the first embodiment.

The following describes an example of the drive circuit according to the present embodiment. FIG. 26 is a circuit diagram of the drive circuit according to the first embodiment. As illustrated in FIG. 26, the first electrodes COML(1), COML(2), COML(3), . . . , COML(N-1), and COML(N) are coupled to the drive scanning circuit 14C. The drive scanning circuit 14C sequentially selects the first electrodes COML based on the various kinds of control signals output from the display IC 19. The third electrodes 53A and 53B are coupled to the detection IC 18 not via the drive scanning circuit 14C but via the wires LA and LB, respectively.

The first electrodes COML can be coupled to the detection IC 18 via respective wires L21. The first electrodes COML can be supplied with the display drive signals Vcomdc or the detection drive signals Vcom1 via respective wires L22. The wire L21 is provided with a switch SW12, and the wire L22 is provided with a switch SW11.

The display IC 19 supplies the control signal SELFEN to the switches SW11 and SW12 via a wire L11. The switches SW11 and SW12 are turned on and off based on the control signal SELFEN. If the control signal SELFEN is at a high level, the switch SW12 is turned on, and the switch SW11 is turned off. If the control signal SELFEN is at a low level, the switch SW12 is turned off, and the switch SW11 is turned on. If the control signal SELFEN is at a high level, the first electrodes COML are coupled to the detection IC 18 via the respective wires L21. In this case, the sensor output signals Vs2 corresponding to capacitance changes in the first electrodes COML are supplied to the respective voltage detectors DET in the detection IC 18. The display device 1 thus performs the self-capacitance touch detection described above.

If the control signal SELFEN is at a low level, the first electrodes COML are coupled to the display IC 19 via the respective wires L22. The wire L22 is provided with a switch SW13 and a switch SW14. The switch SW14 is provided between the wire L12 and the wire L22. If the switch SW14 is turned on, the display IC 19 supplies the display drive signal Vcomdc to the first electrode COML via the wire L12, the switch SW14, and the wire L22. If the switch SW13 is turned on, the display IC 19 supplies the detection drive signal Vcom1 to the first electrode COML via the wire L13, the switch SW13, and the wire L22.

Shift registers 75 and AND circuits 76 are provided corresponding to the respective first electrodes COML. The display IC 19 supplies a scanning start signal SDST to the shift register 75 via a wire L32. The display IC 19 also supplies a clock signal SDCK to the shift register 75 via a wire L33. The shift register 75 starts scanning using the scanning start signal SDST as a trigger. The shift registers 75 sequentially supply scanning signals SRout1, SRout2, SRout3, . . . , SRoutN-1, and SRoutN synchronized with the clock signal SDCK to the respective AND circuits 76.

The display IC 19 supplies a selection signal VCOMSEL to the AND circuit 76 via a wire L31. The AND circuit 76 calculates the logical product (AND) of the scanning signal SRout and the selection signal VCOMSEL and outputs it to the switches SW13 and SW14. The operations of the switches SW13 and SW14 are controlled based on the signal supplied from the AND circuit 76. Specifically, an inverter 78 is provided between the AND circuit 76 and the switch SW14. The inverter 78 supplies, to the switch SW14, a signal obtained by inverting the voltage level of the output signal supplied from the AND circuit 76. The output signal from the AND circuit 76 is supplied to the switch SW13, and the signal obtained by inverting the voltage level of the output signal by the inverter 78 is supplied to the switch SW14. If the scanning signal SRout and the selection signal VCOMSEL are at a high level, the switch SW13 is turned on, and the switch SW14 is turned off. As a result, the drive signal Vcom1 is supplied to the selected first electrode COML via the wire L13, the switch SW13, and the wire L22. If at least one of the scanning signal SRout and the selection signal VCOMSEL is at a low level, the switch SW13 is turned off, and the switch SW14 is turned on. As a result, the drive signal Vcomdc is supplied to the non-selected first electrode COML via the wire L12, the switch SW14, and the wire L22.

In the example illustrated in FIG. 26, the switch SW13 corresponding to the first electrode COML(1) is turned on, and the switch SW14 corresponding thereto is turned off. All the switches SW13 corresponding to the other first electrodes COML(2) to COML(N) are turned off, and all the switches SW14 corresponding thereto are turned on. In this case, the first electrode COML(1) is selected as the drive electrode block BK(n) (refer to FIG. 17) and supplied with the drive signal Vcom1 via the wire L13. The other first electrodes COML are included in the non-selected block NTx (refer to FIG. 17) and supplied with the drive signal Vcomdc via the wire L12.

As illustrated in FIG. 26, the detection IC 18 includes a code generation circuit 15. The code generation circuit 15 generates an input logic signal EXVCOM having a phase determined corresponding to the code of the square matrix described above (refer to Expression (1) and other expressions). The code generation circuit 15 supplies the input logic signal EXVCOM to the display IC 19. An amplifier 77 of the display IC 19 amplifies the input logic signal EXVCOM to generate the drive signal Vcom1. As illustrated in FIG. 18, for example, the drive signal Vcom1 is a voltage signal in which the drive signal Vcom(p) corresponding to the element "1" and the drive signal Vcom(n) corresponding to the element "−1" are arranged in the respective periods Pt. The code generation circuit 15, the amplifier 77, and the drive scanning circuit 14C according to the present embodiment serve as the first drive circuit 14A illustrated in FIG. 1.

The second drive circuit 14B supplies the drive signals Vcom2 to the third electrodes 53A and 53B synchronously with the timing when the display IC 19 supplies the drive signal Vcom1. The phase of the drive signal Vcom2 is determined based on the signal generated by the code generation circuit 15. As described above, the drive scanning circuit 14C and the detection IC 18 select the drive electrode block BK(n). The display IC 19 and the detection IC 18 supply the drive signals Vcom1 and Vcom2, respectively, to the drive electrode block BK(n).

The third electrodes 53A and 53B can be coupled to the respective voltage detectors DET by switching operations of switches SW21 and SW22 provided to the wires LA and LB, respectively. In the self-capacitance detection period Ps2 described above, the third electrodes 53A and 53B are coupled to the voltage detectors DET. The sensor output signals Vs2 from the third electrodes 53A and 53B are supplied to the respective voltage detectors DET.

As illustrated in FIG. 26, the third electrodes 53A and 53B are driven by the detection IC 18 independently of the drive scanning circuit 14C. Consequently, the present embodiment can use a drive circuit having the conventional configuration that drives the first electrodes COML in a time-division manner without the third electrodes 53A and 53B as a drive circuit for CDM drive.

Figure 27:
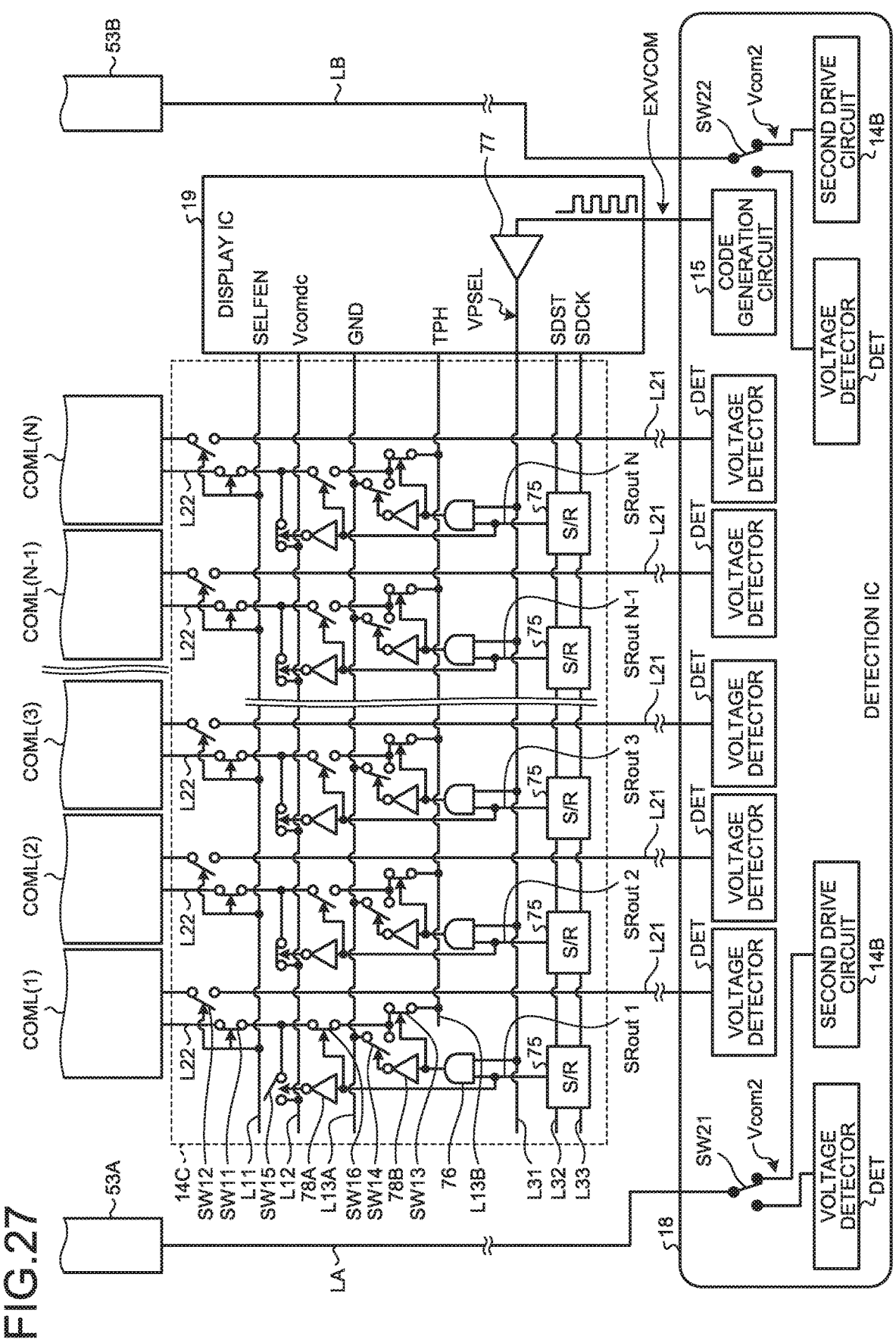
FIG. 27 is a circuit diagram of another example of the drive circuit according to the first embodiment.

FIG. 27 is a circuit diagram of another example of the drive circuit according to the first embodiment. In the example illustrated in FIG. 27, the display IC 19 supplies a DC low-level voltage signal GND to the drive scanning circuit 14C via a wire L13A. The display IC 19 also supplies a high-level voltage signal TPH to the drive scanning circuit 14C via a wire L13B. The drive scanning circuit 14C switches between the low-level voltage signal GND and the high-level voltage signal TPH based on the predetermined code. The drive scanning circuit 14C thus generates the drive signals Vcom1 and supplies them to the respective first electrodes COML.

Specifically, the first electrode COML is coupled to the wire L13B via the wire L22 and the switch SW13. The first electrode COML is coupled to the wire L13A via the wire L22 and the switch SW14. The switches SW13 and SW14 are alternately turned on and off repeatedly, whereby the signal supplied to the first electrode COML is alternately switched between the low-level voltage signal GND and the high-level voltage signal TPH. By switching the low-level voltage signal GND and the high-level voltage signal TPH in this manner, the AC drive signal Vcom1 is supplied to the first electrode COML. The display IC 19 according to the present modification controls the operating timing of the switches SW13 and SW14 based on the predetermined code, thereby controlling the phase of the drive signal Vcom1.

The amplifier 77 included in the display IC 19 amplifies the input logic signal EXVCOM to generate a selection signal VPSEL. The input logic signal EXVCOM is a signal having a phase determined based on the predetermined code and is a voltage signal having the same phase as that of the drive signal Vcom1 illustrated in FIG. 18, for example.

The configuration according to the present modification is the same as that illustrated in FIG. 26 in that one shift register 75 and one AND circuit 76 are provided corresponding to one first electrode COML. In the following description, the first electrode COML(1) is selected as a target to be driven.

The display IC 19 supplies the selection signal VPSEL to the AND circuit 76 via the wire L31. The AND circuit 76 outputs the logical product (AND) of the selection signal VPSEL and the scanning signal SRout supplied from the shift register 75. If the scanning signal SRout is turned on, the AND circuit 76 outputs a signal having a phase corresponding to the phase of the selection signal VPSEL. The output signal from the AND circuit 76 is supplied to the switch SW13, and a signal obtained by inverting the voltage level of the output signal by an inverter 78B is supplied to the switch SW14.

A switch SW15 is provided between the wire L22 and the wire L12. A switch SW16 is provided between the wire L22 and the switches SW13 and SW14. The scanning signal SRout output from the shift register 75 is supplied to the switch SW16, and a signal obtained by inverting the voltage level of the scanning signal SRout by an inverter 78A is supplied to the switch SW15. If the scanning signal SRout is at a high level, the switch SW15 is turned off, and the switch SW16 is turned on. As a result, the low-level voltage signal GND or the high-level voltage signal TPH is supplied to the first electrode COML based on the phase of the selection signal VPSEL. By contrast, if the scanning signal SRout is at a low level, the switch SW15 is turned on, and the switch SW16 is turned off. As a result, the drive signal Vcomdc is supplied to the first electrode COML via the wire L12. In the example illustrated in FIG. 27, the switch SW15 coupled to the first electrode COML(1) is turned off, and the switch SW16 coupled thereto is turned on. The first electrode COML(1) is thus selected as a target to be driven.

If the selection signal VPSEL is at a high level, the switch SW13 is turned on, and the switch SW14 is turned off. As a result, the high-level voltage signal TPH is supplied to the first electrode COML(1) via the wire L13B, the switch SW13, and the wire L22. If the selection signal VPSEL is at a low level, the switch SW13 is turned off, and the switch SW14 is turned on. As a result, the low-level voltage signal GND is supplied to the first electrode COML(1) via the wire L13A, the switch SW14, and the wire L22. Consequently, the drive signal Vcom1 corresponding to the phase of the selection signal VPSEL is supplied to the first electrode COML(1).

As described above, the drive scanning circuit 14C switches between the DC low-level voltage signal GND and the DC high-level voltage signal TPH. The drive scanning circuit 14C thus can generate the drive signals Vcom1 having a phase determined based on the predetermined code and supply them to the respective first electrodes COML.

The second drive circuit 14B supplies the drive signals Vcom2 to the third electrodes 53A and 53B synchronously with the timing when the display IC 19 supplies the selection signal VPSEL to the drive scanning circuit 14C. The phase of the drive signal Vcom2 is determined based on the signal generated by the code generation circuit 15. As described above, the drive scanning circuit 14C and the detection IC 18 select the drive electrode block BK(n) (refer to FIG. 17)

including three electrodes. The selected drive electrode block BK(n) is supplied with the drive signals Vcom1 and Vcom2.

Also in the present modification, the third electrodes 53A and 53B are driven by the detection IC 18 independently of the drive scanning circuit 14C. Consequently, the present modification can use a drive circuit having the conventional configuration that drives the first electrodes COML in a time-division manner by DC voltage drive as a drive circuit for CDM drive without any significant change.

As described above, the display device 1 and the detection device (touch sensor 30) according to the present embodiment includes the first substrate 21, the first electrodes COML, the second electrodes TDL, the third electrodes 53A and 53B, and the drive circuits (the first drive circuit 14A and the second drive circuit 14B). The first electrodes COML are arrayed in the active area Ad of the first substrate 21. The second electrodes TDL face the first electrodes COML and form capacitance between the first electrodes COML and the second electrodes TDL. The third electrodes 53A and 53B are provided in the peripheral region Gd positioned on the outside of the active area Ad. The drive circuits supply the drive signals Vcom1 and Vcom2 having a phase determined based on the predetermined code to the first electrodes COML and the third electrodes 53A and 53B.

With this configuration, the present embodiment can perform CDM drive on the first electrodes COML and the third electrodes 53A and 53B simultaneously. Consequently, the present embodiment can increase the detection sensitivity compared with a case where it drives the third electrodes 53A and 53B in a time-division manner. Furthermore, the present embodiment requires no independent period for performing touch detection in the peripheral region Gd because it performs CDM drive on the first electrodes COML and the third electrodes 53A and 53B simultaneously. In other words, the present embodiment performs CDM drive on the third electrodes 53A and 53B the same number of times as the number of first electrodes COML. This mechanism can increase the S/N ratio without increasing output of the drive signal Vcom2. Consequently, the display device 1 and the detection device according to the present embodiment can provide high detection performance in touch detection in the peripheral region Gd.

First Modification of the First Embodiment

Figure 29:
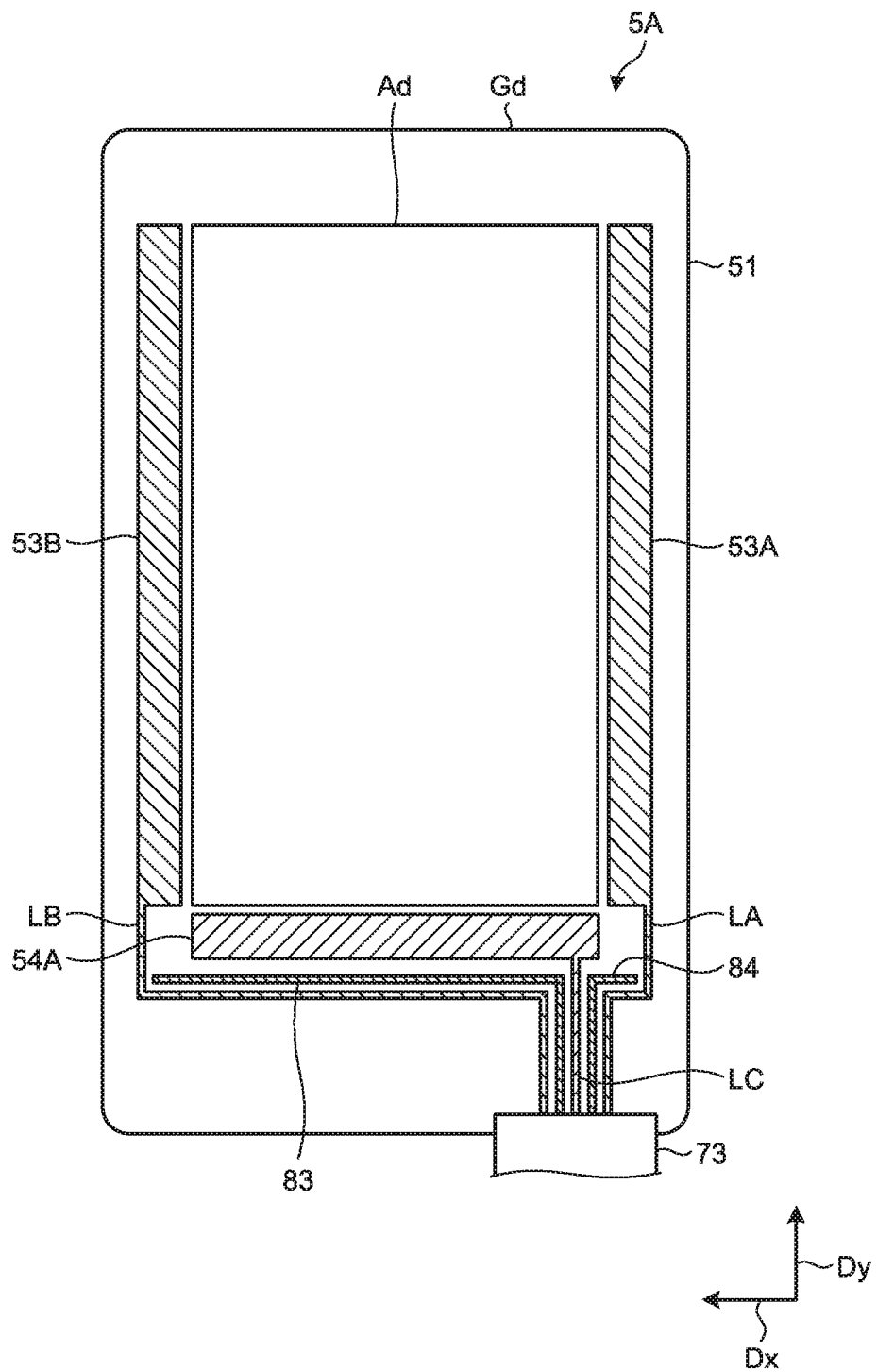
FIG. 29 is a plan view of the cover substrate according to the first modification.

FIG. 28 is a plan view of the display device according to a first modification of the first embodiment. FIG. 29 is a plan view of the cover substrate according to the first modification. As illustrated in FIGS. 28 and 29, a display device 1A according to the present modification includes the third electrodes 53A, 53B, and 54A in the peripheral region Gd. The third electrode 54A is provided to one of the sides of the peripheral region Gd facing in the second direction Dy, and the third electrode 54B (illustrated in FIG. 11 and other figures) is not provided to the other thereof.

In other words, the third electrode 54A is provided to a first side of the peripheral region Gd coupled to the flexible substrates 71, 72, and 73 and other components. The present modification can make a second side of the peripheral region Gd not provided with the third electrode 54A narrower. In other words, the present modification can make the second side of the peripheral region Gd facing the first side of the peripheral region Gd coupled to the flexible substrates 71, 72, and 73 and other components across the active area Ad narrower.

As illustrated in FIG. 29, the third electrode 54B is not provided to a cover member 5A. This configuration does not require the wire LD1 or LD2 (refer to FIG. 13) that couples the third electrode 54B to the flexible substrate 73. Furthermore, this configuration does not require the guard wire 82 (refer to FIG. 13) provided between the third electrode 53A and the wire LD2 or the guard wire 81 (refer to FIG. 13) provided between the third electrode 53B and the wire LD1. As a result, the number of wires provided on the outside of the third electrodes 53A and 53B can be reduced. Consequently, the present modification can make the peripheral region Gd of the cover substrate 51 narrower by an area of at least two wires.

Second Modification of the First Embodiment

Figure 30:
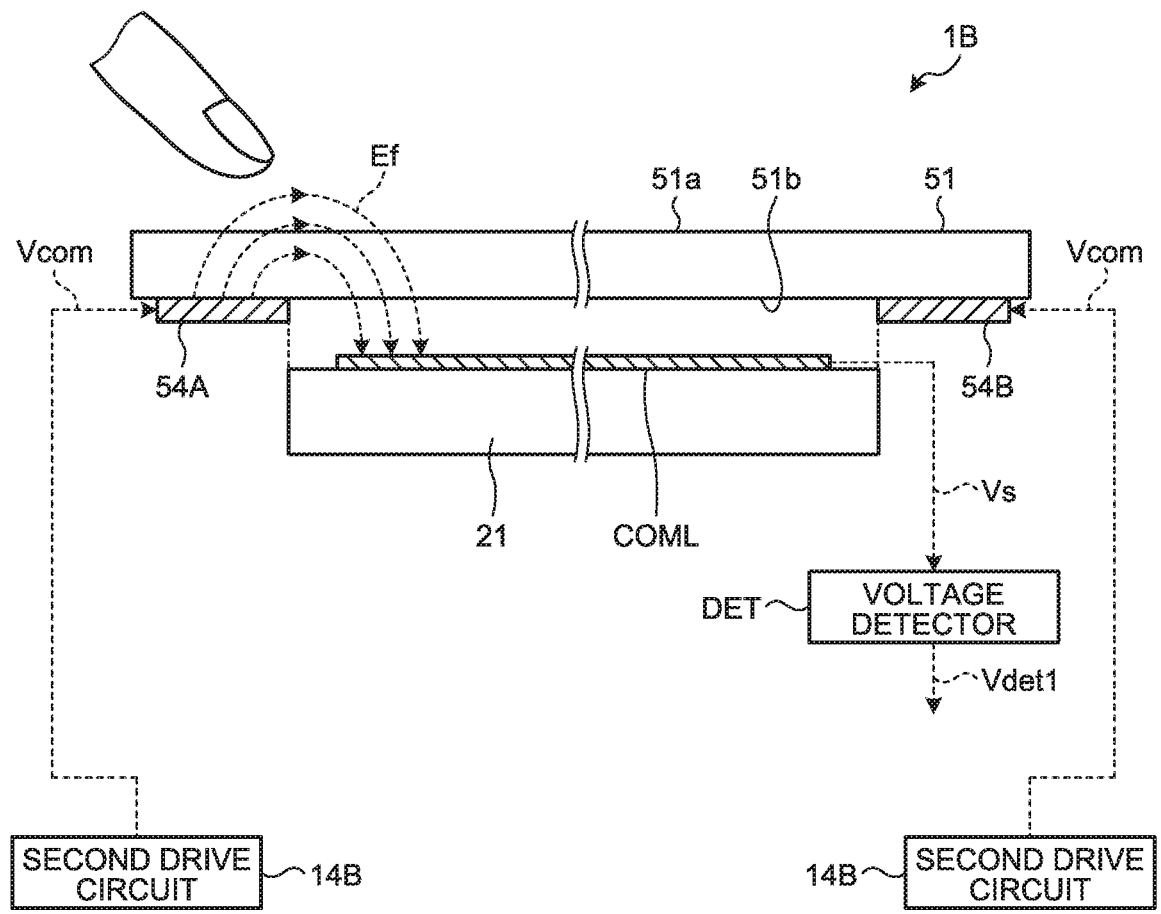
FIG. 30 is a sectional view schematically illustrating the relation between the first electrodes and the third electrodes according to a second modification of the first embodiment.

FIG. 30 is a sectional view schematically illustrating the relation between the first electrodes and the third electrodes according to a second modification of the first embodiment. In a display device 1B according to the present modification, the third electrodes 54A and 54B serve as drive electrodes. The first electrodes COML serve as detection electrodes.

Specifically, as illustrated in FIG. 30, the second drive circuit 14B supplies drive signals Vcom to the third electrodes 54A and 54B. As a result, the fringe lines of electric force Ef are generated between the third electrodes 54A and 54B and the first electrodes COML. The lines of electric force Ef extend from the peripheral region Gd to the first electrodes COML in the active area Ad.

When an object to be detected is in contact with or in proximity to the first surface 51a of the cover substrate 51 near the boundary between the active area Ad and the peripheral region Gd or in the peripheral region Gd, the fringe lines of electric force Ef formed between the third electrodes 54A and 54B and the first electrodes COML are blocked. The first electrodes COML output, to the voltage detector DET, the sensor output signals Vs corresponding to changes in capacitance between the third electrodes 54A and 54B and the first electrodes COML. The voltage detector DET outputs the detection signals Vdet1 based on the basic principle of mutual capacitance touch detection described above.

Also in the case where the third electrodes 54A and 54B serve as drive electrodes as described above, this configuration can expand a region capable of detecting an object to be detected to the outer side than the outer periphery of the active area Ad. Consequently, the display device 1B can detect an object to be detected in the peripheral region Gd. The detection operation using the third electrodes 54A and 54B as drive electrodes and the first electrodes COML as detection electrodes is performed in a period different from the detection period Pm (refer to FIG. 25) for CDM drive described above.

Second Embodiment

Figure 31:
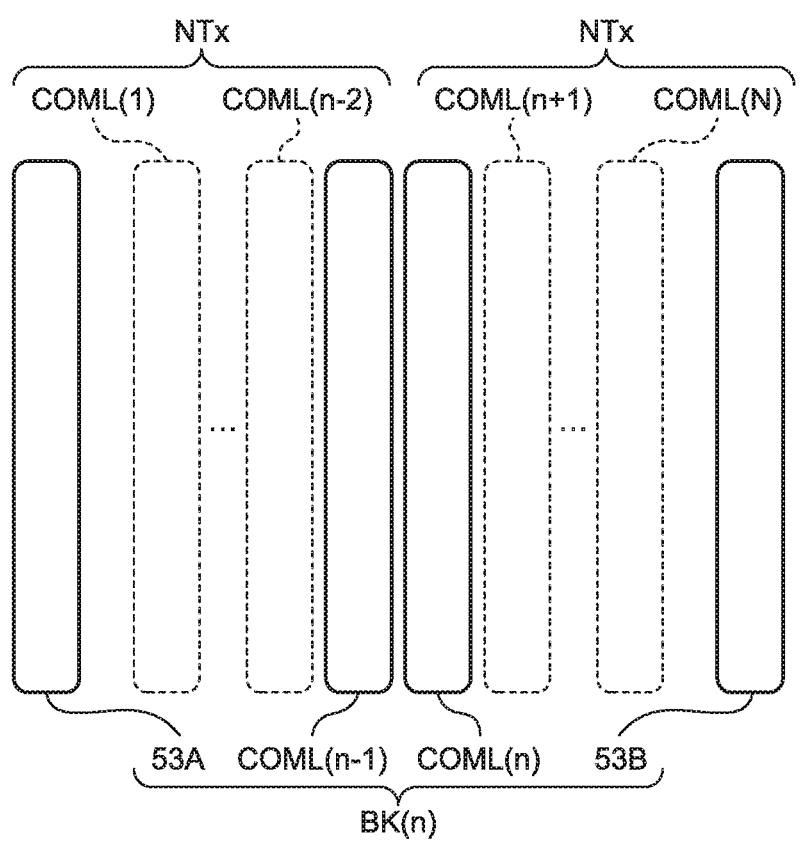
FIG. 31 is a diagram of the drive electrode block given for explanation of an example of an operation in CDM drive according to a second embodiment of the present disclosure.
Figure 32:
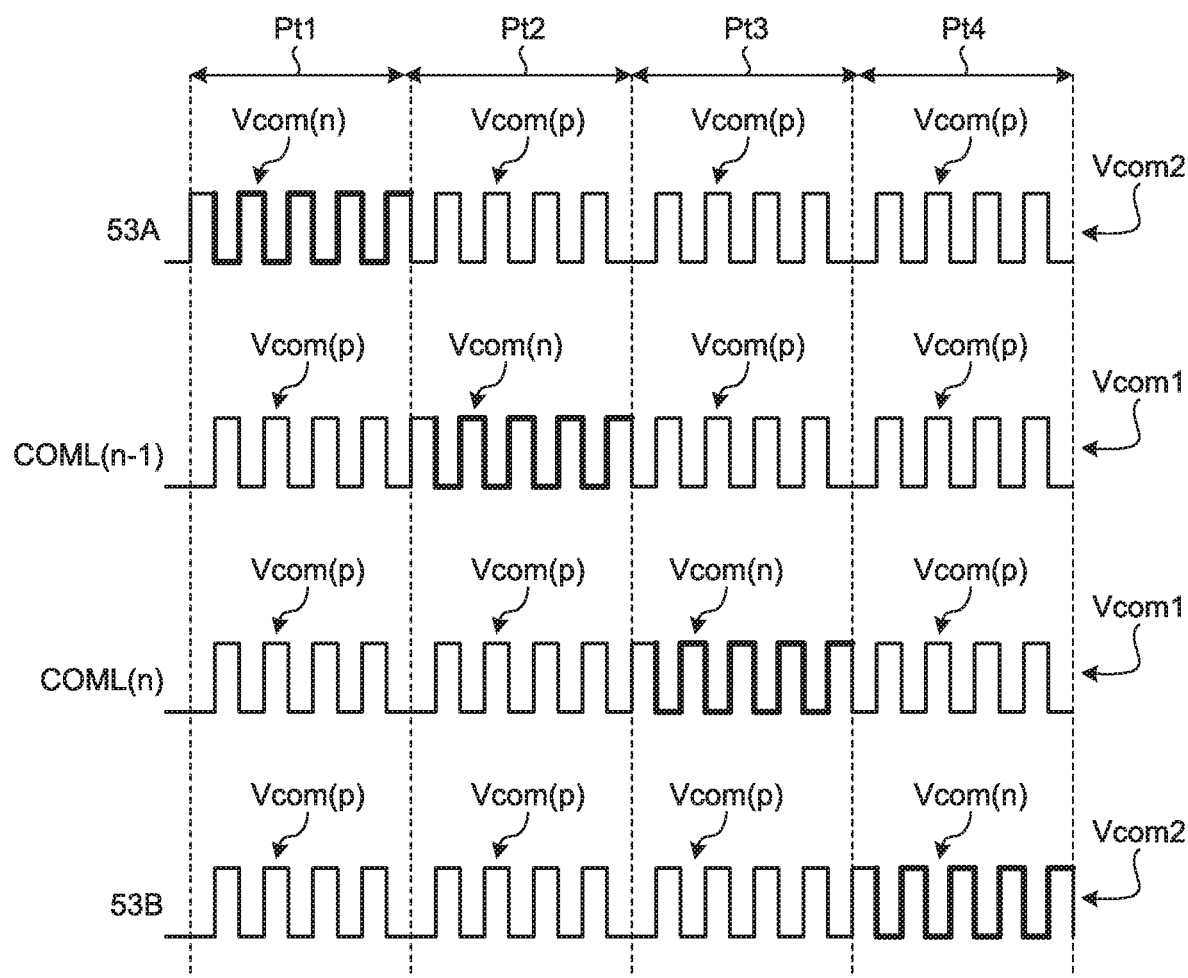
FIG. 32 is a timing waveform chart of the drive signals given for explanation of an example of the operation in CDM drive according to the second embodiment.
Figure 33:
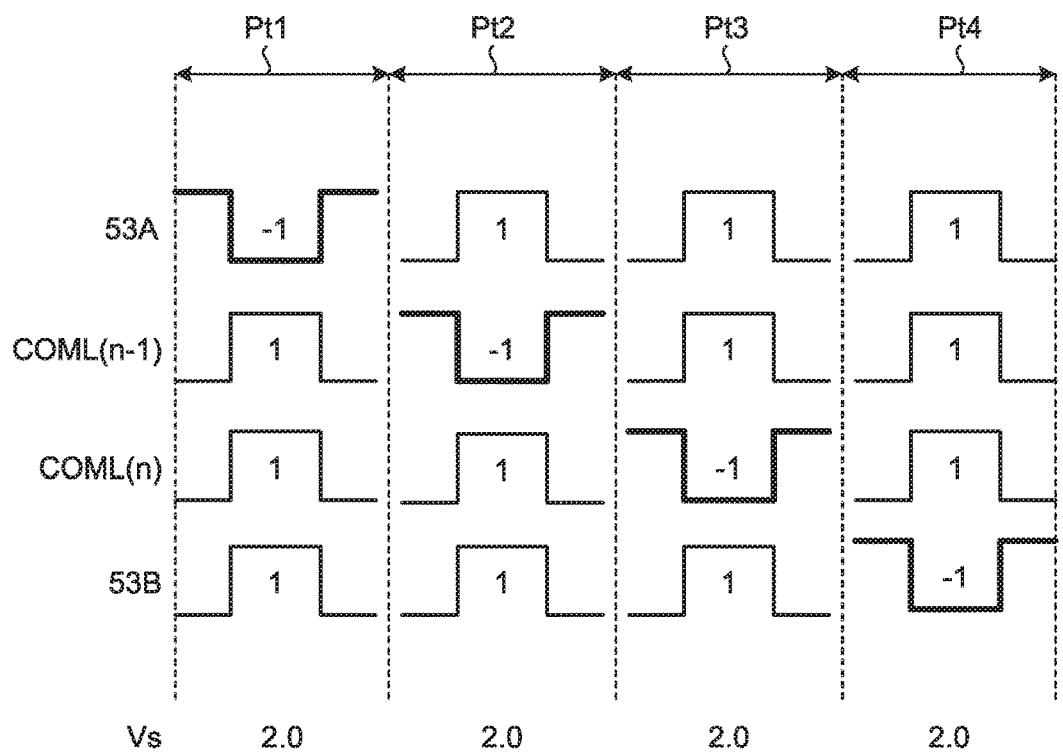
FIG. 33 is a diagram of the sensor output signals in the non-contact state given for explanation of an example of the operation in CDM drive according to the second embodiment.
Figure 34:
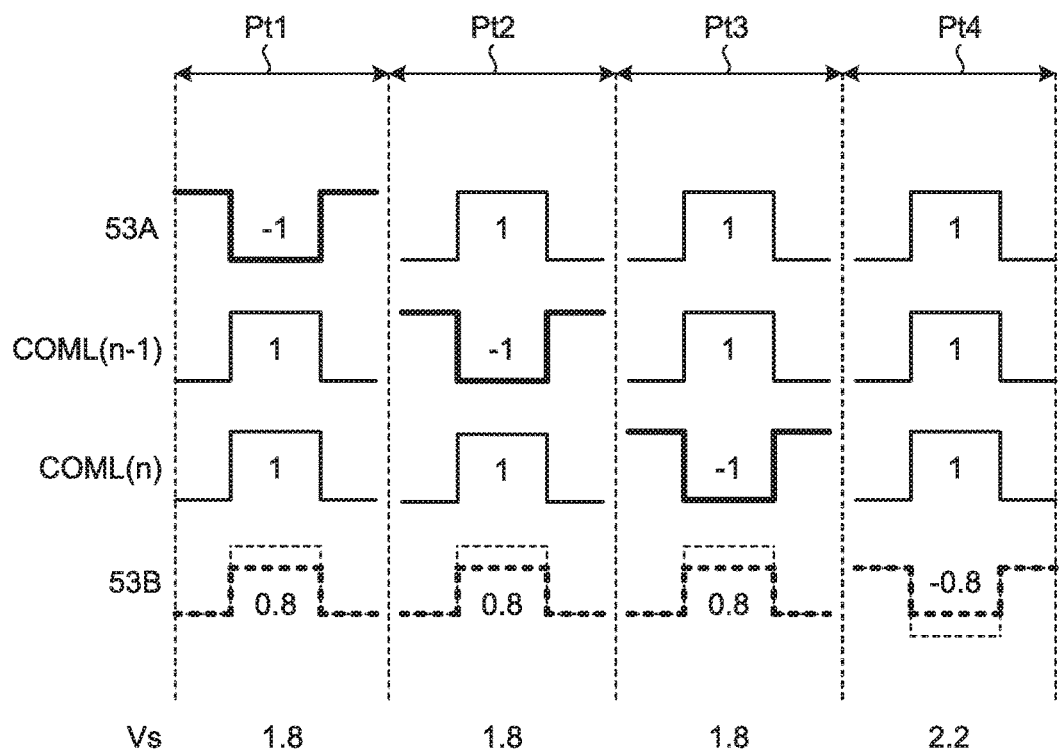
FIG. 34 is a diagram of the sensor output signals in the contact state given for explanation of an example of the operation in CDM drive according to the second embodiment.

FIG. 31 is a diagram of the drive electrode block given for explanation of an example of an operation in CDM drive according to a second embodiment of the present disclosure. FIG. 32 is a timing waveform chart of the drive signals given for explanation of an example of the operation in CDM drive according to the second embodiment. FIG. 33 is a diagram of the sensor output signals in the non-contact state given for explanation of an example of the operation in CDM drive according to the second embodiment. FIG. 34 is a diagram of the sensor output signals in the contact state given for explanation of an example of the operation in CDM drive according to the second embodiment.

The drive scanning circuit 14C (refer to FIG. 12) selects two first electrodes COML(n−1) and COML(n) out of the first electrodes COML as first electrodes COML to be driven. The drive scanning circuit 14C sequentially selects two first electrodes COML. In this case, the drive scanning circuit 14C sequentially selects two first electrodes COML by shifting the first electrodes COML two by two to avoid overlapping of the first electrodes COML to be driven. At a timing next to the timing when the first electrodes COML (n−1) and COML(n) are selected, for example, the drive scanning circuit 14C selects first electrodes COML(n+1) and COML(n+2).

The detection control circuit 11A performs CDM drive on each drive electrode block BK(n). The drive electrode block BK(n) according to the present embodiment includes four electrodes, that is, the third electrode 53A, the first electrode COML(n−1), the first electrode COML(n), and the third electrode 53B. In this case, the third electrodes 53A and 53B are always included in the drive electrode block BK(n). The first electrodes COML(n−1) and COML(n) selected as a target to be driven sequentially vary like n=2, 4, 6, . . . , and N.

In the period when the first electrodes COML(n−1) and COML(n) are selected, the drive scanning circuit 14C (refer to FIG. 12) does not select the first electrodes COML other than the first electrodes COML(n−1) and COML(n) to be driven, that is, the first electrodes COML(1), . . . , COML (n−2), COML(n+1), . . . , and COML(N) as an electrode to be driven. In this case, the first electrodes COML(1), COML (2), . . . , COML(n−1), COML(n+1), . . . , COML(N−1), and COML(N) are included in the non-selected block NTx.

The first drive circuit 14A supplies the drive signals Vcom1 having a phase determined based on a predetermined code to the first electrodes COML(n−1) and COML(n) in the drive electrode block BK(n). Simultaneously, the second drive circuit 14B supplies the drive signals Vcom2 having a phase determined based on the predetermined code to the third electrodes 53A and 53B in the drive electrode block BK(n).

As illustrated in FIG. 32, the first drive circuit 14A supplies the drive signals Vcom1 having a phase determined based on the predetermined code to the first electrodes COML(n−1) and COML(n) in the drive electrode block BK(n). Simultaneously, the second drive circuit 14B supplies the drive signals Vcom2 having a phase determined based on the predetermined code to the third electrodes 53A and 53B in the drive electrode block BK(n). The predetermined code is defined by the square matrix in Expression (9) described below, for example. While the square matrix in Expression (9) is identical with the square matrix according to the first embodiment, it is not limited thereto and may be another square matrix.

$$\begin{pmatrix} -1 & 1 & 1 & 1 \\ 1 & -1 & 1 & 1 \\ 1 & 1 & -1 & 1 \\ 1 & 1 & 1 & -1 \end{pmatrix} \begin{pmatrix} 2.0 \\ 2.0 \\ 2.0 \\ 2.0 \end{pmatrix} = \begin{pmatrix} 4.0 \\ 4.0 \\ 4.0 \\ 4.0 \end{pmatrix} \quad (9)$$

In the first period Pt1, the first drive circuit 14A and the second drive circuit 14B supply the drive signal Vcom(p) or the drive signal Vcom(n) corresponding to the first row of the square matrix in Expression (9) to the third electrode 53A, the first electrode COML(n−1), the first electrode COML(n), and the third electrode 53B. Specifically, the second drive circuit 14B supplies the drive signal Vcom(n) corresponding to the element "−1" to the third electrode 53A. The first drive circuit 14A supplies the drive signal Vcom(p) corresponding to the element "1" to the first electrodes COML(n−1) and COML(n). The second drive circuit 14B supplies the drive signal Vcom(p) corresponding to the element "1" to the third electrode 53B.

Similarly, in the second period Pt2, the first drive circuit 14A and the second drive circuit 14B supply the drive signal Vcom(p) or the drive signal Vcom(n) corresponding to the second row of the square matrix in Expression (9) to the third electrode 53A, the first electrode COML(n−1), the first electrode COML(n), and the third electrode 53B. In the third period Pt3, the first drive circuit 14A and the second drive circuit 14B supply the drive signal Vcom(p) or the drive signal Vcom(n) corresponding to the third row of the square matrix in Expression (9) to the third electrode 53A, the first electrode COML(n−1), the first electrode COML(n), and the third electrode 53B. In the fourth period Pt4, the first drive circuit 14A and the second drive circuit 14B supply the drive signal Vcom(p) or the drive signal Vcom(n) corresponding to the fourth row of the square matrix in Expression (9) to the third electrode 53A, the first electrode COML(n−1), the first electrode COML(n), and the third electrode 53B.

As illustrated in FIG. 32, the drive signal Vcom2 supplied to the third electrode 53A has a phase determined based on the predetermined code in the order of the drive signals Vcom(n), Vcom(p), Vcom(p), and Vcom(p). The drive signal Vcom1 supplied to the first electrode COML(n−1) has a phase determined based on the predetermined code in the order of the drive signals Vcom(p), Vcom(n), Vcom(p), and Vcom(p). The drive signal Vcom1 supplied to the first electrode COML(n) has a phase determined based on the predetermined code in the order of the drive signals Vcom (p), Vcom(p), Vcom(n), and Vcom(p). The drive signal Vcom2 supplied to the third electrode 53B has a phase determined based on the predetermined code in the order of the drive signals Vcom(p), Vcom(p), Vcom(p), and Vcom (n).

FIG. 33 illustrates the sensor output signals Vs output when an object to be detected is in the non-contact state. FIG. 34 illustrates the sensor output signals Vs output when an object to be detected is in contact with the peripheral region Gd provided with the third electrode 53B. As illustrated in FIG. 33, in the first period Pt1, the third electrode 53A is supplied with the drive signal Vcom(n) corresponding to the element "−1". As a result, the phase of the sensor output signal Vs corresponding to the third electrode 53A is opposite to that of the sensor output signals Vs corresponding to the first electrodes COML(n−1) and COML(n) and the third electrode 53B. Consequently, the sensor output signal Vs in the first period Pt1 is calculated by: (−1)+(1)+(1)+(1) =2.0.

Similarly, the sensor output signal Vs in the second period Pt2 is calculated by: (1)+(−1)+(1)+(1)=2.0. The sensor output signal Vs in the third period Pt3 is calculated by: (1)+(1)+(−1)+(1)=2.0. The sensor output signal Vs in the fourth period Pt4 is calculated by: (1)+(1)+(1)+(−1)=2.0.

The coordinate extraction circuit 45 performs decoding by multiplying the sensor output signals Vs detected by the voltage detector DET by the square matrix as indicated by Expression (9). As a result, the detection signals Vdet1 resulting from decoding corresponding to the third electrode 53A, the first electrodes COML(n−1) and COML(n), and the third electrode 53B are each determined to be "4.0".

As illustrated in FIG. 34, the sensor output signal Vs corresponding to the third electrode 53B is "0.8" or "−0.8" in the contact state. The amplitude of the sensor output signal Vs corresponding to the third electrode 53B is smaller than that of the sensor output signals Vs corresponding to the third electrode 53A and the first electrodes COML(n−1) and COML(n) by 20%. In the first period Pt1, the third electrode 53A is supplied with the drive signal Vcom(n) corresponding to the element "−1". As a result, the phase of the sensor output signal Vs corresponding to the third electrode 53A is opposite to that of the sensor output signals Vs corresponding to the first electrodes COML(n−1) and COML(n) and the third electrode 53B. Consequently, the sensor output signal Vs in the first period Pt1 is calculated by: (−1)+(1)+(1)+(0.8)=1.8.

Similarly, the sensor output signal Vs in the second period Pt2 is calculated by: (1)+(−1)+(1)+(0.8)=1.8. The sensor output signal Vs in the third period Pt3 is calculated by: (1)+(1)+(−1)+(0.8)=1.8. The sensor output signal Vs in the fourth period Pt4 is calculated by: (1)+(1)+(1)+(−0.8)=2.2.

The coordinate extraction circuit 45 performs decoding on the sensor output signals Vs detected by the voltage detector DET as indicated by Expression (10). As a result, the detection signals Vdet1 resulting from decoding corresponding to the third electrode 53A, the first electrodes COML(n−1) and COML(n), and the third electrode 53B are determined to be "4.0", "4.0", "4.0", and "3.2", respectively. The values of the detection signals Vdet1 corresponding to the third electrode 53A and the first electrodes COML(n−1) and COML(n) are equal to those in the non-contact state in Expression (9). By contrast, the value of the detection signal Vdet1 corresponding to the third electrode 53B with which the object to be detected is in contact is smaller than "4.0", which is the value of the detection signal Vdet1 corresponding to the third electrode 53B in the non-contact state. The coordinate extraction circuit 45 thus can calculate the position of an object to be detected based on the detection signals Vdet1 resulting from decoding.

$$\begin{pmatrix} -1 & 1 & 1 & 1 \\ 1 & -1 & 1 & 1 \\ 1 & 1 & -1 & 1 \\ 1 & 1 & 1 & -1 \end{pmatrix} \begin{pmatrix} 1.8 \\ 1.8 \\ 1.8 \\ 2.2 \end{pmatrix} = \begin{pmatrix} 4.0 \\ 4.0 \\ 4.0 \\ 3.2 \end{pmatrix} \quad (10)$$

Also in the case where CDM drive is performed on the drive electrode block BK(n) including four electrodes as described above, the voltage of difference between the contact state and the non-contact state increases from 0.2 (=1.0−0.8) to 0.8 (=4.0−3.2). In other words, the detection sensitivity increases by four times. Consequently, the display device 1 according to the present embodiment can satisfactorily detect an object to be detected in contact with or in proximity to the peripheral region Gd.

Figure 35:
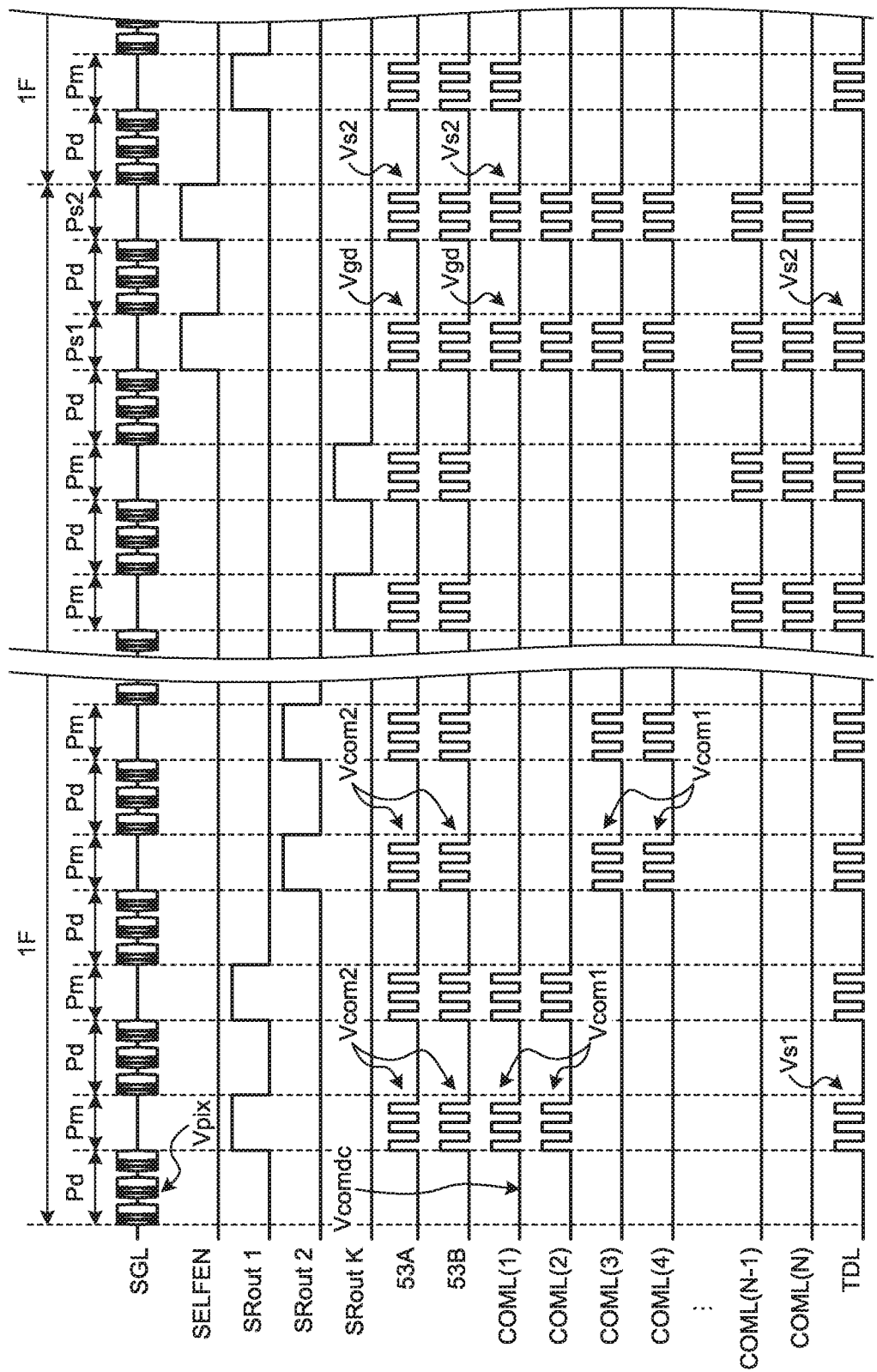
FIG. 35 is a timing waveform chart of an exemplary operation performed by the display device according to the second embodiment.

FIG. 35 is a timing waveform chart of an exemplary operation performed by the display device according to the second embodiment. Explanation of the operations performed in the display period Pd and the detection periods Ps1 and Ps2 in FIG. 35 is omitted because they are the same as the operations described above.

In one detection period Pm, the drive scanning circuit 14C (refer to FIG. 12) according to the present embodiment selects two first electrodes COML simultaneously out of the first electrodes COML as a target to be driven. Specifically, the drive scanning circuit 14C selects the first electrodes COML(1) and COML(2) corresponding to the scanning signal SRout1. The drive scanning circuit 14C selects the first electrodes COML(3) and COML(4) corresponding to the scanning signal SRout2. The drive scanning circuit 14C selects the first electrodes COML(N−1) and COML(N) corresponding to a scanning signal SRoutK. The third electrodes 53A and 53B are driven in all the detection periods Pm. As a result, four electrodes of the third electrodes 53A and 53B and the first electrodes COML(n−1) and COML(n) (n=2, 4, . . . , and N) are selected as the drive electrode block BK(n) (refer to FIG. 31).

The drive scanning circuit 14C according to the present embodiment selects the same pair of first electrodes COML(n−1) and COML(n) in at least two detection periods Pm. In at least two detection periods Pm, the first drive circuit 14A and the second drive circuit 14B supply the drive signals Vcom1 and Vcom2 to the drive electrode block BK(n) having the same combination of electrodes, that is, the selected two first electrodes COML(n−1) and COML(n) and the third electrodes 53A and 53B. Consequently, the present embodiment performs CDM drive on the drive electrode block BK(n) having the same combination of electrodes in a plurality of detection periods Pm.

Even in the case where two first electrodes COML(n−1) and COML(n) are selected as a target to be driven in each detection period Pm, the number of detection periods Pm in one frame period 1F is equal to the number of first electrodes COML. In other words, the number of detection periods Pm in which the third electrodes 53A and 53B are driven is equal to the number of first electrodes COML. In a case where the number of first electrodes COML is N, the third electrodes 53A and 53B are driven in N detection periods Pm. This mechanism can increase the S/N ratio by $\sqrt{N}$ times without increasing output of the drive signal Vcom2.

After CDM drive is performed on the drive electrode block BK including the first electrodes COML(1) and COML(2) and the third electrodes 53A and 53B in two detection periods Pm, the drive scanning circuit 14C selects the first electrodes COML(3) and COML(4) as a target to be driven. As described above, the drive scanning circuit 14C sequentially selects two first electrodes COML by shifting the first electrodes COML two by two to avoid overlapping of the first electrodes COML to be driven.

The first electrodes COML are each driven twice in one frame period 1F. This mechanism can increase the S/N ratio of touch detection in the active area Ad by $\sqrt{2}$ times. Consequently, the display device 1 according to the present embodiment can provide high detection performance in touch detection in the peripheral region Gd and increase the touch detection performance in the active area Ad.

Figure 36:
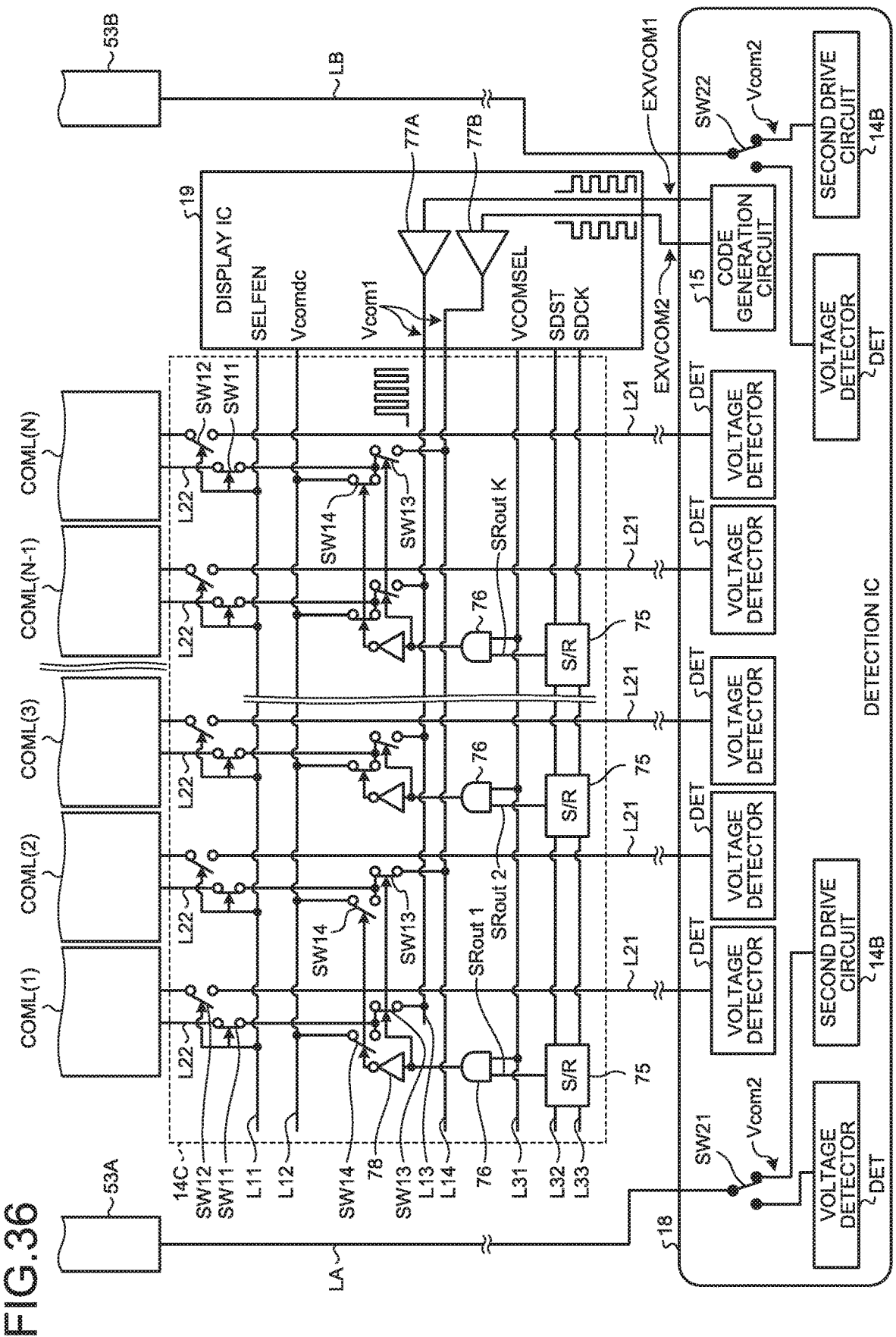
FIG. 36 is a circuit diagram of the drive circuit according to the second embodiment.
Figure 37:
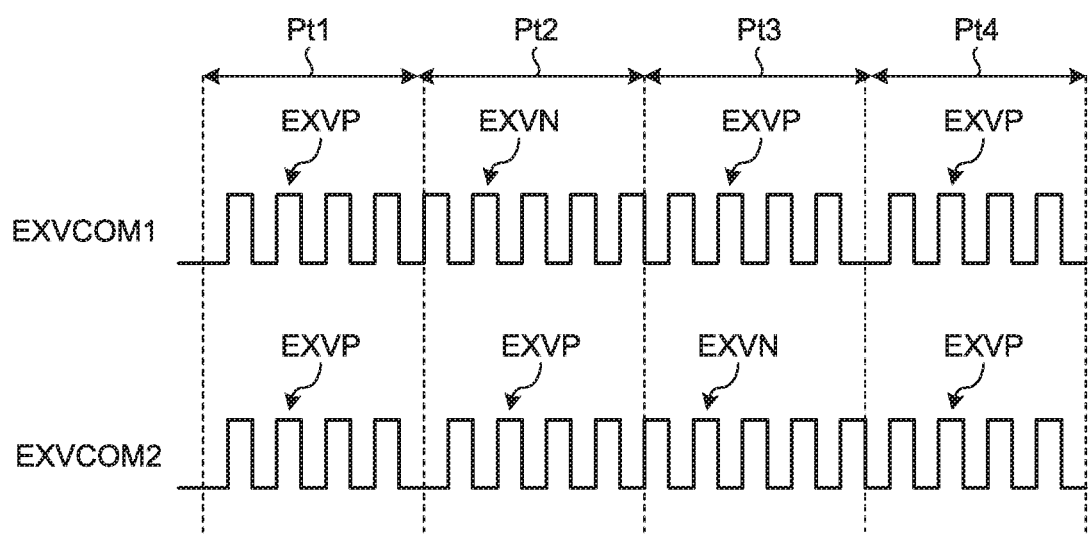
FIG. 37 is a waveform chart of input logic signals.

FIG. 36 is a circuit diagram of the drive circuit according to the second embodiment. FIG. 37 is a waveform chart of the input logic signals. As illustrated in FIG. 36, the shift registers 75 according to the present embodiment are provided one for every two first electrodes COML. The shift registers 75 sequentially supply the scanning signals SRout1, SRout2, . . . , and SRoutK to the respective AND circuits 76 based on the scanning start signal SDST and the clock signal SDCK. The number of shift registers 75 is half the number of first electrodes COML.

The AND circuit 76 calculates the logical product (AND) of the scanning signal SRout and the selection signal VCOMSEL and outputs it to the switches SW13 and SW14. The AND circuit 76 outputs signals simultaneously to the two switches SW13 and the two switches SW14 provided corresponding to the respective two first electrodes COML. The output signal from the AND circuit 76 is supplied to the two switches SW13, and a signal obtained by inverting the voltage level of the output signal by the inverter 78 is supplied to the two switches SW14.

In the example illustrated in FIG. 36, the scanning signal SRout1 is at a high level, and the scanning signals SRout2, . . . , and SRoutK are at a low level. As a result, the switch SW13 coupled to the first electrode COML(1) and the switch SW13 coupled to the first electrode COML(2) are turned on based on the signals supplied from the AND circuit 76. The switch SW14 coupled to the first electrode COML(1) and the switch SW14 coupled to the first electrode COML(2) are turned off. As a result, the first electrode COML(1) is coupled to the wire L13, and the first electrode COML(2) is coupled to a wire L14. The first electrodes COML(1) and COML(2) are coupled to the display IC 19 via the wires L13 and L14, respectively.

The switches SW13 corresponding to the first electrodes COML other than the first electrodes COML(1) and COML(2) are turned off, and the switches SW14 corresponding thereto are turned on. The first electrodes COML other than the first electrodes COML(1) and COML(2) are coupled to the common wire L12 via the respective switches SW14. The display IC 19 supplies the drive signals Vcomdc to the first electrodes COML other than the first electrodes COML(1) and COML(2) via the wire L12. The first electrodes COML other than the first electrodes COML(1) and COML(2) are included in the non-selected block NTx (refer to FIG. 31).

If the scanning signal SRout2 is at a high level at the next timing, the first electrodes COML(3) and COML(4) are selected as electrodes to be driven. As described above, one shift register 75 selects two first electrodes COML as electrodes to be driven. One shift register 75 is provided for every two first electrodes COML. With this configuration, different first electrodes COML are selected as a target to be driven based on the scanning signal SRout. In other words, the drive scanning circuit 14C sequentially selects the first electrodes COML by shifting the first electrodes COML to be driven two by two to avoid overlapping of the first electrodes COML.

The code generation circuit 15 generates two input logic signals EXVCOM1 and EXVCOM2 having a phase determined corresponding to the code of the square matrix described above (refer to Expression (9) and other expressions). The code generation circuit 15 supplies the input logic signals EXVCOM1 and EXVCOM2 to the display IC 19.

As illustrated in FIG. 37, the input logic signal EXVCOM1 is a voltage signal in which a signal EXVP corresponding to the element "1" and a signal EXVN corresponding to the element "−1" are arranged in a time-division manner. The signal EXVN has a polarity opposite to that of the signal EXVP. In other words, when the signal EXVP has a high-level potential, the signal EXVN has a low-level potential. When the signal EXVN has a high-level potential, the signal EXVP has a low-level potential.

The input logic signal EXVCOM1 has a phase determined corresponding to the second row of the square matrix (refer to Expression (9) and other expressions) in the order of the signals EXVP, EXVN, EXVP, and EXVP. The input logic signal EXVCOM2 has a phase determined corresponding to the third row of the square matrix in the order of the signals EXVP, EXVP, EXVN, and EXVP.

An amplifier 77A amplifies the input logic signal EXVCOM1 to generate the drive signal Vcom1. An amplifier 77B amplifies the input logic signal EXVCOM2 to generate the drive signal Vcom1.

The display IC 19 supplies the drive signal Vcom1 that is based on the input logic signal EXVCOM1 to the first electrode COML(1) via the wire L13. Simultaneously, the display IC 19 supplies the drive signal Vcom1 that is based on the input logic signal EXVCOM2 to the first electrode COML(2) via the wire L14. At the same timing, the display IC 19 supplies the drive signals Vcomdc to the first electrodes COML not selected as a target to be driven.

The second drive circuit 14B supplies the drive signals Vcom2 to the third electrodes 53A and 53B synchronously with the timing when the display IC 19 supplies the drive signals Vcom1. The phase of the drive signal Vcom2 is determined based on the signal generated by the code generation circuit 15. As described above, the drive scanning circuit 14C and the detection IC 18 select the drive electrode block BK(n) including four electrodes. The selected drive electrode block BK(n) is supplied with the drive signals Vcom1 and Vcom2.

With the drive circuit described above, the display IC 19 can supply the drive signals Vcom1 having different phases to respective two first electrodes COML to be driven out of the first electrodes COML. The drive scanning circuit 14C can simultaneously select two first electrodes COML simply by adding the wire L14 and reducing the number of shift registers 75 compared with the first embodiment. The third electrodes 53A and 53B according to the present embodiment are driven by the detection IC 18 independently of the drive scanning circuit 14C. Consequently, the present embodiment can use a drive circuit having the conventional configuration that drives the first electrodes COML in a time-division manner without the third electrodes 53A and 53B as a drive circuit for CDM drive without any significant change.

Figure 38:
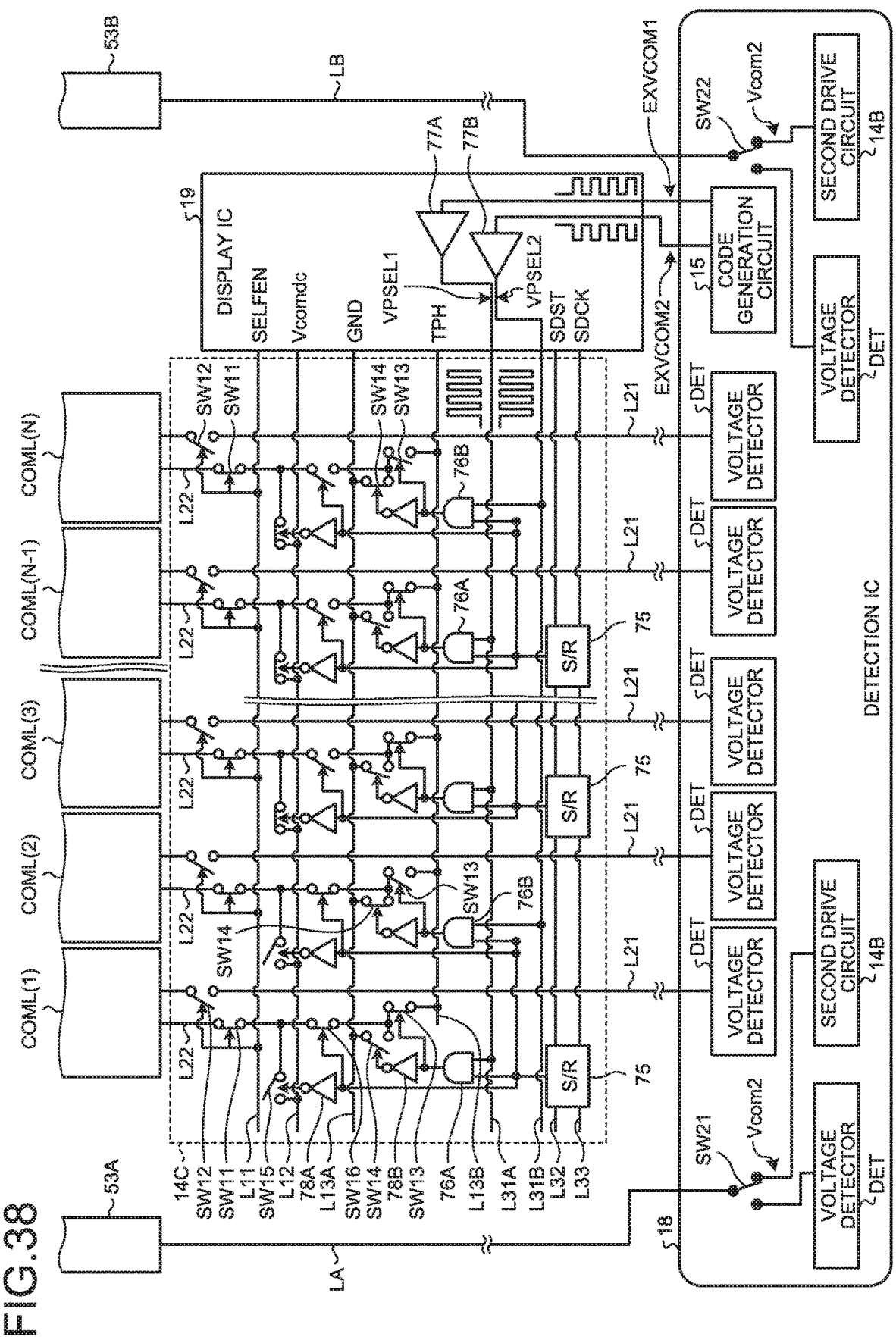
FIG. 38 is a circuit diagram of the drive circuit according to a modification of the second embodiment.

FIG. 38 is a circuit diagram of the drive circuit according to a modification of the second embodiment. In the example of the drive circuit illustrated in FIG. 36, the display IC 19 generates the AC drive signals Vcom1 and supplies them to the first electrodes COML via the drive scanning circuit 14C. The display IC 19 according to the present modification supplies the DC low-level voltage signal GND to the drive scanning circuit 14C via the wire L13A. The display IC 19 also supplies the high-level voltage signal TPH to the drive scanning circuit 14C via the wire L13B.

The first electrode COML is coupled to the wire L13B via the wire L22 and the switch SW13. The first electrode COML is coupled to the wire L13A via the wire L22 and the switch SW14. The switches SW13 and SW14 are alternately turned on and off repeatedly, whereby the signal supplied to the first electrode COML is alternately switched between the low-level voltage signal GND and the high-level voltage signal TPH. By switching the low-level voltage signal GND and the high-level voltage signal TPH in this manner, the AC drive signal Vcom1 is supplied to the first electrode COML. The present modification controls the operating timing of the switches SW13 and SW14, thereby controlling the phase of the drive signal Vcom1.

Specifically, the amplifier 77A amplifies the input logic signal EXVCOM1 to generate a selection signal VPSEL1. The amplifier 77B amplifies the input logic signal EXVCOM2 to generate a selection signal VPSEL2. The input logic signals EXVCOM1 and EXVCOM2 are signals having a phase determined based on the predetermined code and are voltage signals having the same waveform as that of the signals illustrated in FIG. 37.

The configuration according to the present modification is the same as that illustrated in FIG. 36 in that one shift register 75 is provided corresponding to two first electrodes COML. In other words, two first electrodes COML are simultaneously selected by one shift register 75. The shift register 75 according to the present modification is provided with an AND circuit 76A and an AND circuit 76B. The AND circuits 76A and 76B are provided corresponding to respective different first electrodes COML. The following describes a case where the first electrodes COML(1) and COML(2) are selected as a target to be driven.

As illustrated in FIG. 38, the switch SW15 is provided between the wire L22 and the wire L12. The switch SW16 is provided between the wire L22 and the switches SW13 and SW14. The scanning signal SRout output from the shift register 75 is supplied to two switches SW16, and a signal obtained by inverting the voltage level of the scanning signal SRout by the inverter 78A is supplied to two switches SW15. If the scanning signal SRout is at a high level, the switches SW15 are turned off, and the switches SW16 are turned on. As a result, the low-level voltage signal GND or the high-level voltage signal TPH is supplied to the first electrodes COML. By contrast, if the scanning signal SRout is at a low level, the switches SW15 are turned on, and the switches SW16 are turned off. As a result, the drive signal Vcomdc is supplied to the first electrodes COML via the wire L12. In the example illustrated in FIG. 38, the switches SW15 coupled to the first electrodes COML(1) and COML(2) are turned off, and the switches SW16 coupled thereto are turned on. The first electrodes COML(1) and COML(2) are thus selected as a target to be driven.

The display IC 19 supplies the selection signal VPSEL1 to the AND circuit 76A via a wire L31A. The AND circuit 76A outputs the logical product (AND) of the selection signal VPSEL1 and the scanning signal SRout supplied from the shift register 75. If the scanning signal SRout is turned on, the AND circuit 76A outputs a signal having a phase corresponding to the phase of the selection signal VPSEL1. The output signal from the AND circuit 76A is supplied to the switch SW13, and a signal obtained by inverting the voltage level of the output signal by the inverter 78B is supplied to the switch SW14.

If the selection signal VPSEL1 is at a high level, the switch SW13 is turned on, and the switch SW14 is turned off. As a result, the high-level voltage signal TPH is supplied to the first electrode COML(1). If the selection signal VPSEL1 is at a low level, the switch SW13 is turned off, and the switch SW14 is turned on. As a result, the low-level voltage signal GND is supplied to the first electrode COML(1). Consequently, the drive signal Vcom1 corresponding to the phase of the selection signal VPSEL1 is supplied to the first electrode COML(1).

The display IC 19 supplies the selection signal VPSEL2 to the AND circuit 76B via a wire L31B. The AND circuit 76B outputs the logical product (AND) of the selection signal VPSEL2 and the scanning signal SRout supplied from the shift register 75. If the scanning signal SRout is turned on, the AND circuit 76B outputs a signal having a phase corresponding to the phase of the selection signal VPSEL2. The output signal from the AND circuit 76B is supplied to the switch SW13, and a signal obtained by inverting the voltage level of the output signal by the inverter 78B is supplied to the switch SW14.

If the selection signal VPSEL2 is at a high level, the switch SW13 is turned on, and the switch SW14 is turned off. As a result, the high-level voltage signal TPH is supplied to the first electrode COML(2). If the selection signal VPSEL2 is at a low level, the switch SW13 is turned off, and the switch SW14 is turned on. As a result, the low-level voltage signal GND is supplied to the first electrode COML(2). Consequently, the drive signal Vcom1 corresponding to the phase of the selection signal VPSEL2 is supplied to the first electrode COML(2).

As described above, the drive scanning circuit 14C switches between the DC low-level voltage signal GND and the DC high-level voltage signal TPH. The drive scanning circuit 14C thus can generate the drive signals Vcom1 having a phase determined based on the predetermined code and supply them to the respective first electrodes COML.

The second drive circuit 14B supplies the drive signals Vcom2 to the third electrodes 53A and 53B synchronously with the timing when the display IC 19 supplies the selection signals VPSEL1 and VPSEL2 to the drive scanning circuit 14C. The phase of the drive signal Vcom2 is determined based on the signal generated by the code generation circuit 15. As described above, the drive scanning circuit 14C and the detection IC 18 select the drive electrode block BK(n) including four electrodes. The selected drive electrode block BK(n) is supplied with the drive signals Vcom1 and Vcom2.

With the drive circuit described above, the display IC 19 and the drive scanning circuit 14C can supply the drive signals Vcom1 having different phases to respective two first electrodes COML to be driven out of the first electrodes COML. The third electrodes 53A and 53B according to the present modification are driven by the detection IC 18 independently of the drive scanning circuit 14C. Consequently, the present modification can use a drive circuit having the conventional configuration that drives the first electrodes COML in a time-division manner by DC voltage drive as a drive circuit for CDM drive without any significant change.

While exemplary embodiments according to the present disclosure have been described, the embodiments are not intended to limit the disclosure. The contents disclosed in the embodiments are given by way of example only, and various changes may be made without departing from the spirit of the present disclosure. Appropriate changes made without departing from the spirit of the present disclosure naturally fall within the technical scope of the disclosure.

The lengths, the widths, the numbers, the shapes, and other elements of the third electrodes 53A and 53B and the third electrodes 54A and 54B are given by way of example only and may be appropriately modified. The number of first electrodes COML included in the drive electrode block BK(n) is not limited to one or two and may be three or more. In this case, the order of the square matrix increases corresponding to the number of electrodes included in the drive electrode block BK(n). The second drive circuit 14B may be provided outside the detection IC 18. While the display device 1 includes the first drive circuit 14A and the second drive circuit 14B, one drive circuit may generate the drive signals Vcom1 and Vcom2 and other signals and supply them to the first electrodes COML and the third electrodes 53A and 53B.

The display device according to the present aspect may have the following aspects, for example.

(1) A display device comprising:
 a substrate;
 a plurality of first electrodes arrayed in an active area of the substrate;
 a plurality of second electrodes facing the first electrodes and configured to form capacitance between the first electrodes and the second electrodes;
 at least one third electrode provided in a peripheral region positioned on the outside of the active area; and
 a drive circuit configured to supply a drive signal having a phase determined based on a predetermined code to the first electrodes and the third electrode.

(2) The display device according to (1), further comprising:
 a scanning circuit configured to sequentially select a first electrode out of the first electrodes, wherein
 the drive circuit supplies the drive signal to the selected first electrode and the third electrode simultaneously.

(3) The display device according to (2), wherein
the scanning circuit sequentially selects at least one of the first electrodes in each of a plurality of detection periods, the detection periods being arranged in a time-division manner in a period for performing detection on one detection surface, and
the drive circuit supplies the drive signal to different first electrodes out of the first electrodes in the respective detection periods and supplies the drive signal to the third electrode in all the detection periods.
(4) The display device according to (3), wherein the scanning circuit selects one of the first electrodes in one of the detection periods.
(5) The display device according to (3), wherein the scanning circuit selects two of the first electrodes simultaneously in one of the detection periods.
(6) The display device according to (5), wherein
the scanning circuit selects the same pair of the two first electrodes in at least two of the detection periods, and
the drive circuit supplies the drive signal to the selected two first electrodes and the third electrode in at least two of the detection periods.
(7) The display device according to (5), wherein the scanning circuit selects the first electrodes by shifting the first electrodes two by two in the detection periods.
(8) The display device according to (1), wherein the second electrodes output, to a detector, a sensor output signal corresponding to a change in capacitance between the first electrodes and the second electrodes and a change in capacitance between the third electrode and the second electrodes.
(9) The display device according to (1), including a plurality of the third electrodes, wherein
the first electrodes are arrayed in a first direction and each extend in a second direction intersecting the first direction in planar view, and
the third electrodes face each other in the first direction, and the first electrodes are disposed between the third electrodes facing each other in the first direction.
(10) The display device according to (9), wherein
the second electrodes extend in the first direction and are arrayed in the second direction in planar view, and
the third electrodes are disposed facing ends of the second electrodes.
(11) The display device according to (9), wherein the third electrodes are further provided in the peripheral region at a position facing ends of the first electrodes.
(12) The display device according to (1), wherein the third electrode is disposed in a layer different from a layer of the first electrodes and the second electrodes.
(13) The display device according to (1), further comprising:
a cover substrate facing the substrate in a direction perpendicular to a surface of the substrate, wherein
the third electrode is provided in the peripheral region of the cover substrate.
(14) The display device according to (1), wherein the drive circuit includes a first drive circuit configured to supply the drive signal to the first electrodes and a second drive circuit configured to supply the drive signal to the third electrode.
(15) The display device according to (1), further comprising:
a plurality of pixel electrodes disposed in a matrix (row-column configuration) in the active area of the substrate; and
a display functional layer configured to implement an image display function.
(16) The display device according to (15), wherein the drive circuit supplies a display drive signal to the first electrodes in a display period for performing image display.

What is claimed is:
1. A display device comprising:
a substrate;
a plurality of first electrodes arrayed in an active area of the substrate;
a plurality of second electrodes facing the first electrodes and configured to form capacitance between the first electrodes and the second electrodes;
at least one third electrode provided in a peripheral region positioned on the outside of the active area;
a drive circuit configured to supply a drive signal having a phase determined based on a predetermined code to the first electrodes and the third electrode; and
a scanning circuit configured to sequentially select a first electrode out of the first electrodes,
wherein
the drive circuit supplies the drive signal to the selected first electrode and the third electrode simultaneously,
the scanning circuit sequentially selects at least one of the first electrodes in each of a plurality of detection periods, the detection periods being arranged in a time-division manner in a period for performing detection on one detection surface,
the drive circuit supplies the drive signal to different the at least one of the first electrodes out of the first electrodes in the respective detection periods and supplies the drive signal to the third electrode in all the detection periods,
the scanning circuit selects two of the first electrodes simultaneously in one of the detection periods,
the scanning circuit selects the same pair of the two first electrodes in at least two of the detection periods, and
the drive circuit supplies the drive signal to the selected two first electrodes and the third electrode in the at least two of the detection periods.
2. The display device according to claim 1, wherein the scanning circuit selects the first electrodes by shifting the first electrodes two by two in the detection periods.
3. The display device according to claim 1, wherein the second electrodes output, to a detector, a sensor output signal corresponding to a change in capacitance between the first electrodes and the second electrodes and a change in capacitance between the third electrode and the second electrodes.
4. The display device according to claim 1, including a plurality of the third electrodes, wherein
the first electrodes are arrayed in a first direction and each extend in a second direction intersecting the first direction in planar view, and
the third electrodes face each other in the first direction, and the first electrodes are disposed between the third electrodes facing each other in the first direction.
5. The display device according to claim 4, wherein
the second electrodes extend in the first direction and are arrayed in the second direction in planar view, and
the third electrodes are disposed facing ends of the second electrodes.
6. The display device according to claim 4, wherein the third electrodes are further provided in the peripheral region at a position facing ends of the first electrodes.
7. The display device according to claim 1, wherein the third electrode is disposed in a layer different from a layer of the first electrodes and the second electrodes.

8. The display device according to claim 1, further comprising:
- a cover substrate facing the substrate in a direction perpendicular to a surface of the substrate, wherein
- the third electrode is provided in the peripheral region of the cover substrate.

9. The display device according to claim 1, wherein the drive circuit includes a first drive circuit configured to supply the drive signal to the first electrodes and a second drive circuit configured to supply the drive signal to the third electrode.

10. The display device according to claim 1, further comprising:
- a plurality of pixel electrodes disposed in a matrix in the active area of the substrate; and
- a display functional layer configured to implement an image display function.

11. The display device according to claim 10, wherein the drive circuit supplies a display drive signal to the first electrodes in a display period for performing image display.

* * * * *